United States Patent
Singer

(10) Patent No.: US 12,323,094 B2
(45) Date of Patent: Jun. 3, 2025

(54) SOLAR 3D PLATFORM

(71) Applicant: Nicholas J. Singer, Irvine, CA (US)

(72) Inventor: Nicholas J. Singer, Irvine, CA (US)

( * ) Notice: Subject to any disclaimer, the term of this patent is extended or adjusted under 35 U.S.C. 154(b) by 0 days.

(21) Appl. No.: 18/733,559

(22) Filed: Jun. 4, 2024

(65) Prior Publication Data
US 2024/0339963 A1   Oct. 10, 2024

Related U.S. Application Data

(63) Continuation of application No. 18/403,565, filed on Jan. 3, 2024, now Pat. No. 12,047,035, which is a continuation-in-part of application No. 18/214,366, filed on Jun. 26, 2023, now Pat. No. 11,999,266.

(60) Provisional application No. 63/594,312, filed on Oct. 30, 2023, provisional application No. 63/496,698, filed on Apr. 18, 2023, provisional application No. 63/495,043, filed on Apr. 7, 2023.

(51) Int. Cl.
H02S 30/20 (2014.01)
H02S 40/22 (2014.01)

(52) U.S. Cl.
CPC ............. *H02S 30/20* (2014.12); *H02S 40/22* (2014.12)

(58) Field of Classification Search
CPC ................................ H02S 30/20; H02S 40/22
USPC ......................................................... 136/245
See application file for complete search history.

(56) References Cited

U.S. PATENT DOCUMENTS

| | | | |
|---|---|---|---|
| 3,427,200 A * | 2/1969 | Ernest | H01L 25/03 136/246 |
| 5,520,747 A | 5/1996 | Marks | |
| 6,177,627 B1 | 1/2001 | Murphy | |
| 8,440,950 B1 | 5/2013 | Reischmann | |
| 8,487,180 B1 | 7/2013 | Fraas | |
| 11,337,379 B2 | 5/2022 | James | |
| 2003/0094315 A1 | 5/2003 | White | |
| 2004/0216929 A1 | 11/2004 | White | |
| 2007/0107768 A1 | 5/2007 | Romana | |
| 2010/0156339 A1 | 6/2010 | Hoffman | |
| 2011/0179791 A1 | 7/2011 | Butler | |
| 2014/0116495 A1 | 5/2014 | Kim | |
| 2015/0207454 A1 * | 7/2015 | Huling, III | H02S 40/22 136/246 |
| 2015/0326175 A1 | 11/2015 | Austin | |
| 2015/0330369 A1 | 11/2015 | Martin-Lopez | |
| 2016/0020727 A1 | 1/2016 | Cheung | |

(Continued)

FOREIGN PATENT DOCUMENTS

DE   102007014244 A1   9/2008

OTHER PUBLICATIONS

Does covering a car with solar panels make sense?, https://youtube.com/shorts/8hQnH55IMg8?feature=share.

*Primary Examiner* — Avinash A Savani
(74) *Attorney, Agent, or Firm* — DANE IP Law PC

(57) ABSTRACT

Solar panels and solar platforms having three-dimensional solar harvesting surfaces are disclosed. The solar panels and solar platforms may take a volumetric approach in harvesting solar energy by having the active sides of the solar surfaces protruding upwards rather than being merely planar like a conventional solar panel. The three-dimensional design of such active sides may help in capturing scattered photons reflected by adjacent solar surfaces and also align in optimum orientations relative to the sun.

17 Claims, 40 Drawing Sheets

(56) References Cited

U.S. PATENT DOCUMENTS

| | | |
|---|---|---|
| 2016/0197577 A1* | 7/2016 | Pisharodi ............ H01L 31/0547 |
| | | 136/246 |
| 2017/0093329 A1 | 3/2017 | Jensen |
| 2018/0170191 A1 | 6/2018 | Xing |
| 2019/0140475 A1 | 5/2019 | Chan |
| 2021/0075365 A1 | 3/2021 | Clapp |
| 2022/0069767 A1 | 3/2022 | Graner |

* cited by examiner

SOLAR 3D PLATFORM

CROSS-REFERENCE TO RELATED APPLICATIONS

This application is a continuation application of U.S. patent application Ser. No. 18/403,565, filed on 2024 Jan. 3, which claims priority to U.S. Prov. Pat. App. Ser. No. 63/594,312, filed on 2023 Oct. 30 and is a continuation-in-part application of U.S. patent application Ser. No. 18/214,366, filed on 2023 Jun. 26, which claims priority to Prov. Pat. App. Ser. No. 63/495,043, filed on 2023 Apr. 7 and Prov. Pat. App. Ser. No. 63/496,698, filed on 2023 Apr. 18, the entire contents of which are expressly incorporated herein by reference. This application also incorporates herein by reference the entire contents of U.S. patent application Ser. No. 18/437,246, filed on 2024 Feb. 9.

STATEMENT RE: FEDERALLY SPONSORED RESEARCH/DEVELOPMENT

Not Applicable

BACKGROUND

The various aspects and embodiments described herein relate to a solar platform and a method of using thereof.

Solar panels are used to harvest solar energy and convert such energy into electricity. Solar panels may be utilized to provide electricity to various electrical and electromechanical devices, some of such devices may have rechargeable batteries to store the electricity.

Accordingly, there is a need in the art for an improved device, system, and method for utilizing solar panels to power electrical and electromechanical devices.

BRIEF SUMMARY

The various embodiments and aspects disclosed herein address the needs discussed above, discussed below and those that are known in the art.

A solar platform having a plurality of solar panels is disclosed. The solar platform is mainly designed to harvest solar energy for storage and the powering of electrical and electromechanical devices. The solar platform may have a plurality of base solar panels and pivotable solar panels where the solar panels, specifically the pivotable solar panels, are pivotable in different orientations. The pivoting of the pivotable solar panels may be done manually or automated using a motorized electromechanical mechanism. Such pivoting may be necessary to orientate the solar panels in optimum positions relative to the sun to receive sufficient or maximum amount of solar energy. The pivotable solar panels may be bifacial and may have different structural dimensions than the base solar panels. The solar platform may also include a center panel in between the pivotable solar panels that is also pivotable similar to the pivotable solar panels. The solar platform may be attached or integrated with a top surface of a vehicle or an add-on vehicle component, such as a cap or a tonneau cover. As such, the solar platform on the vehicle may be designed to power the electrical components of the vehicle or electrical components that are connected to the vehicle. If the vehicle is electrical or hybrid, the solar platform on the vehicle may also recharge the batteries of the vehicle.

Ultimately, the solar platforms described herein may be incorporated with different types of electric, hybrid, or regular internal combustion engine vehicles. Such vehicles may include trucks, vans, minivans, SUVs, semitrucks, buses, recreational vehicles, motorhomes, trailers, station wagons, hatchbacks, crossovers, sedans, coupes, compact automobiles, and other types of vehicles and automobiles. The solar platforms described herein may also be incorporated with buildings, such as parking structures, homes, office buildings, stadiums, and other types of building structures. The solar platforms described herein may also simply be on a frame and placed on the ground.

More particularly, a solar platform is disclosed. The solar platform may have a frame structure having two longitudinal sides and two lateral sides, a base solar panel laid flat on the frame structure and having an active side with a first plurality of solar cells facing in an upwards direction, and a pivotable solar panel hinged and attached at a central area of the frame structure and the pivotable solar panel configured to be pivotable at least up to 10 degrees relative to the frame structure, the pivotable solar panel having an active side with a second plurality of solar cells facing away from the base solar panel.

In some embodiments, the base solar panel has a first width and the pivotable solar panel has a second width, the first width being greater than the second width.

In some embodiments, the pivotable solar panel has a second active side with a third plurality of solar cells facing the base solar panel.

In some embodiments, the solar platform may further comprise additional solar panels pivotably hinged and attached to the center area of the frame structure, and the additional solar panels having solar cells on both sides thereof.

In some embodiments, the pivotable solar panel and the additional solar panels are equidistantly spaced apart from each other and to the base solar panel.

In some embodiments, the pivotable solar panel is traversable using an automated motorized mechanism.

In some embodiments, the solar platform is attachable to a house roof or a parking structure roof.

In some embodiments, the solar platform is attachable to an RV roof, a car roof, or a cap of a truck.

In some embodiments, the solar platform may further comprise a receiver, a motor in communication with receiver, the motor connected to the pivotable solar panels for rotating the pivotable solar panels, wherein the receiver is operative to receive a command signal to operate the motor and to pivot the pivotable solar panels.

In some embodiments, the solar platform may further comprise an application downloadable onto a smartphone of a user, wherein the application is in communication with the electrical system of the solar platform to control the electrical system of the solar platform, sensors are attached to the solar platform for measuring current flow, mapping current flow from each of the solar panels, current generated versus measured light intensity from a light sensor, percent battery charged, and percent battery remaining, connecting the application and the sensors in communication for receiving data from the sensors and displaying the measured data on a screen of the smartphone.

In some embodiments, the solar platform may further comprise a light sensor for measuring light intensity imposed on the solar panel, the light sensor providing light intensity data to a processor of the solar platform, a position sensor for determining an angular position of the panels and direction, the position sensor providing position data to the processor of the solar platform, the processor being operative to receive the light intensity data, the position data and the current generated from each panel data and send a signal to the motor to change a position of the solar panel incrementally and determine an optimal position of the solar platform.

In some embodiments, the solar platform may further comprise a forward sensor operative to senses a physical object at a height of the solar platform, the forward sensor in communication with a processor, the processor configured to send a signal to the motor to traverse the panels downward when the forward sensor senses an object at a height of solar panels that have been pivoted upward.

In some embodiments, the solar platform may further comprise a lock in communication with a transmitter, the lock having an all systems okay position indicative that the solar platform is operational and a system error position indicative that the solar platform is not operational, the all systems okay position and the system error position defining a system status, the lock configured to send a signal to the transmitter and the transmitter operative to send the signal to an application loaded on a smartphone for displaying the system status on the smartphone of the user.

Furthermore, a solar platform that is integrated with a structure of a vehicle is disclosed. The vehicle with an integrated structural solar platform may comprise a vehicle having an outer body which defines an outer surface, a base solar panel having a first plurality of solar cells defining an upper surface, the upper surface of the base solar panel and the outer surface of the outer body being coextensive to make up a portion of the body of the vehicle, the base solar panel having an active side with the first plurality of solar cells facing outwards, and a pivotable solar panel pivotably hinged and attached at a central area of the base solar panel and the pivotable solar panel configured to be pivotable up to 10 degrees relative to the base solar panel, the pivotable solar panel having an active side with a second plurality of solar cells facing away from the base solar panel.

In some embodiments, the base solar panel has a first width and the pivotable solar panel has a second width, the first width being greater than the second width.

In some embodiments, the integrated solar platform may further comprise additional solar panels pivotably hinged and attached to the central area of the base solar panel, and the additional solar panels having solar cells on both sides thereof.

In some embodiments, the pivotable solar panel is traversable using an automated motorized mechanism.

In some embodiments, the automated motorized mechanism is configured to be connected to a computing device of the vehicle.

In some embodiments, the automated motorized mechanism is configured to pivot the pivotable solar panels to a desired position while the vehicle is in motion.

In some embodiments, each of the additional pivotable solar panels have a second active side with a third plurality of solar cells facing the base solar panel.

In some embodiments, the additional pivotable solar panels are configured to be spaced apart from the base solar panel by at least 30 degrees.

In some embodiments, the additional solar panels and the base solar panel are configured to be equidistantly spaced apart from each other.

Additionally, a cap of a truck with an integrated solar platform is disclosed. The cap may have a cap body with side frames, a rear cap portion with a cap door, and a roof an outer surface with the integrated solar platform, the integrated solar platform having a base solar panel having a first plurality of solar cells defining an upper surface, the upper surface of the base solar panel and the outer surface of the roof being coextensive to make up a portion of the roof of the cap body, the base solar panel having an active side with the first plurality of solar cells facing outwards away from an interior of the cap body, and a pivotable solar panel pivotably hinged and attached at a central area of the base solar panel and the pivotable solar panel configured to be pivotable up to 10 degrees relative to the base solar panel, the pivotable solar panel having an active side with a second plurality of solar cells facing away from the base solar panel.

In some embodiments, the base solar panel has a first width and the pivotable solar panel each has a second width, the first width being greater than the second width.

In some embodiments, the cape may further comprise additional solar panels pivotably hinged and attached to the central area of the base solar panel, and the additional solar panels having solar cells on both sides thereof.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
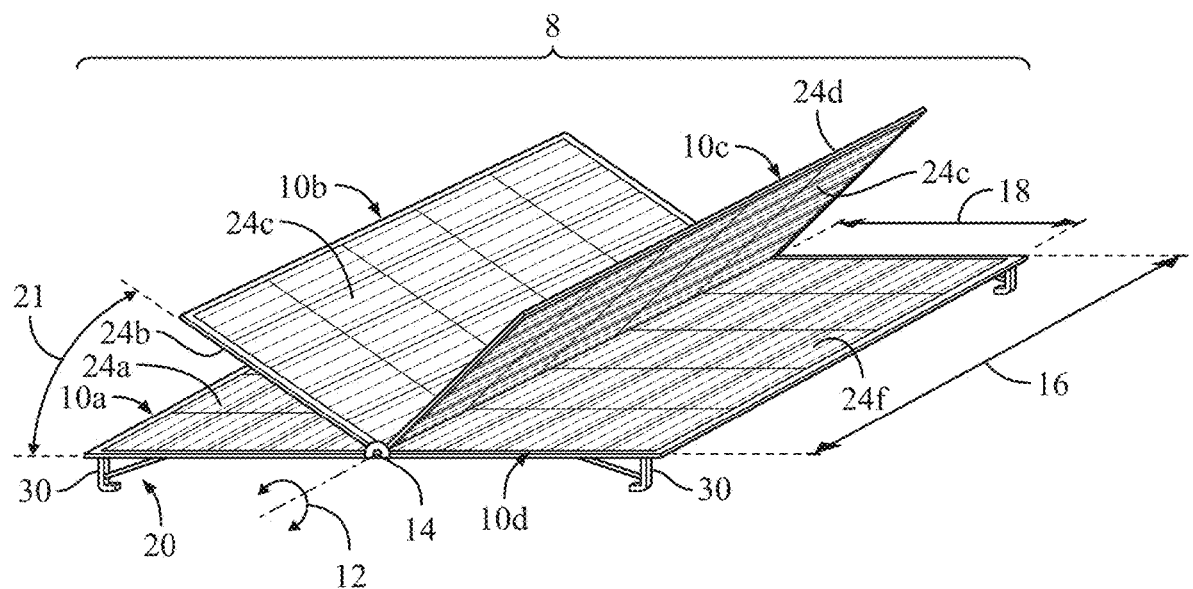
FIG. 1 shows a perspective view of a first embodiment of a solar platform in a deployed position.
Figure 2:
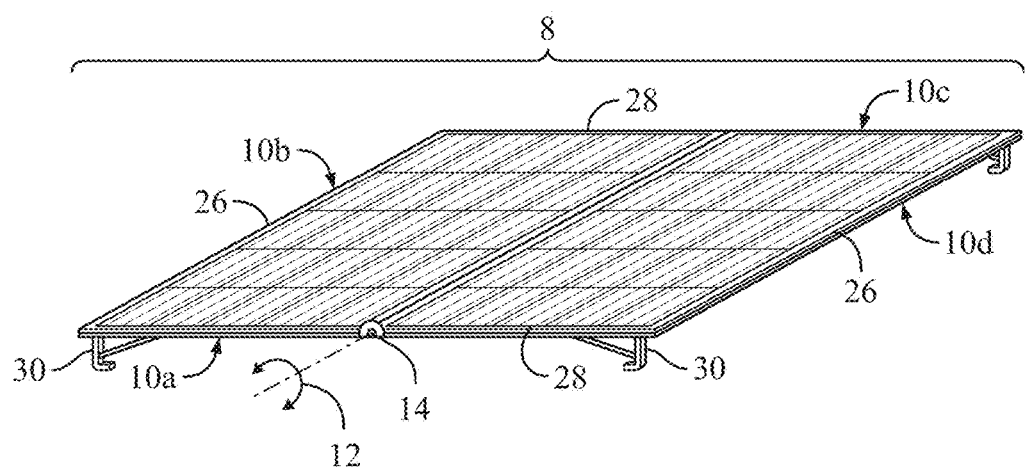
FIG. 2 shows a perspective view of the first embodiment of the solar platform in a folded position.
Figure 3:
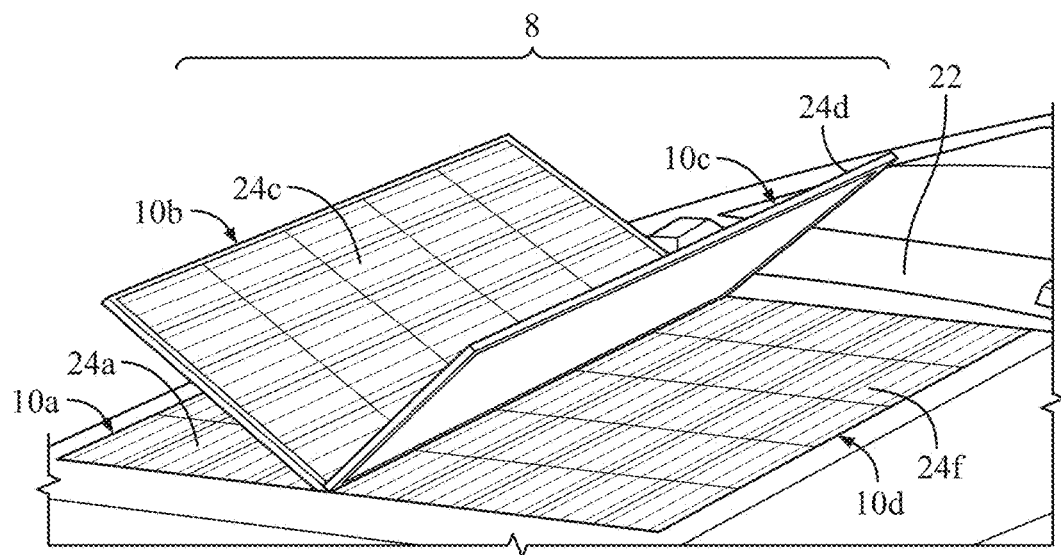
FIG. 3 shows a perspective view of the first embodiment of the solar platform having four active sides on an automobile and in a deployed position.
Figure 4:
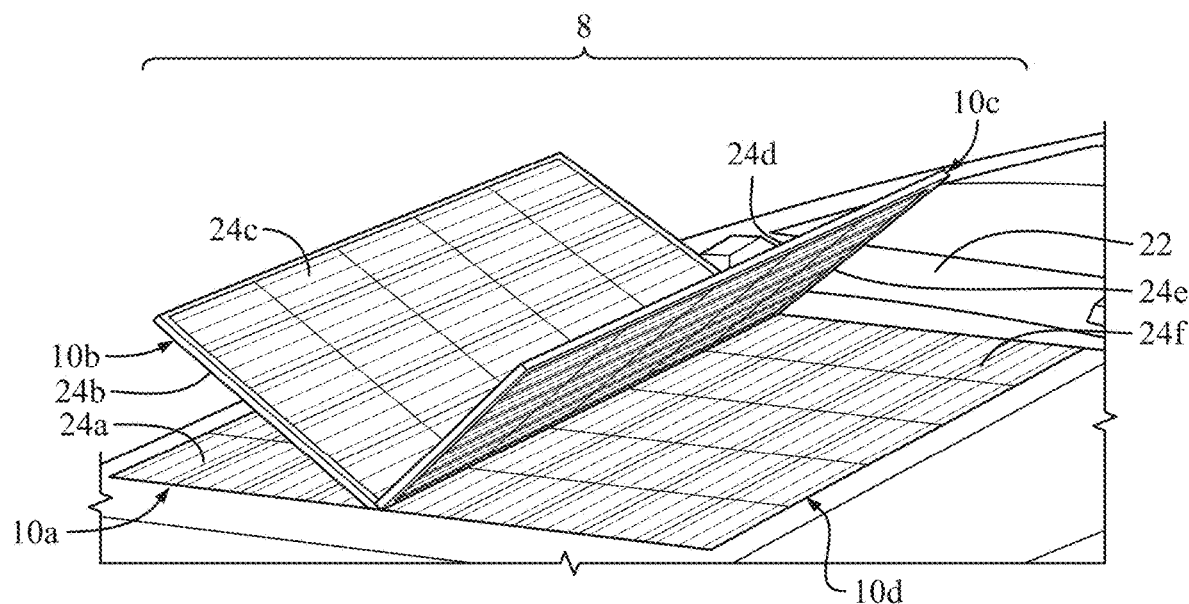
FIG. 4 shows a perspective view of the first embodiment of the solar platform having six active sides on an automobile and in a deployed position.
Figure 5:
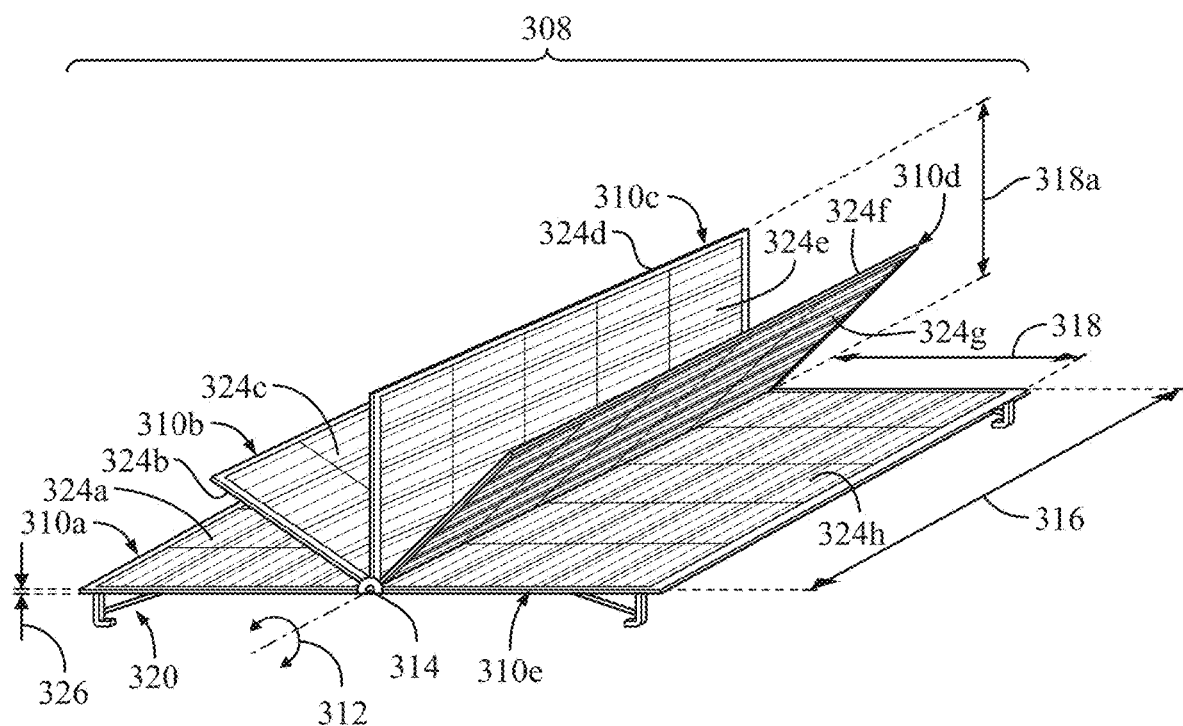
FIG. 5 shows a perspective view of a second embodiment of the solar platform in a deployed position.
Figure 6:
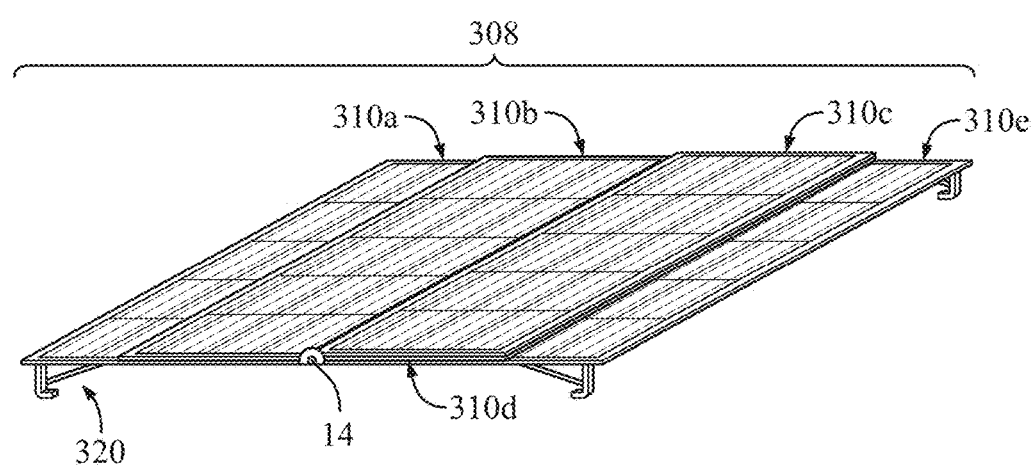
FIG. 6 shows a perspective view of the second embodiment of the solar platform in a folded position.
Figure 7:
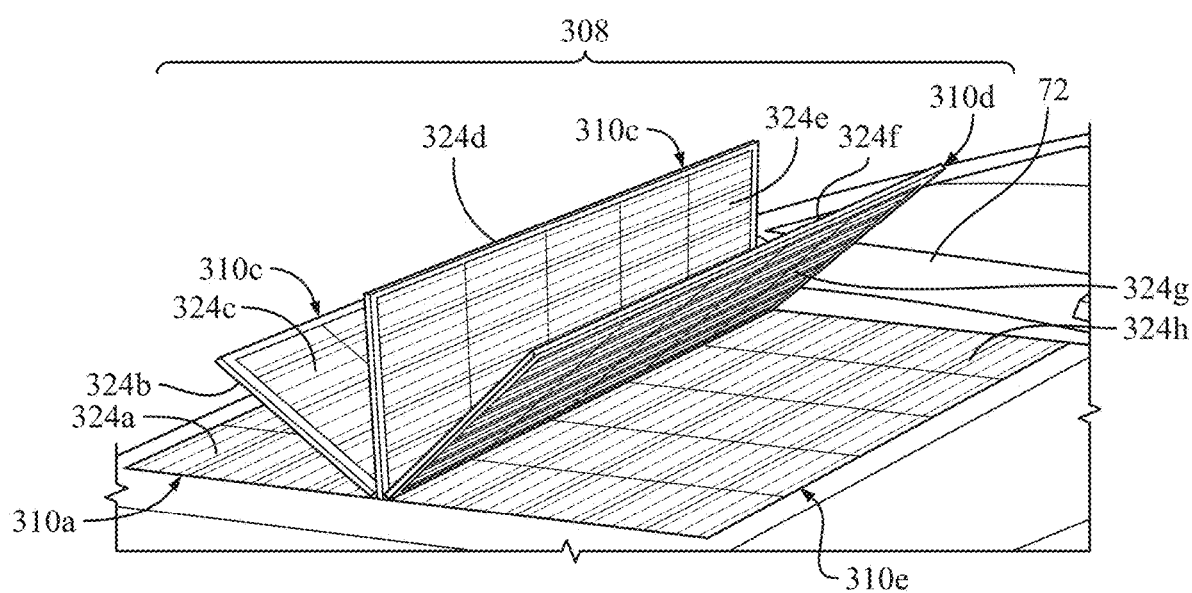
FIG. 7 shows a perspective view of the second embodiment of the solar platform on an automobile and in a deployed position.

A solar platform 8 having a plurality of solar panels is disclosed. As shown in FIG. 1, the solar platform 8 may be on a frame 20 and have two base solar panels 10*a,d* and two pivotable solar panels 10*b, c*. The base solar panels 10*a, d* may lay flat on the frame 20 and the pivotable solar panels 10*b, c* may be pivotable about a pivot axis 12 in the middle of the frame 20. As such, the pivotable solar panels 10*b, c* may change angular orientation relative to the base solar panels 10*a, d* and be positioned in optimum positions to receive solar radiation and energy. The pivotable solar panels 10*b, c* may be bifacial and have active sides 24*b-e* on a front and back surface of the panels. When not in use, the solar platform may be in a folded position, as shown in FIG. 2. As shown in FIGS. 3-4, the solar platform 8 may be attached or integrated with a vehicle top surface 22 instead of being attached to a frame 20. As shown in FIG. 5, the solar platform 308 may have a center solar panel 310*c* in addition to the pivotable solar panels 310*b, d*, and the center solar panel 310*c* may be bifacial. The width 318*a* of the pivotable and center solar panels 310*b-d* may be shorter than the width 318 of the base solar panels 310*a, e* such that portions of the base solar panels 310*a,e* are exposed when the solar platform 308 is in a folded position, as shown in FIG. 6. As shown in FIG. 7, the solar platform 308 having the additional center solar panel 310*c* may be attached or integrated with a vehicle top surface 72 instead of being attached to a frame 20. As shown in FIGS. 8-18, the different embodiments of the solar platform 8, 308 may be attached to different kinds of trucks 802 and may be part of caps 810 attached to the panels of a truck bed. As shown in FIGS. 19-24, an embodiment of a solar platform 1908 may be integrated with a tonneau cover 1911 of a truck 1902. As shown in FIGS. 25-28, the different embodiments and examples of solar platforms may be incorporated with recreational vehicles and also building structures, such as a house or a parking structures.

Figure 36:
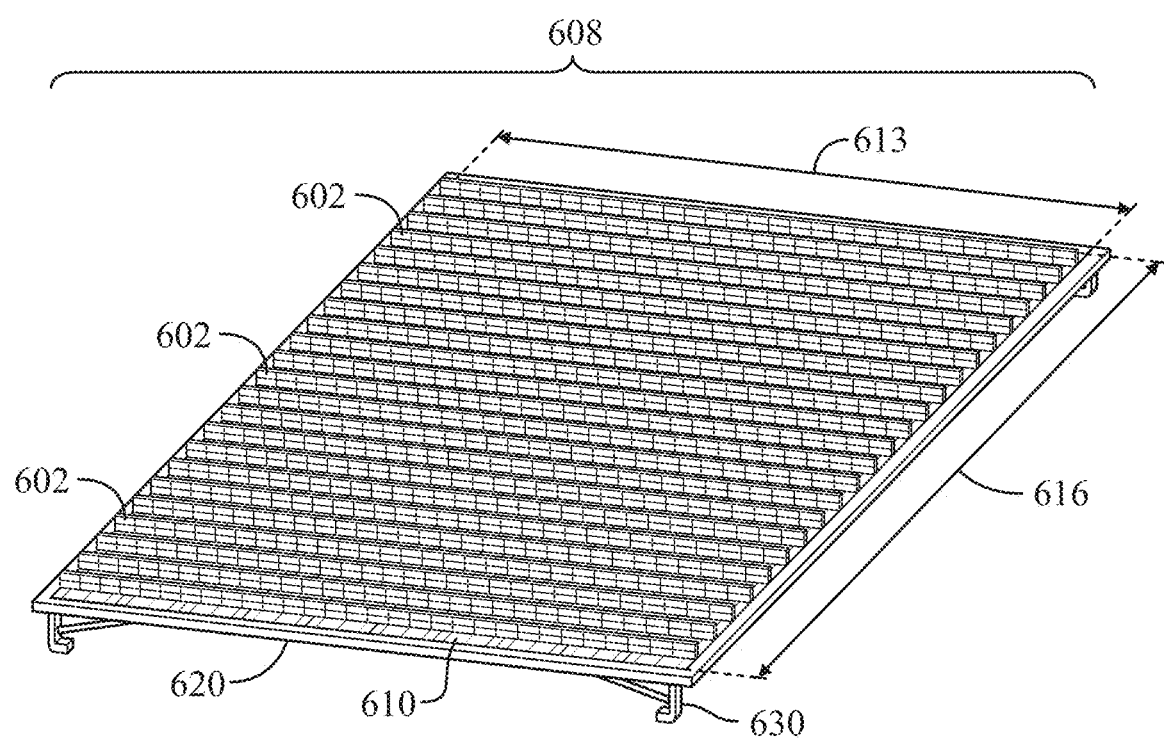
FIG. 36 shows a perspective view of a sixth embodiment of the solar platform.
Figure 37A:
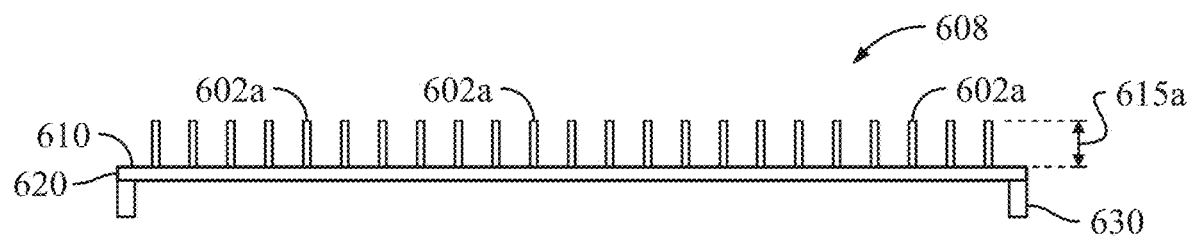
FIGS. 37A-C show side views of the sixth embodiment of the solar platform with the riser solar panels having different heights.
Figure 37B:
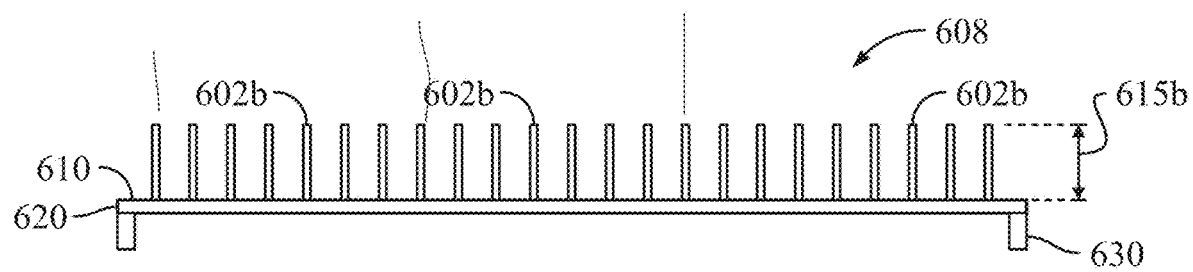
Figure 37C:
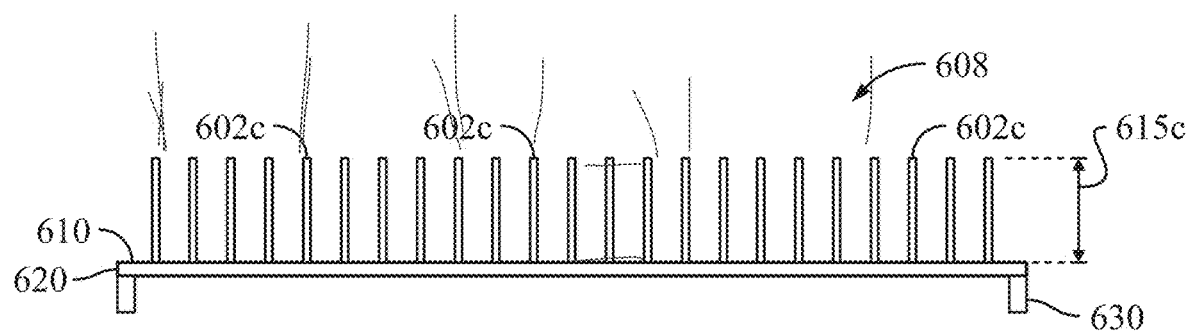
Figure 37D:
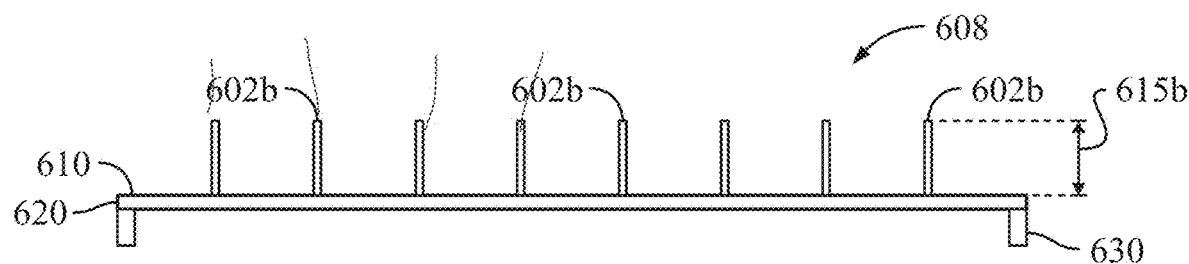
FIGS. 37D-E show side views of the sixth embodiment of the solar platform with the riser solar panels spaced apart with their heights taken into consideration.
Figure 37E:
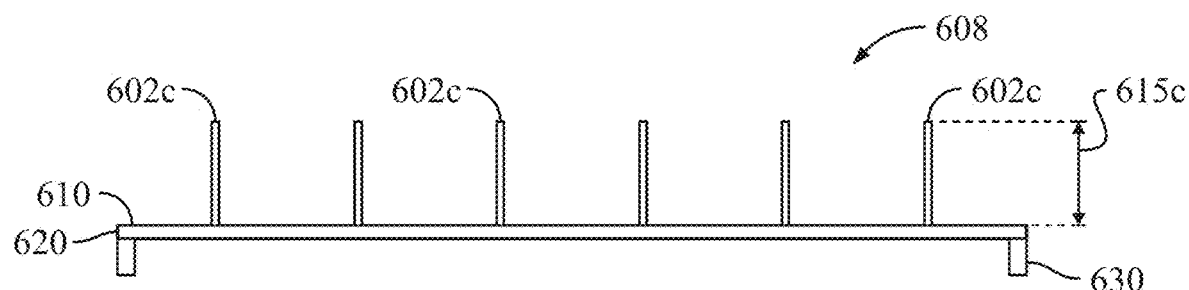
Figure 37F:
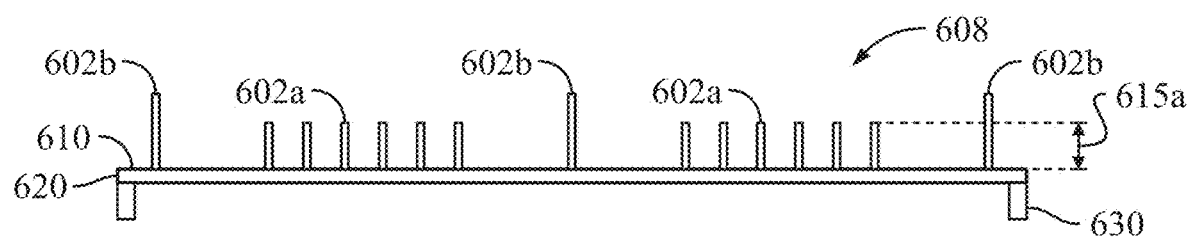
FIG. 37F shows a side view of the sixth embodiment of the solar platform utilizing riser solar panels with different heights.
Figure 38A:
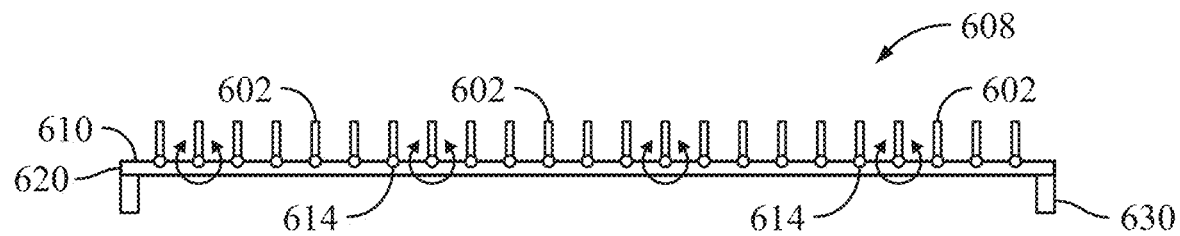
FIGS. 38A-C show side views of the sixth embodiment of the solar platform with the riser solar panels being pivotable.
Figure 38B:
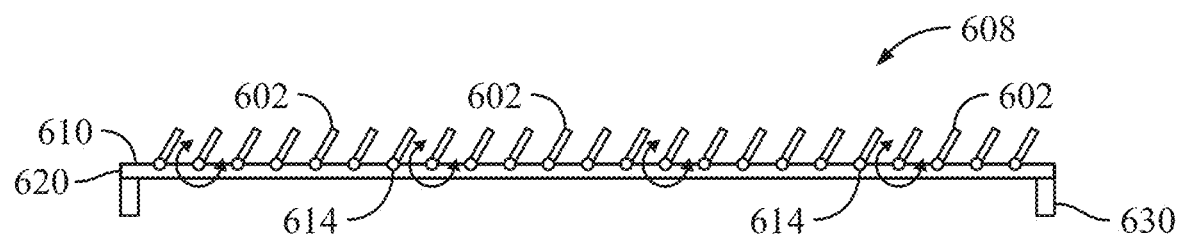
Figure 38C:
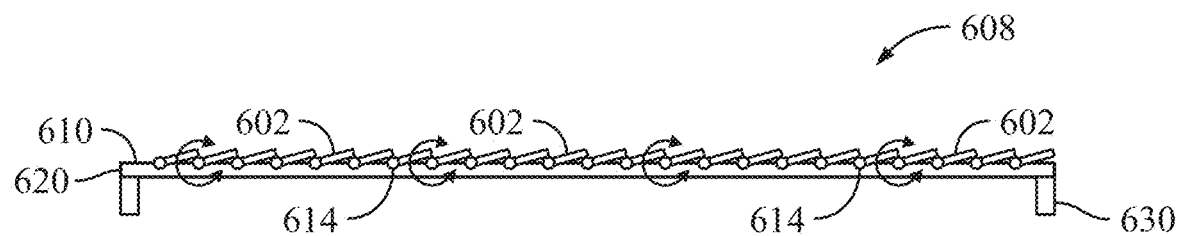
Figure 39A:
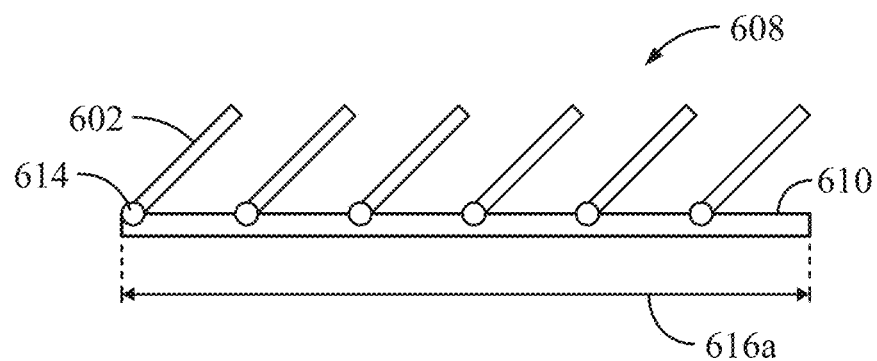
FIGS. 39A-B show a miniature version of the sixth embodiment of the solar platform.
Figure 39B:
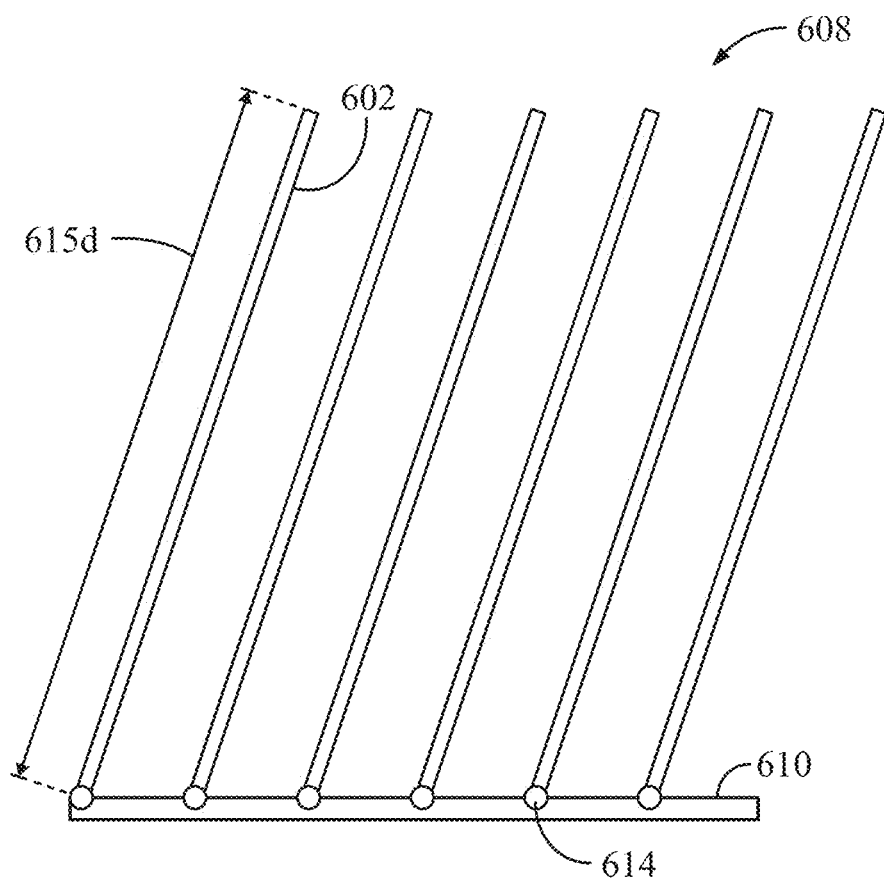

Additionally, a sixth embodiment of a solar platform 608 having a plurality of riser solar panels 602 is shown in FIG. 36. The sixth embodiment of the solar platform 608 may have a base solar panel 610 that has a plurality of riser solar panels 602 projecting upwards from the base solar panel 610 in a 90-degree direction. As shown in FIGS. 37A-C, the riser solar panels 602*a-c* may come in different heights 615*a-c*. As shown in FIGS. 37D-E the riser solar panels 602*b-c* may be spaced apart from each other with their height 615b-c taken into consideration. As shown in FIG. 37F, riser solar panels 602a-b having different heights may be used in combination on the solar platform 608. As shown in FIGS. 38A-C, the riser solar panels 602 of the solar platform 608 may be pivotable with respect to the base solar panel 610 about a rotation axis extending across the base solar panel 610. FIGS. 39A-B show a miniature version of the solar platform 608 having a small length 616a. FIGS. 40-44 show the solar platform 608 attached and integrated with different vehicle components and building structures. Furthermore, FIG. 45 shows a new embodiment of a solar panel that has a plurality of embossed solar cell beams 702 that are each shaped as a triangular prism. As shown in FIG. 45, the top of the triangular prism structure of each embossed solar cell beam 702 may have a flat lateral portion with an additional active solar surface. The three-dimensional structure of the embossed solar panel 708 helps harvest solar energy per cubic meter rather than the conventional per meter square. FIGS. 46A-B and 47A-B show other example of embossed solar panel 708. FIGS. 48-52 show an embodiment and different examples of a stacker solar platform 908. FIGS. 53-54 also show other examples of stacked rows 904 of stacker solar platform 908 and embossed 708 and debossed 701 solar platforms.

Any of the embodiments and examples of the solar platform disclosed herein may be incorporated with different types of electric, hybrid, or regular internal combustion engine vehicles. Such vehicles may include trucks, vans, minivans, SUVs, semitrucks, buses, recreational vehicles, motorhomes, trailers, station wagons, hatchbacks, crossovers, sedans, coupes, compact automobiles, and other types of vehicles and automobiles. The solar platforms described herein may also be incorporated with buildings, such as parking structures, homes, office buildings, stadiums, and other types of building structures. The solar platforms described herein may also simply be on a frame and placed on the ground. Specifically with the incorporation of the solar platform with the vehicle, the solar platform may be attached or integrated with the roof of a vehicle or the top of a cap (e.g., a camper shell) or the tonneau cover of a truck, to name a few examples. The solar platform may be connected to the electrical components and a battery of the vehicle. For example, the solar platform may be used to charge the battery of an electric vehicle, a deep cycle battery, or charge and power other electronic devices. The solar platform may also be connected to a computing system of the vehicle to receive commands to deploy, fold, and operate some or all of the solar panels using an automated motorized mechanism. Alternatively, solar platform may have its own computing system that operates the solar panels.

Since the solar platforms described herein have pivotable solar panels stacked in the same region as the base solar panels, and some of the solar panels may be bifacial, the energy conversion density per unit area may increase. This may be because there are multiple solar panels occupying the same spatial area when compared to an ordinary flat solar panel. The clustering of multiple solar panels at different angles in the same spatial area may help the production of electric energy from solar energy by the solar platform. The pivotable solar panels may also be pivoted in such spatial area to receive sunlight at incident solar radiation angle that may change at different times of day.

By way of example and not limitation, the solar panels described herein may be solar photovoltaic panels, where each solar panel may have a plurality of solar cells ranging between 20 to 120 solar cells. By way of example and not limitation, the solar panels described herein may be monocrystalline, polycrystalline, or thin-film solar panels. By way of example and not limitation, the base solar panels 10a,d shown in FIG. 1, for example, could be monocrystalline or polycrystalline and the pivotable solar panels 10b,c may be thin-film solar panels. However, any other combination of the type of solar panels may be used with the solar platform, or all of the solar panels may be the same type. The solar panels of the solar platform may be monofacial, having one active side, or bifacial, having two active sides. The solar panels of the solar platform may also be transparent solar panels, either fully transparent or semi-transparent. By way of example and not limitation, each solar panel may generate between 0.1 to 0.5 kWh energy depending on the location, the weather, the time of day and year, and the type of solar panel. Alternatively, each solar platform may supply from 1 kilowatt to 12 kilowatts depending on the location, the weather, the time of day and year, and the type and number of solar panels.

Referring specifically now to FIGS. 1-2, a perspective view of a first embodiment of a solar platform 8 in a deployed and folded positions is shown. By way of example and not limitation, the solar platform 8 may have four solar panels 10a-d on a frame 20, which some or all of the panels may be rotatable about a pivot axis 12 running along the center of the frame 20. As shown in FIG. 1, the pivotable solar panels 10b, c may be angularly separated from the base solar panels 10a, d in the deployed position. As shown in FIG. 2, the pivotable solar panels 10b, c may be stacked on top of the base solar panels 10a, d in the folded position.

By way of example and not limitation, the solar panels 10a-d may be mounted on the frame 20. As shown in FIG. 2, the frame 20 may be rectangular and have two longitudinal portions 26 and two lateral portions 28 defining the frame body. In the middle of the lateral portions 28, there may be a hinge mechanism 14 that allows the solar panels to pivot about a pivot axis 12 along the lateral portions 28. By way of example and not limitation, the hinge mechanism 14 may be one or more hinges. By way of example and not limitation, the hinge mechanism 14 may or may not be part of the frame 20. As a part of the frame 20, the hinge mechanism may run along the panel length 16 (see FIG. 1) of the center of the frame 20. Alternatively, the hinge mechanism 14 may not be part of the frame 20 and may only bind the solar panels 10a-d together. Consequently, the pivot axis 12 may run along the panel length 16 of the frame 20 at the center of the lateral portions 28 (see FIG. 2). By way of example and not limitation, each of the lateral portion 28 may be made of two parts that are joined together at the hinge mechanism 14. By way of example and not limitation, there may exist a third longitudinal portion in the middle of the lateral portions 28 where the hinge mechanism 14 would be located. By way of example and not limitation, the base solar panels 10a, d may be fixedly mounted to the frame on all sides of the panels. By way of example and not limitation, the pivotable solar panels 10b, c may be pivotably mounted to the frame 20 at the hinge mechanism 14. By way of example and not limitation, the hinge mechanism 14 may fix the pivotable solar panels 10b, c in place after they are pivoted to a preferred orientation. It is also contemplated the base panels 10a, d may be pivotably mounted to the frame 20 rather than being fixedly mounted. The frame 20 may be set up on the ground, a building structure (e.g., home, office building, or parking structure), or be attached to a surface of a vehicle, such as the roof or a top surface of a cap of a vehicle. The frame 20 may have a plurality of mounting mechanisms 30, which may be legs to stand on a structure or be an interlocking device to be attached to a top surface of a vehicle, such as the roof of a vehicle or the top surface of the cap.

When the solar platform 8 is in a deployed position, the base solar panels 10a, d may lay flat on the frame 20 while pivotable solar panels 10b, c may be elevated at an incline from the base solar panels 10a, d, and the frame 20, about the pivot axis 12. The active sides 24a, f of the base solar panels 10a, d having the photovoltaic solar cells may be facing upwards in the direction of the pivotable solar panels 10b, c. By way of example and not limitation, the base solar panels 10a, d may be one solar panel, instead of two, and the pivotable solar panels 10b, c may be hinged on top of the one base solar panel.

The pivotable solar panels 10b, c may each be pivotable up to 180 degrees at the pivot axis 12 and relative to lateral portions 28 of the frame 20 (see FIG. 2) and the base solar panels 10a, d. By way of example and not limitation, The pivotable solar panels 10b,c may each be pivoted by 15, 30, 45, or 60 degrees about the pivot axis 12 and relative to the base solar panels 10a, d. By way of example and not limitation, the pivotable solar panels 10b, c may be inclined such that they form a V-shape relative to each other. By way of example and not limitation, the angular displacement 21 of the first pivotable solar panel 10b from the first base solar panel 10a and the second pivotable solar panel 10c from second base solar panel 10d may be between 10 to 90 degrees. Preferably, the angular displacement 21 therebetween may be 45 degrees. As shown in FIG. 1, the angular displacement 21 between each pair of base and pivotable solar panels 10a-d may be the same, but it is also contemplated that each pair of panels to have different angular displacement 21 from each other. For example the first pivotable solar panel 10a may be separated from the first base solar panel 10b by 30 to 45 degrees while the second pivotable solar panel 10c may be separated from the second base solar panel 10d by 45 to 60 degrees. It is contemplated that the base solar panels 10a, d may be pivotable the same as the pivotable solar panels 10b, c.

It is also contemplated the base panels 10a, d may be pivotably mounted to the frame 20 rather than being fixedly mounted. By way of example and not limitation, the base solar panels 10a, d may also pivot about the pivot axis 12 by the hinge mechanism 14. Each base solar panel 10a, d may be configured to pivot relative to the frame 20, which is orientated horizontally, about the pivot axis 12 between 10 to 180 degrees. As such, all of the solar panels 10a-d may be sandwiched together and be folded on top of each other.

Each of the solar panels 10a-d may have one or more photovoltaic active sides 24a-f for receiving/capturing solar energy and converting such energy to electricity. More particularly, the solar panels may each have active sides 24a, c, d, f on a front side of the panels. By way of example and not limitation, the first embodiment of the solar platform 8 may have four active sides 24a, c, d, f on the front side of the four solar panels 10a-d, the active sides having a plurality of photovoltaic solar cells. In another example, the pivotable solar panels 10b, c that are designed to be at an incline may be bifacial solar panels and capture solar energy on both the front and back side of the panels. The pivotable solar panels 10b, c may have such function by being a manufactured bifacial solar panel or by combining two one-sided solar panels as one to receive light from the front and back of the pivotable solar panels 10b, c. Consequently, the solar platform 8 may have six active sides 24a-f, with the additional active sides being on the back sides of the pivotable solar panels 10b, c. In another example, the pivotable solar panels 10b, c may be transparent solar panels, either fully transparent or semi-transparent solar panels.

The pivoting of the pivotable solar panels 10b, c in the preferred incline position may be done manually or automatically. By way of example and not limitation, a user may manually actuate the hinge mechanism 14 and orientate the pivotable solar panels 10b,c in desired positions. By way of example and not limitation, the hinge mechanism 14 may be a motorized electromechanical mechanism and be connected to a computing system that adjusts and orientates the solar panels based on different factor inputs. By way of example and not limitation, the motorized electromechanical mechanism and the computing system may be remote controlled. By way of example and not limitation, the computing system may be part of the solar platform or part of the vehicle, if mounted or integrated with a vehicle. By way of example and not limitation, the computing system may actuate the hinge mechanism 14 to orientate one or more of the solar panels 10a-d based on the time of year (i.e., the current month or season), the time of the day, the real-time weather pattern, and the location of the solar platform 8 so that the solar panels 10a-d may be positioned at optimum light receiving orientations. By way of example and not limitation, the computing system may consequently actuate the hinge mechanism 14 to orientate the solar panels 10a-d, particularly the pivotable solar panels 10b, c, at different angles throughout the day such that the solar panels are at optimum angles relative to the radiation of the sun. By way of example and not limitation, the pivotable solar panels 10b, c may each be orientated at a first angle having a first angular displacement 21 relative to the base solar panels 10a, d in the morning, and the pivotable solar panels 10b, c may each be orientated to a second angle having a second angular displacement relative to the base solar panels 10a, d in the afternoon, the first angular displacement being different than the second angular displacement.

Since the solar platform 8 has pivotable solar panels 10b, c stacked in the same region as the base solar panels 10a, d, and the pivotable solar panels 10b, c may be bifacial or transparent, the energy conversion density per unit area may increase. This may be because there are multiple solar panels occupying the same spatial area when compared to an ordinary flat solar panel. The clustering of multiple solar panels at different angles in the same spatial area may help the production of electric energy from solar energy by the solar platform 8. The pivotable solar panels 10b, c may also be pivoted in such spatial area to receive sunlight at incident solar radiation angle that may change at different times of day.

As shown in FIG. 2, the first pivotable solar panel 10b may be folded on top of first base solar panel 10a and the second pivotable solar panel 10c may be folded on top of the second base solar panel 10d to create the folded configuration. In the folded position, solar panels 10a-d may lie flat on each other and onto the frame 20. As shown in FIG. 2, the pivotable solar panels 10b, c may fully cover the base solar panels 10a, d in the folded position. This may be because the four solar panels 10a-d may have the same panel length 16 and panel width 18. By way of example and not limitation, the panel length 16 may be between two to nine feet and the panel width may be between one to seven feet. By way of example and not limitation, each solar panel 10a-d of the solar platform 8 may have sizes from 4×4 feet to 6×6 feet. The solar panels 10a-d may also have different dimensions, as described elsewhere herein.

The folding may be done using the hinge mechanism 14 to rotate pivotable solar panels 10b, c about the pivot axis 12. By way of example and not limitation, the folding may be manual or automated using a motorized electromechanical mechanism, as described elsewhere herein. If the hinge mechanism 14 is motorized, such mechanism may be connected to a computing system to receive input to fold the solar panels and also be remote controlled. It is also contemplated that all the solar panels 10a-d may be folded on top of each other about the pivot axis 12 such that the pivotable solar panels 10b-c are sandwiched between the base solar panels 10a, d. The frame 20 may also be folded in half about the pivot axis 12.

Referring now FIGS. 3-4, the first embodiment of the solar platform 8 on an automobile and in a deployed position are shown. FIG. 3 shows a solar platform 8 on the automobile with four active sides 24a, c, d, f. The solar platform 8 of the first embodiment (shown in FIGS. 1-2) may be attached or integrated as a part of a top surface 22 of an automobile instead of being mounted to the frame 20, shown in FIG. 1. The solar platform 8 may be the same as what has been described with respect to FIGS. 1-2. The solar platform 8 may be attached or integrated with a roof of an automobile, a cap (e.g., a camper shell), tonneau cover, and other vehicle components. By way of example and not limitation, the base and pivotable solar panels 10a-d may each have one active side 24a, c, d, f for receiving solar energy on the top surface of each panel facing upwards and outwards. As such, the solar platform 8 may have a total of four active sides. By way of example and not limitation, the solar platform 8 attached or integrated with the top surface 22 of an automobile may be deployed in the active position or folded while the vehicle is at a stop or in motion. The deploying of the solar panels 10a-d may be based on logic computed by a computing system to provide optimum orientation of the panels, as described elsewhere herein. By way of example and not limitation, the computing system may be part of the vehicle or may be part of the solar platform 8.

Referring specifically now to FIG. 4, the solar platform 8 attached or integrated with the vehicle top surface 22 is shown as having six active sides 24a-f. By way of example and not limitation, the solar platform 8 shown in FIG. 4 may be identical to FIG. 3, except that the pivotable solar panels 10b-c may be bifacial and have active sides 24b, c and 24d, e on both sides of such panels, or the pivotable solar panels 10b-c may be transparent solar panels as described elsewhere herein. As such, the example shown in FIG. 4 may have six active sides 24a-f for receiving solar energy. The solar panels 10a-d may be deployed in the desired positions (i.e., angular positions), as described elsewhere herein. Such deploying and folding may be done while the vehicle is in motion or at a stop, as described elsewhere herein.

The solar platforms 8 described with reference to FIGS. 3-4 may be incorporated with different types of electric, hybrid, or regular internal combustion engine vehicles. Such vehicles may include trucks, vans, minivans, SUVs, semitrucks, buses, recreational vehicles, motorhomes, trailers, station wagons, hatchbacks, crossovers, sedans, coupes, compact automobiles, and other types of vehicles and automobiles. The solar platforms described with reference to FIGS. 3-4 may also be incorporated with buildings, such as parking structures, homes, office buildings, stadiums, and other types of building structures.

Referring now to FIGS. 5-6 perspective views of a second embodiment of the solar platform 308 in a deployed and folded position are shown. In the second embodiment, the solar platform 8 may have a center solar panel 310c in addition to the base solar panels 310a, e and the pivotable solar panels 310b, d, which may be traversed or pivoted to a vertical position in the deployed position. In the second embodiment of the solar platform 308, multiple solar panels 310a-e may be stacked upon each other, but the pivotable solar panels 310b, d and the center solar panel 310c may have different structural dimensions than the base solar panels 310a, c. As such, portions of the base solar panels 310a, e may be exposed in the folded position and as shown in FIG. 6. In an alternate embodiment, the pivotable solar panels 310b, d may be omitted and only the center solar panel 310c along the base solar panels 310a, e may exist, and the center solar panel 310c may be pivotable by the hinge mechanism 314 about the pivot axis 312. In the same alternate embodiment, the center solar panel 310c may be positioned in an orthogonal position so as to form an L shape with the base solar panels 310a, c. The frames 320 and hinge mechanism 314, shown in FIGS. 5-6, may be similar to what has been described elsewhere herein.

As shown in FIG. 5, the solar panels 310b-d may be traversed to a deployed position. The pivotable and base solar panels 310a, b, d, e may have the same features and orientations as explained elsewhere herein. By way of example and not limitation, the pivotable and center solar panels 310b, c, d may pivot about pivot axis 312 via the hinge mechanism 314. By way of example and not limitation, the center solar panel 310c may have a longitudinal side attached to the hinge mechanism 314 and be pivotable up to 180 degrees about the pivot axis 312 relative the lateral frame portions. The center solar panel 310c may be pivoted to an optimum orientation to receive solar radiation and energy. In the deployed position, the pivotable and center solar panels 310b-d may be positioned so as to be angularly equidistant from each other and the base solar panels 310a, c. In this regard, and by way of example and not limitation, the angular displacement of first pivotable solar panel 310b from first base solar panel 310a, the center solar panel 310c from first pivotable solar panel 310b, the second pivotable solar panel 310d from the center solar panel 310c, and the second base solar panel 310e from the second pivotable solar panel 310d may be 45 degrees. Alternatively, the angular distance between each solar panel 310a-e may not need to be equidistant. It is also contemplated that the base solar panels 310a, e may be pivotable by the hinge mechanism 314 about the pivot axis 312, each being configured to rotate between 10 to 180 degrees relative to the horizontal frame 320. The deploying, folding, and operation of the solar panels 310a-c may be automated or be manual, as explained elsewhere herein. The automated deploying, folding, and operation of the solar panels 310a-e may be done by a computing system and be remote controlled, as explained elsewhere herein.

The base solar panels 310a, e may have one active side 324a, h and the pivotable solar panels 310b, d may have one or two active sides 324b, c, f, g or be transparent, as explained elsewhere herein. Similarly, the center solar panel 310c may have one or two active sides 324d, c by being a monofacial or a bifacial solar panel that may capture solar energy on both the front and back side of the center panel. By way of example and not limitation, the center solar panel 310c may have the two active sides 324d, e by using a manufactured bifacial solar panel or combining two one-sided solar panels as one to receive light from the front and back of the center panel. In another example, the center solar panel 310c may be a transparent solar panel, either fully transparent or semi-transparent.

By way of example and not limitation, the two base solar panels 310a, e may be of equal size in terms of panel length 316, panel width 318, and panel depth 326. By way of example and not limitation, the pivotable and center solar panels 310b, c, d may have the same length as the base solar panels 310a, c. By way of example and not limitation, the pivotable and center panels 310b, c, d may have a second panel width 318a that is shorter than the panel width 318 of the base solar panels 310a, e. By way of example and not limitation, the panel length 316 may be two to nine feet, the panel width 318 may be three to six feet, and the second panel width 318a may be two to four feet. By way of example and not limitation, the pivotable and center solar panels 310b, c, d may have a different panel length in substitution or in addition to different panel widths relative to the base solar panels 310a, c.

Since the solar platform 308 has pivotable and center solar panels 310b-d stacked in the same region as the base solar panels 310a, e, and some of the solar panels may be bifacial or transparent, the energy conversion density per unit area may increase. This may be because there are multiple solar panels occupying the same spatial area when compared to an ordinary flat solar panel. The clustering of multiple solar panels at different angles in the same spatial area may help the production of electric energy from solar energy by the solar platform 308. The pivotable and center solar panels 310b-d may also be pivoted in such spatial area to receive sunlight at incident solar radiation angle that may change at different times of day.

As shown in FIG. 6, the solar panels 310b-d may be traversed to a folded configuration. In the folded configuration, and by way of example and not limitation, the first pivotable solar panel 310b may be laid flat on the first base solar panel 310a. Also, the second pivotable solar panel 310d may be laid flat on the second base solar panel 310c. By way of example and not limitation, the center solar panel 310c may be pivoted and laid flat on either the first or second pivotable solar panel 310b, d. Since the pivotable and center solar panels 310b-d may have second panel widths 318a shorter than the panel widths 318 of the base solar panels 310a, e, portions of the base solar panels 310a, e may be exposed in the folded position. Such exposed portions may be part of the active sides 324a, h (see FIG. 5) of the base solar panels 310a, c. By way of example and not limitation, all of the pivotable and center solar panels 310b-d may be stacked on top of one base solar panel 310a, e. All the solar panels 310a-e may be stacked on top of each other in the folded position, where the base solar panels 310a, e would be the top and bottom panels in the folded orientation.

Referring now to FIG. 7, the second embodiment of the solar platform 308 (shown in FIG. 5-6) may be attached or integrated as a part of a top surface 72 of an automobile instead of being mounted to the frame 20. By way of example and not limitation, the solar platform 308 may be attached or integrated with a roof of an automobile, a cap, tonneau cover, or other vehicle structural components. The structural features and functions of the solar platform 308 may be the same as what has been described with respect to FIGS. 5-6 and described elsewhere herein. By way of example and not limitation, the solar panels 310a-e may each have one active side 324a, c, e, f, h for receiving solar energy on the top surface of each panel. By way of example and not limitation, the pivotable and center solar panels 310b-d may each have one to two active sides 324b-g for receiving solar energy on the front and back surfaces of each panel. Consequently, the solar platform 308 may have a total of five to eight active sides 324a-h for receiving solar energy. By way of example and not limitation, the solar platform 308 attached or integrated with the top surface 72 of the automobile may be deployed in the active position or folded while the vehicle is at a stop or in motion. By way of exampled and not limitation, the deploying and folding of the solar platform 308 may be executed based on logic computed by a computing system to provide best optimum orientations of the solar panels 310a-e, as described elsewhere herein. By way of example and not limitation, the computing system may be integral with the automobile or be part of the solar platform 308.

The solar platform 308 described with reference to FIG. 7 may be incorporated with different types of electric, hybrid, or regular internal combustion engine vehicles. Such vehicles may include trucks, vans, minivans, SUVs, semitrucks, buses, recreational vehicles, motorhomes, trailers, station wagons, hatchbacks, crossovers, sedans, coupes, compact automobiles, and other types of vehicles and automobiles. The solar platforms described with reference to FIG. 7 may also be incorporated with buildings, such as parking structures, homes, office buildings, stadiums, and other types of building structures.

With reference to FIGS. 8-18, the solar platform 8, 308 may refer to any of the embodiments and examples of the solar platforms discussed elsewhere herein. Moreover, the various embodiments and examples of the solar platform 8, 308 have been illustrated in terms of a cap for a truck in FIGS. 8-18. However, the solar platform 8, 308 described with reference to FIGS. 8-18 may be incorporated with different types of electric, hybrid, or regular internal combustion engine vehicles. Such vehicles may include trucks, vans, minivans, SUVs, semitrucks, buses, recreational vehicles, motorhomes, trailers, station wagons, hatchbacks, crossovers, sedans, coupes, compact automobiles, and other types of vehicles and automobiles. The solar platforms described herein may also be incorporated with buildings, such as parking structures, homes, office buildings, stadiums, and other types of building structures. More particularly, the various embodiments and examples of the solar platform 8, 308 may be integrated into a roof of the SUV, van, motor home, truck, semitruck, or any two to four door vehicle such that the solar platform 8, 308 becomes the roof or part of the roof. Additionally, the solar platform 8, 308 may make up a tonneau cover of a truck. Alternatively, the solar platform 8, 308 may be mounted to a frame which is attached to the roof of the SUV, van, motor home, semi truck, or any two to four door vehicle. The solar panels may be traversed between folded and deployed position while the vehicle, which the solar platform 8, 308 is attached or integrated, is in motion using an automated motorized mechanism, described elsewhere herein. The solar panels may be deployed in different orientations that create optimum contact between the active sides of the solar panels and the solar rays, which such optimization may be done by a computing device of the vehicle or the solar platform 8, 308 by taking into account different factors, such as the location, real-time weather pattern, and the time of day and year, as described elsewhere herein. Each solar panel may generate between 0.1 to 0.5 kWh of energy depending on the aforementioned factors. Each solar platform 8, 308 may supply from 1 kilowatt to 12 kilowatts to the vehicle depending on the type and number of panels and the location, real-time weather pattern, and the time of day and year. Different vehicles may have between 1 to 6 solar panels and possibly more if needed.

Figure 8:
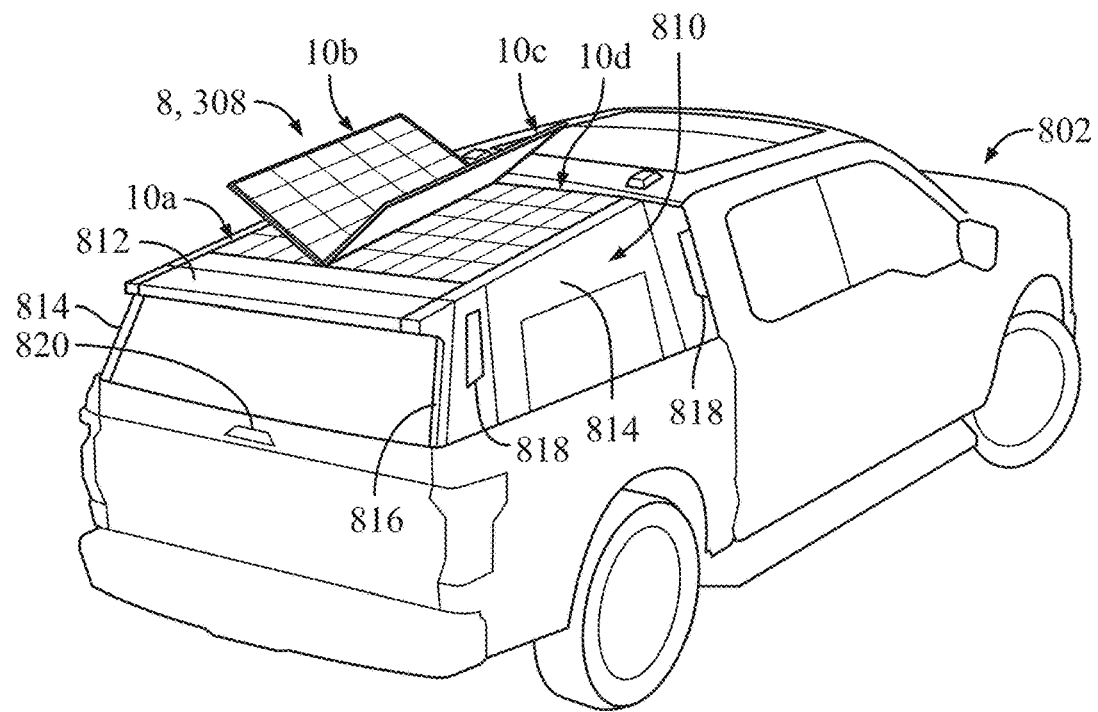
FIG. 8 shows a first rear perspective view of a truck having a cap with a solar platform.
Figure 9:
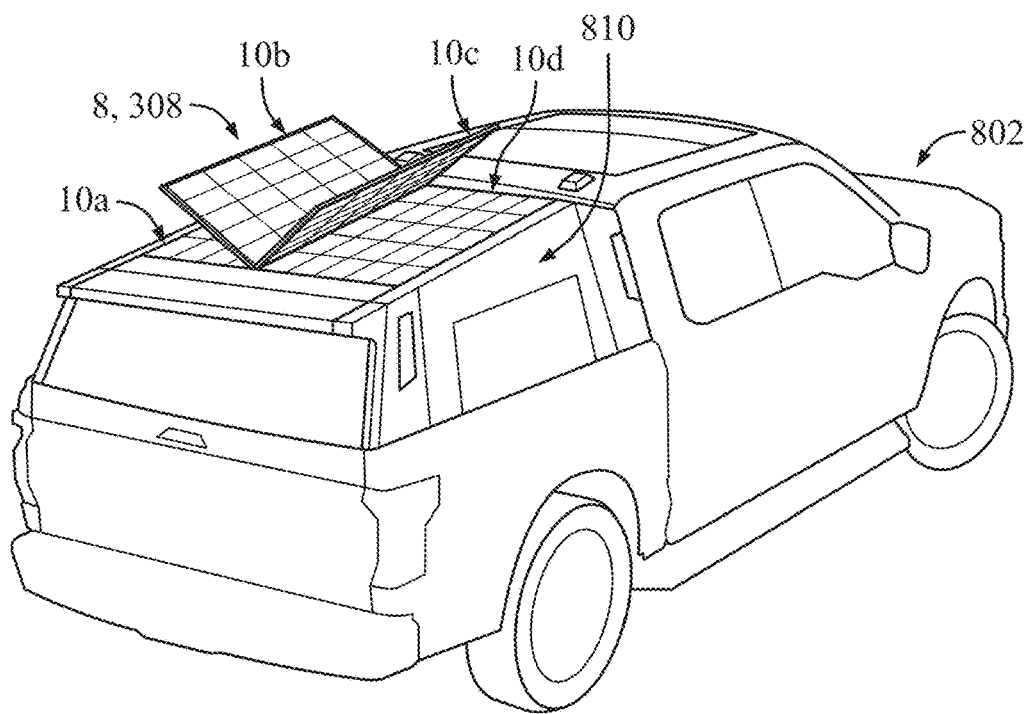
FIG. 9 shows a second rear perspective view of a truck having a cap with a solar platform.

Referring specifically now to FIGS. 8-9, rear perspective views of a truck 802 having a cap 810 with a solar platform 8, 308 is shown. The solar platform 8, 308 may be integrated into a cap 810 (e.g., cab height camper shell, above cab height camper shell, tonneau cover) of a truck 802. The cap 810 may have a frame body with a cap roof 812 between side frames 814 and a rear cap portion 816. By way of example and not limitation, the cap 810 may have a rectangular shape or, in the case of a TESLA CYBERTRUCK, may have a trapezoidal shape. By way of example and not limitation, the side frames 814 may have ventilation openings 818 and one or more windows. By way of example and not limitation, the rear cap portion 816 may have one or more windows and a cap door 820 that may be opened and closed to access inside the cap 810 and the truck bed.

The solar platform 8, 308 may be integrated with the cap roof 812 instead of being mounted on top of the cap roof 812. As such, the solar panels 10a-d, specifically the base solar panels 10a, d, may form part of the enclosure of the cap 810, specifically part of or the entire cap roof 812. FIGS. 8 and 9 show different examples of the first embodiment of the solar platform 8 with different active sides. However, the other embodiments and examples of the solar platform, described elsewhere herein, may be integrated with the cap roof 812 instead. The integrated solar platform 8, 308 may be deployed and folded while the truck 802 is at a stop or in motion using the mechanisms described elsewhere herein. Although the pivotable solar panels 10b, c are shown as pivoting about an axis running along the length of the cap 810 and the truck bed, the orientation of the solar platform 8, 308 may be shifted by 90-degrees where the pivotable solar panels 10b, c pivot along an axis extending along the width of the cap 810 and the truck bed.

Figure 10:
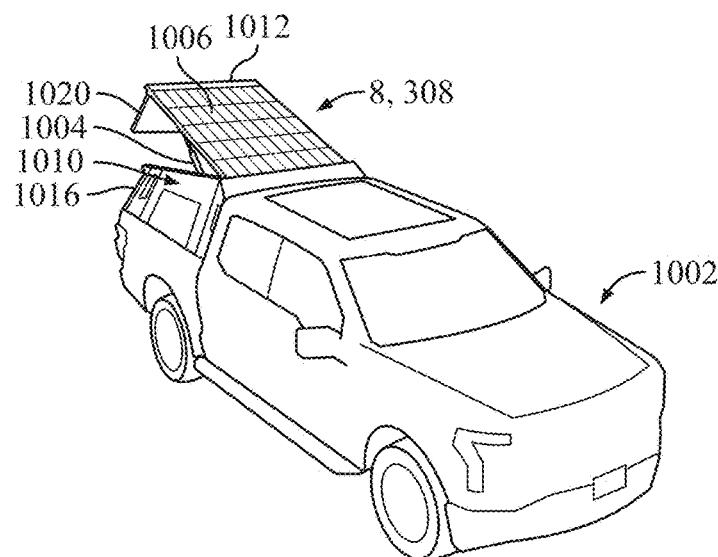
FIG. 10 shows a front perspective view of a truck having a cap with a solar platform.
Figure 11:
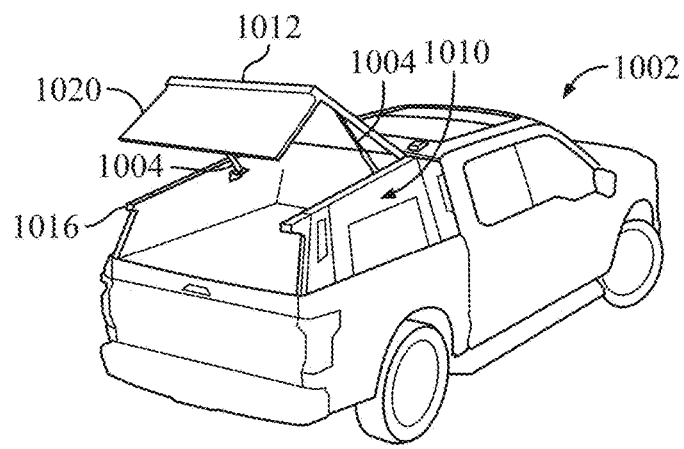
FIG. 11 shows a third rear perspective view of a truck having a cap with a solar platform.
Figure 12:
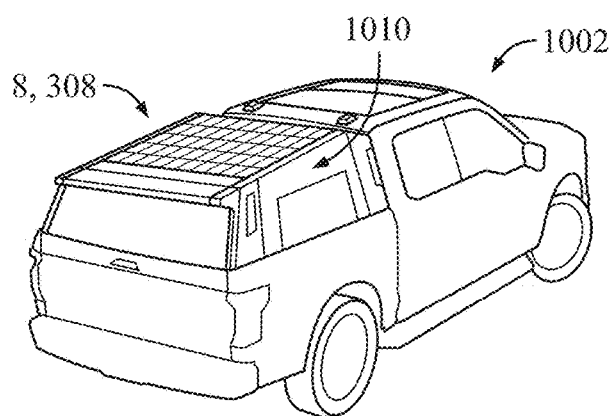
FIG. 12 shows a fourth rear perspective view of a truck having a cap with a solar platform.

Referring specifically now to FIGS. 10-12, a solar platform 8, 308 having only one flat panel 1006 is shown being integrated into another example of a cap 1010 of the truck 1002. By way of example and not limitation, the one flat solar panel 1006 may be integrated and make up the majority or all of the cap roof 1012. Alternatively, the flat solar panel 1006 may be mounted to the cap roof 1012. By way of example and not limitation, the cap door 1020 of the rear cap portion 1016 along with the cap roof 1012, which has the solar platform 8, 308 integrated therewith, may all lift up in an open position. By way of example and not limitation, the open position may be accomplished by the usage of one or more struts 1004 that lift up the cap door 1020 and the cap roof 1012. By way of example and not limitation, the struts 1004 may be in the form of a gas spring strut. Although FIGS. 10-12 show one flat solar panel 1006, it is also contemplated that the one flat solar panel 1006 may be a plurality of solar panels, such as the other embodiments of solar platforms 8, 308 shown in the other figures and have the features and functions thereof.

Figure 13:
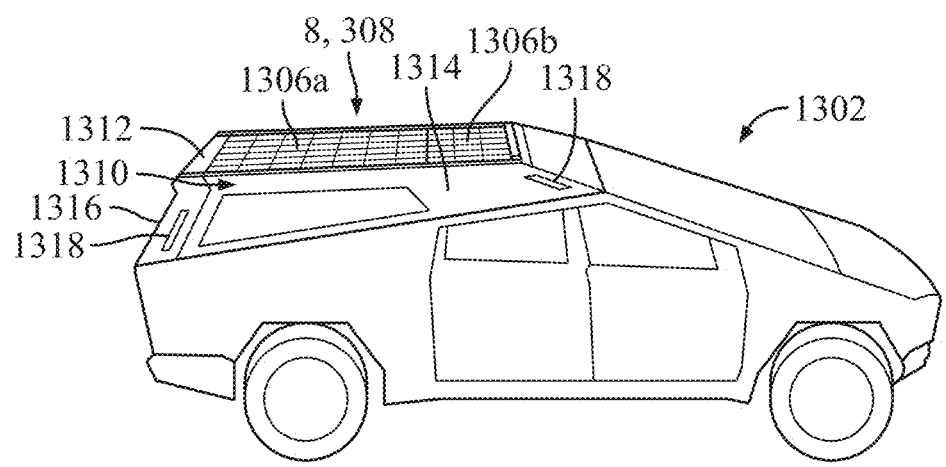
FIG. 13 shows a first side view of a TESLA CYBERTRUCK having a cap with a solar platform.
Figure 14:
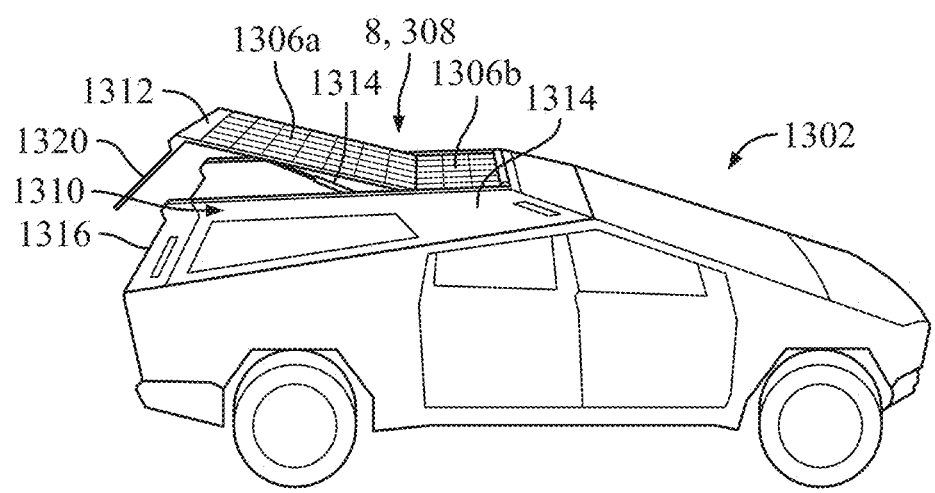
FIG. 14 shows a second side view of a TESLA CYBERTRUCK having a cap with a solar platform.
Figure 15:
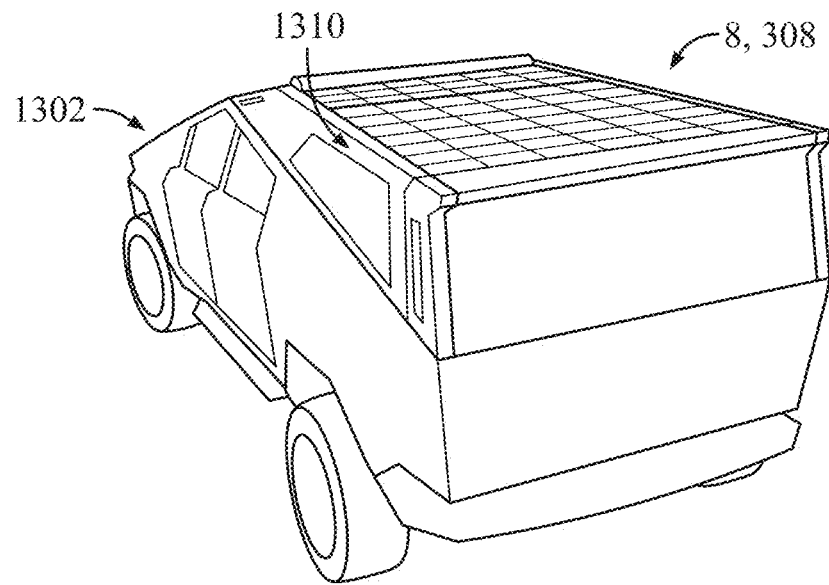
FIG. 15 shows a first rear perspective view of a TESLA CYBERTRUCK having a cap with a solar platform.
Figure 16:
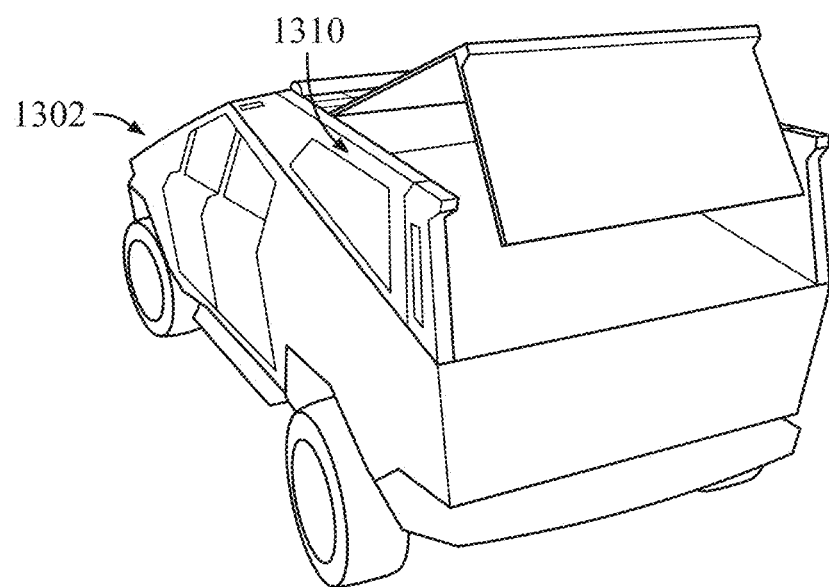
FIG. 16 shows a second rear perspective view of a TESLA CYBERTRUCK having a cap with a solar platform.
Figure 17:
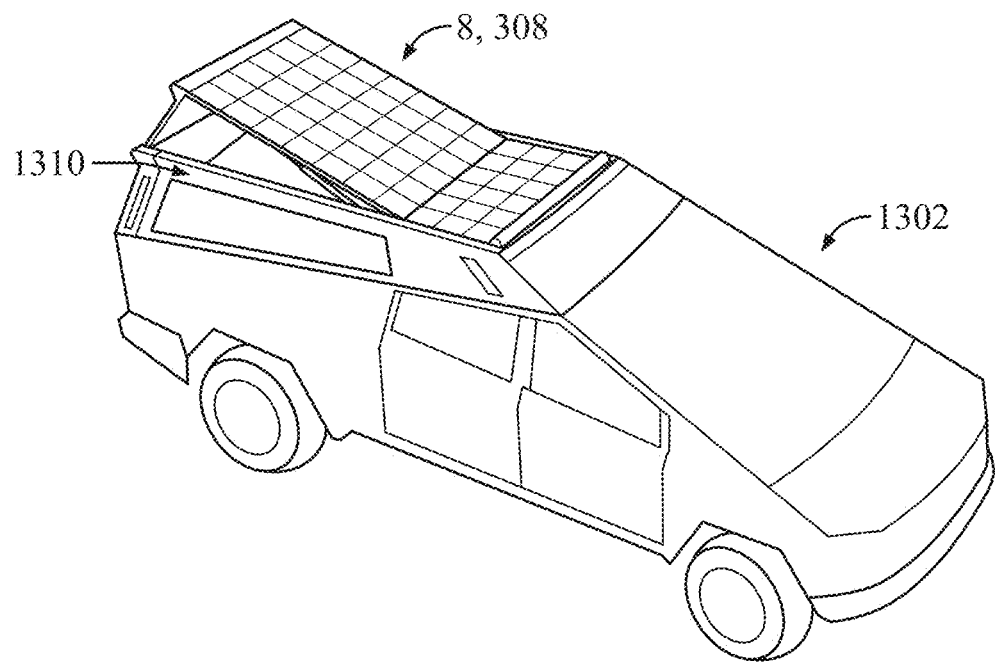
FIG. 17 shows a first perspective view of a TESLA CYBERTRUCK having a cap with a solar platform.
Figure 18:
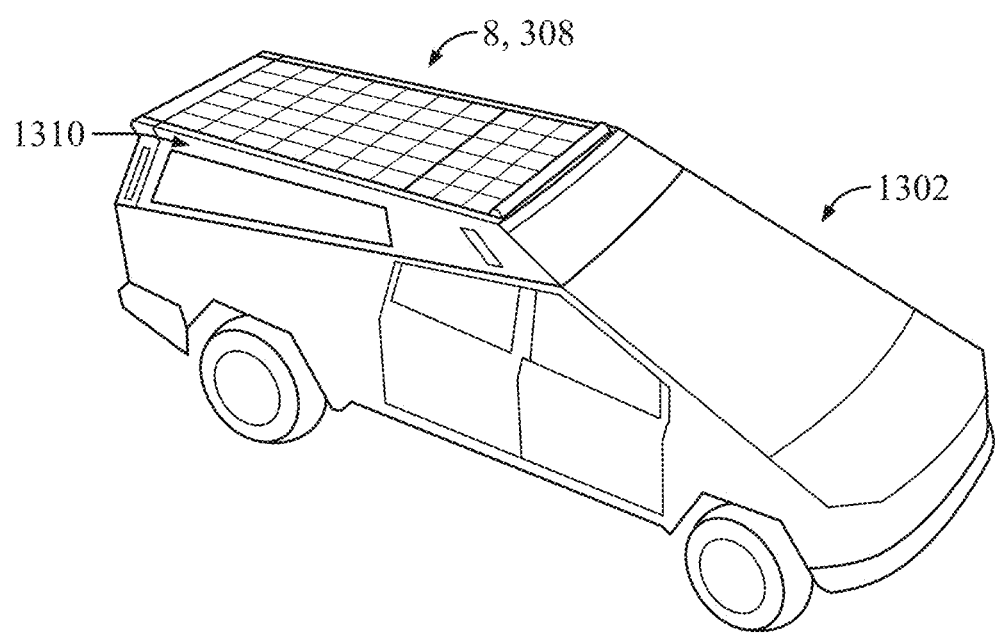
FIG. 18 shows a second perspective view of a TESLA CYBERTRUCK having a cap with a solar platform.

Referring specifically now to FIGS. 13-14, a solar platform 8, 308 having flat panels 1306a, b being integrated into a cap roof 1312 of a TESLA CYBERTRUCK 1302 is shown. As shown in FIG. 14, and by way of example and not limitation, a first flat solar panel 1306a may lift up with the cap door 1320 in an open position while the second flat solar panel 1306b may remain horizontal. The flat panels 1306a, b may form the enclosure of the cap 1310, specifically part of or the whole cap roof 1312. Alternatively, the flat solar panels 1306a, b may be mounted to the cap 1310.

The cap 1310 of the TESLA CYBERTRUCK 1302 may have a frame body with a cap roof 1312 between the side frames 1314 and the rear cap portion 1316 of the frame body. Since the cap 1310 is designed to be installed on top of a TESLA CYBERTRUCK 1302 truck bed, the side frames 1314 may have lower edges that incline downwards towards the rear cap portion 1316 to align with the inclined side panels of the TESLA CYBERTRUCK 1302 truck bed.

Consequently, the cap 1310 frame body may be trapezoidal shaped. By way of example and not limitation, the side frames 1314 may have ventilation openings 1318 and one or more windows. By way of example and not limitation, the rear cap portion 1316 may have one or more windows and a cap door 1320 that may be opened and closed to access inside of the cap 1310 and the truck bed.

By way of example and not limitation, the first and second flat solar panels 1306a, b may be positioned adjacent to each other and extend along the majority of the longitudinal length of the cap roof 1312, and possibly the whole length. By way of example and not limitation, the first flat solar panel 1306a may be two to four times the length of the second flat solar panel 1306b but have the same width. By way of example and not limitation, the cap door 1320 of the rear cap portion 1316 along with the first flat solar panel 1306a integrated with the cap roof 1312 may lift up while the second flat solar panel 1306b remains horizontal, as shown in FIG. 14. By way of example and not limitation, the open lifted position may be accomplished by the usage of one or more struts 1304, as describe elsewhere herein. Although FIGS. 13-14 illustrate the usage of flat solar panels 1306a, b, it is also contemplated that such solar panels, specifically the first flat solar panel 1306a, may be replaced by the plurality of solar panels of the other embodiments of the solar platforms 8, 308 described elsewhere herein. The first and second embodiments of the solar platforms 8, 308, and other embodiments and examples, may be integrated into the cap 1310 of the TESLA CYBERTRUCK 1302. Additionally, FIGS. 15-18 show the CYBERTRUCK 1302 having the cap 1310 in different views, angles, and orientations.

Figure 19A:
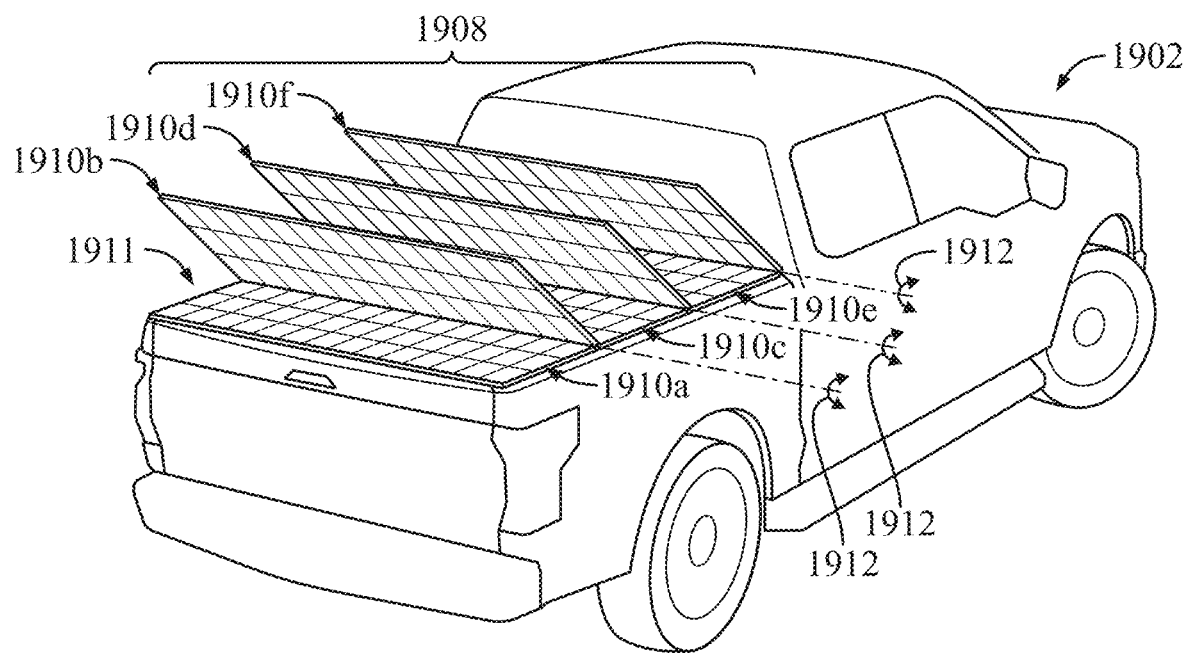
FIGS. 19A-B show first rear perspective views of different trucks having tonneau covers with a third embodiment of a solar platform in a deployed position.
Figure 19B:
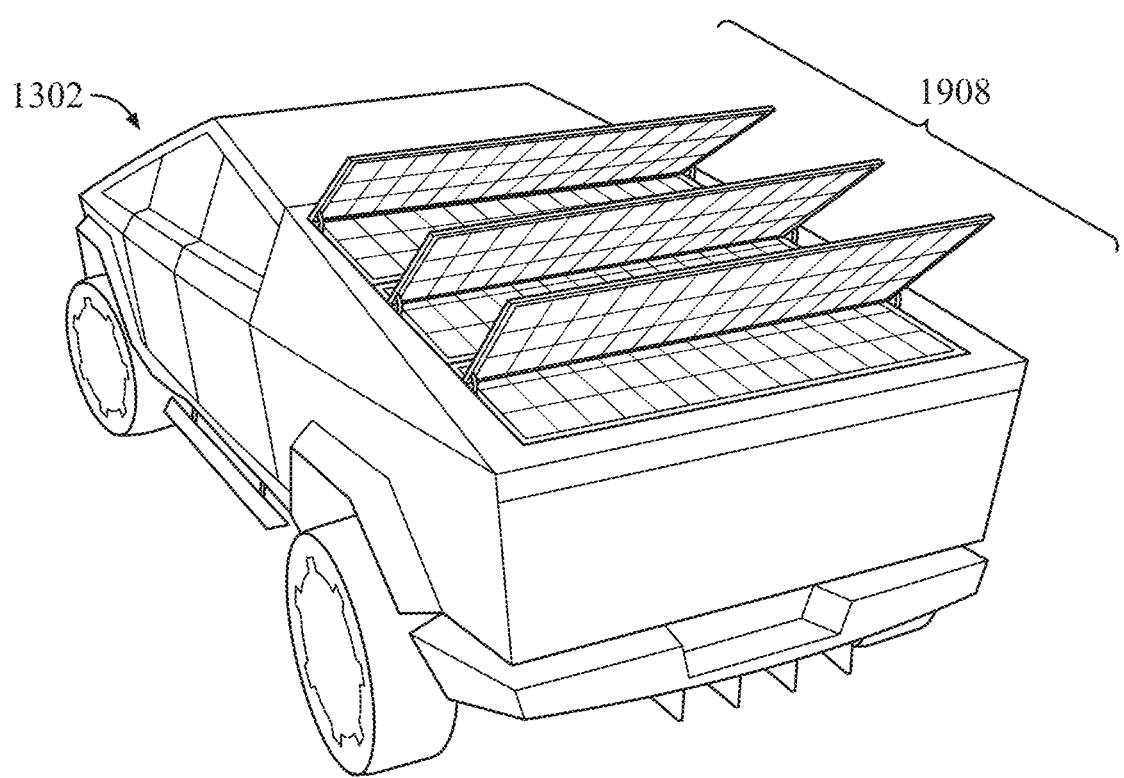
Figure 20A:
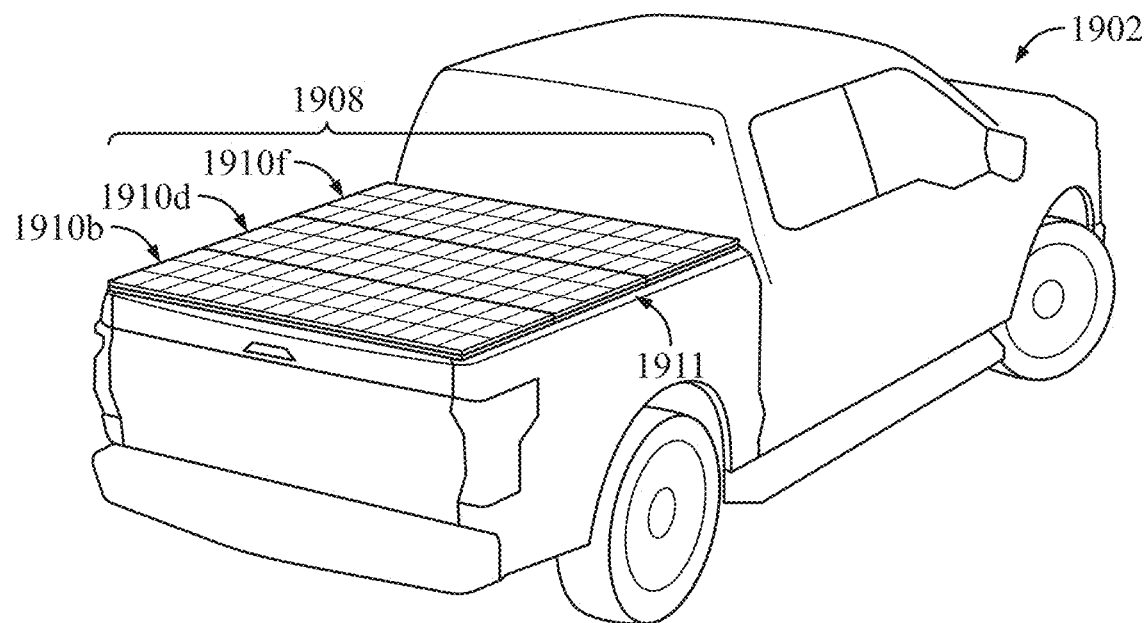
FIGS. 20A-B show second rear perspective views of different trucks having tonneau covers with the third embodiment of the solar platform in a folded position.
Figure 20B:
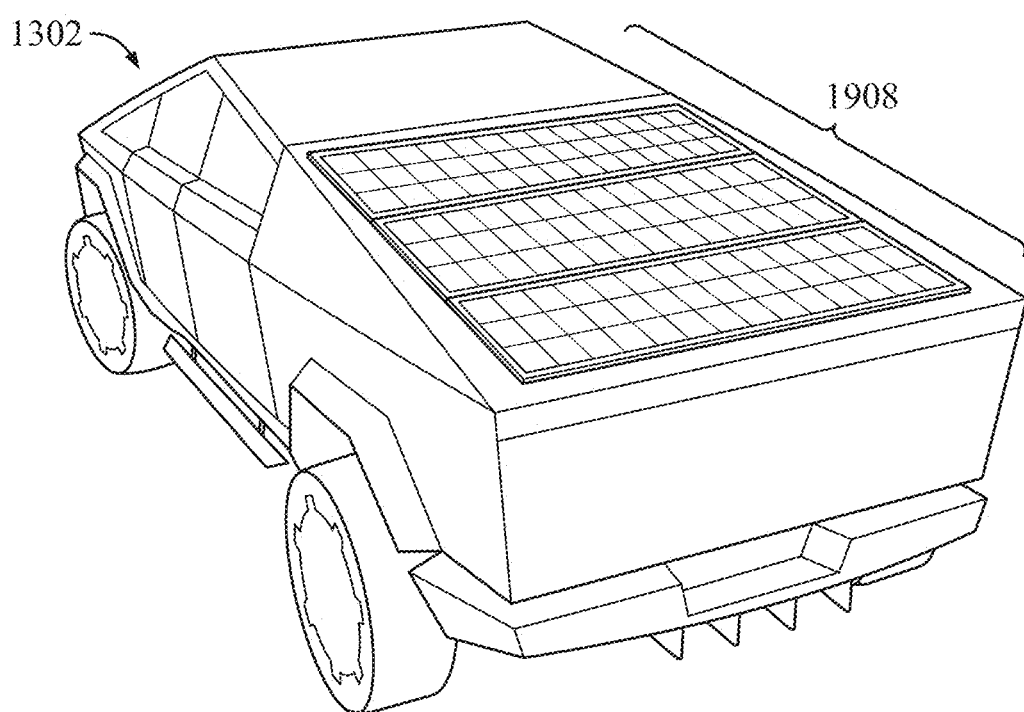

Referring now to FIGS. 19A and 20A, a third embodiment of the solar platform 1908 that may be mounted to a tonneau cover 1911 or may be integrated to form the structural panels of the tonneau cover 1911 is shown. As shown in FIG. 19A, the solar platform 1908 may have a plurality of pivotable solar panels 1910b, d, f that are designed to be deployed at an angle relative to a plurality of base solar panels 1910a, c, c. As shown in FIG. 20A, the pivotable solar panels 1910b, d, f may each also be folded on top of the base solar panels 1910a, c, c. By way of example and not limitation, the pivotable solar panels 1910b, d, f may alternate with the base solar panels 1910a, c, c along the length of the tonneau cover 1922. By way of example and not limitation, the tonneau cover 1911 may have three to five base solar panels 1910a, c, e and three to five pivotable solar panels 1910b, d, f mounted or integrated to the tonneau cover 1911. The first pivotable solar panel 1910b may be between the first and second base solar panels 1910a, c, the second pivotable solar panel 1910d may be between the second and third base solar panels 1910c, e, and the third pivotable solar panel 1910f may be between the third base solar panel 1910c and the end of the truck bed. The base solar panels 1910a, c, e may lie flat on the horizontal surface of the tonneau cover 1911 and the pivotable solar panels 1910b, d, f may each pivot about a pivot axis 1912 extending along the width of the truck 1902 from one side panel to the other side panel of the truck bed. FIGS. 19B and 20B show the third embodiment of the solar platform 1908 used with a TESLA CYBERTRUCK.

Referring back to FIG. 19A, and by way of example and not limitation, the orientation of the solar platform 1908 may be shifted by 90-degrees where the pivotable solar panels 1910b, d, f rotate along an axis extending along the length of the truck bed rather than the width of the truck bed. It is contemplated that the solar platform 1908 may be shifted by 180-degrees also. By way of example and not limitation, the pivotable solar panels 1910b, d, f may each rotate about their corresponding pivot axis 1912 between 0 to 90 degrees relative to the base solar panels 1910a, c, c, preferably between 30 to 60 degrees. In a preferred example, each pivotable solar panel 1910b, d, f may be pivoted in a deployed position at a 45 degree angle.

Since the solar platform 1908 has pivotable solar panels 1910b, d, f stacked in the same region as the base solar panels 1910a, c, e the pivotable solar panels 1910b, d, f may be bifacial or transparent, the energy conversion density per unit area may increase. This may be because there are multiple solar panels occupying the same spatial area when compared to an ordinary flat solar panel. The clustering of multiple solar panels at different angles in the same spatial area may help the production of electric energy from solar energy by the solar platform 1908. The pivotable solar panels 1910b, d, f may also be pivoted in such spatial area to receive sunlight at incident solar radiation angle that may change at different times of day.

The pivotable solar panels 1910b, d, f may be manually deployed and folded, as described elsewhere herein. By way of example and not limitation, the pivotable solar panels 1910b, d, f may be spring biased to the deployed position shown in FIG. 19A. The pivotable solar panels 1910b, d, f may be pushed down by hand and locked in place with a fastening mechanism that is traversed automatically as soon as the panels are pushed down to the stored position as shown in FIG. 20A. Alternatively, the pivotable solar panels 1910b, d, f may be deployed and folded using an automated motorized mechanism, as described elsewhere herein. By way of example and not limitation, the automated motorized mechanism may be connected to a computing system and actuated based on a set of factors, as described elsewhere herein. By way of example and not limitation, the computing system may be integrated with the vehicle or be part of the solar platform.

Figure 21:
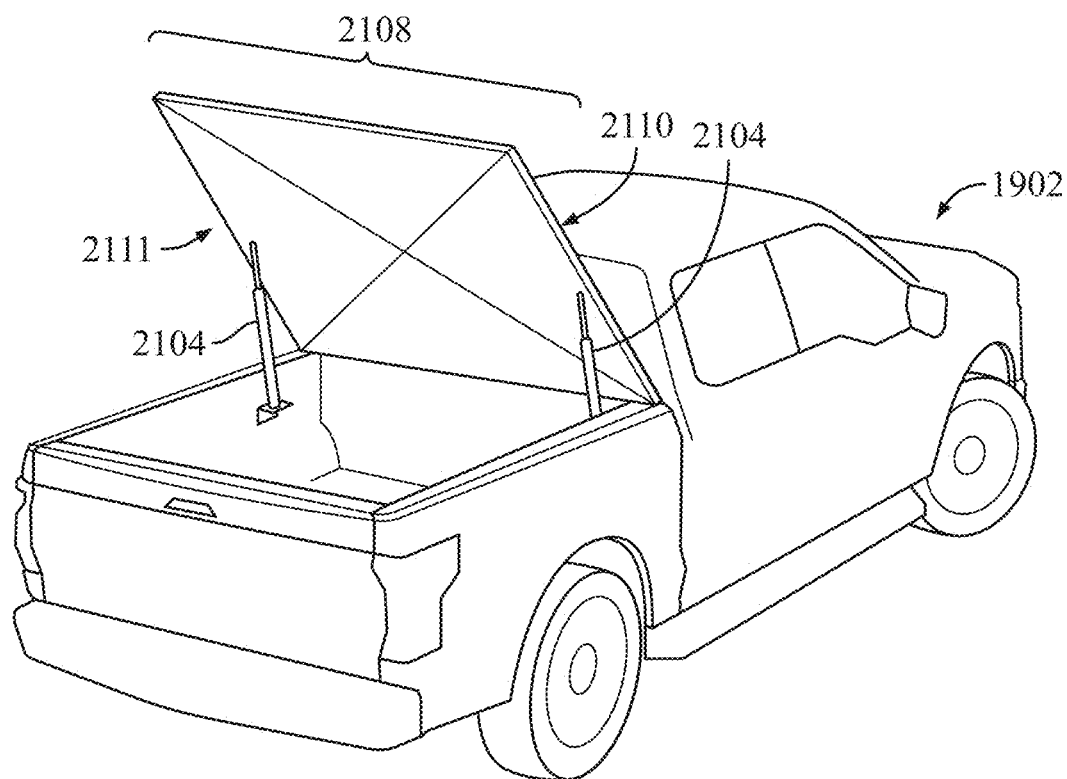
FIG. 21 shows a third rear perspective view of a truck having a tonneau cover with a solar platform in an open position.
Figure 22:
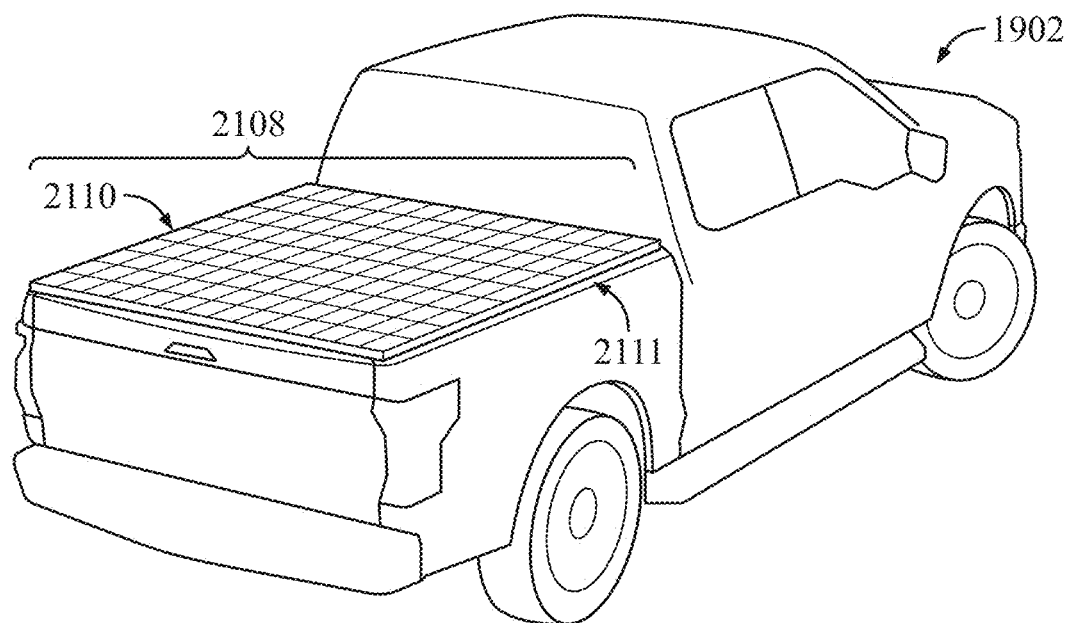
FIG. 22 shows a fourth rear perspective view of a truck having a tonneau cover with a solar platform in a closed position.
Figure 23:
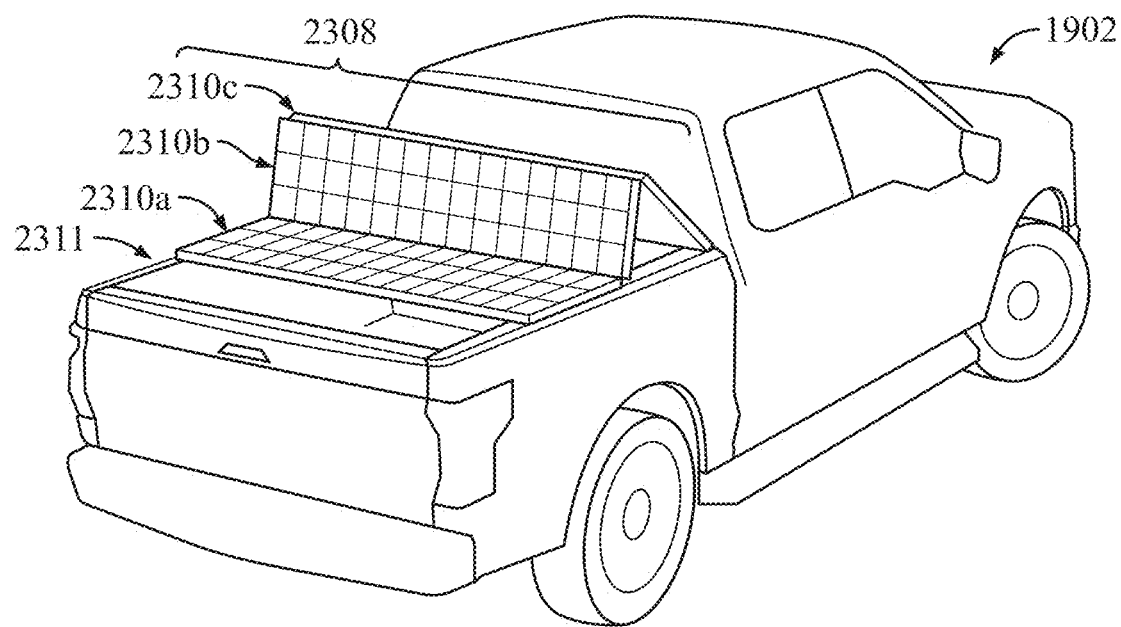
FIG. 23 shows a fifth rear perspective view of a truck having a tonneau cover with a solar platform in a semi retracted position.
Figure 24:
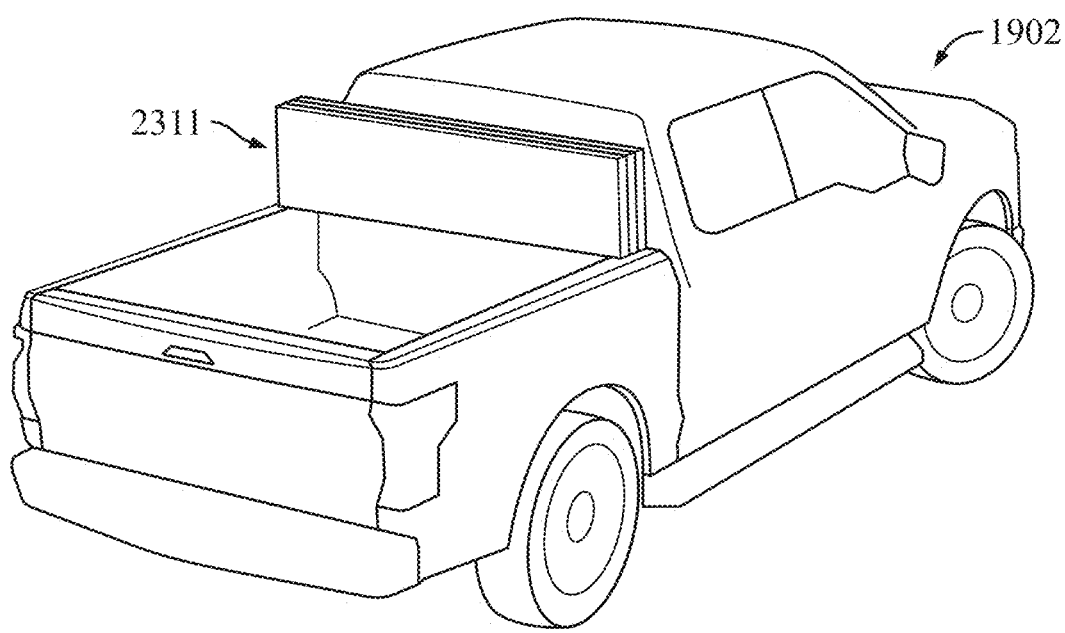
FIG. 24 shows a sixth rear perspective view of a truck having a tonneau cover with a solar platform in a retracted position.

By way of example and not limitation, the inside of the truck bed may be accessed by raising the tonneau cover 1911 having the solar platform 1908 using one or more struts 1204 similar to what is shown in FIG. 21. The struts 1204 may have the same features as described elsewhere herein. Alternatively, the tonneau cover 1911 having the solar platform 1908 may be a tri-fold tonneau cover that may be folded similar to what is seen in FIGS. 23-24. By way of example and not limitation, each pair of base and pivotable solar panels 1910a-f (see FIG. 19A) may form one foldable part of the tri-fold tonneau cover.

The base solar panels 1910a, c, e may each have active sides extending outwards away from the truck bed with a plurality of solar cells to receive solar energy and radiation. Each of the pivotable solar panels 1910b, d, f may be monofacial, having one active side, or bifacial, having two active sides with a plurality of solar cells. By way of example and not limitation, the pivotable solar panels 1910b, d, f may each have an active side on the top surface of the panels that face opposite from the base solar panels 1910a, c, e when in a folded position (see FIG. 20A). The pivotable solar panels 1910b, d, f may each have an additional active side on the bottom surface of the panels that face the base solar panels 1910a, c, e when in a folded position. In another example, the pivotable solar panels 1910b, d, f may be transparent, either fully transparent or semi-transparent solar panels.

Referring now to FIG. 21, the solar platform 2108 may be one flat solar panel 2110 mounted to a tonneau cover 2111 or may be integrated to form the structural panels of the tonneau cover 2111. The one flat solar panel 2110 may serve as an enclosure covering the truck bed while also receiving solar energy and generating electricity. Alternatively, the one flat solar panel may be a plurality of flat solar panels 2110a-c that may be mounted to a tonneau cover 2111 or may be integrated to form the structural panels of the tonneau cover 2111. By way of example and not limitation, three to nine flat solar panels having an active side facing outwards and extending across the width of the truck bed may be implemented. By way of example and not limitation, and as shown in FIG. 21, the tonneau cover 2111 having the integrated solar platform 2108 may be lifted to an open position using one or more struts 2104 to access the inside of the truck bed. The struts 2104 may have the same features described elsewhere herein.

Referring now to FIGS. 23-24 the solar platform 2308 may be integrated to form the structural panels of a tri-fold tonneau cover. Each flat solar panel 2310a-c may extend across the width of the truck bed and form one foldable part of the tri-fold tonneau cover. FIG. 23 shows the tonneau cover 2311 as it is traversed between the deployed position and the retracted configuration shown in FIG. 24.

The solar platform described with reference to FIGS. 19-24, specifically FIGS. 19A-B, may be incorporated with different types of electric, hybrid, or regular internal combustion engine vehicles. Such vehicles may include trucks, vans, minivans, SUVs, semitrucks, buses, recreational vehicles, motorhomes, trailers, station wagons, hatchbacks, crossovers, sedans, coupes, compact automobiles, and other types of vehicles and automobiles. The solar platforms described with respect to FIGS. 19-24, specifically FIGS. 19A-B, may also be incorporated with buildings, such as parking structures, homes, office buildings, stadiums, and other types of building structures.

Figure 25:
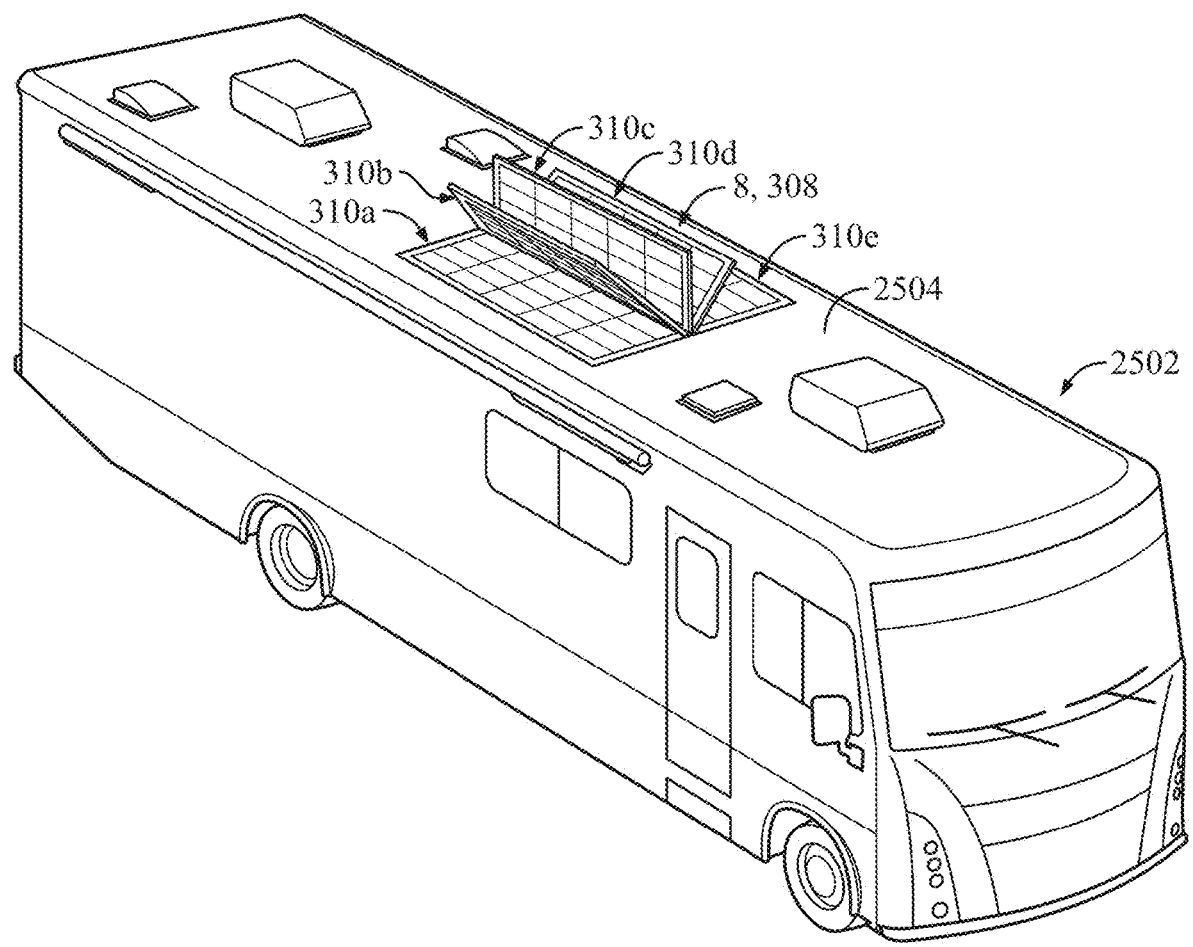
FIG. 25 shows a perspective view of a recreational vehicle with a solar platform.
Figure 26:
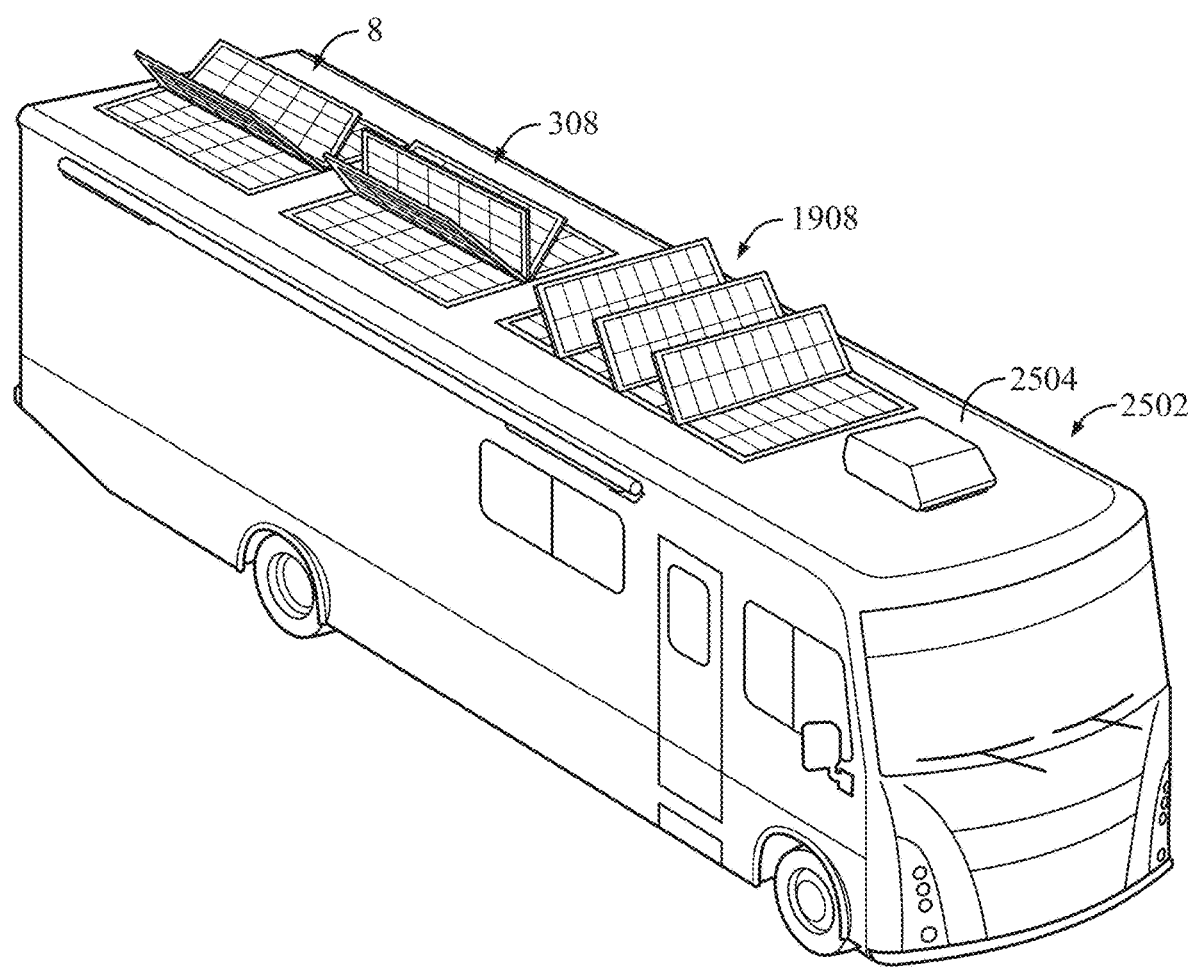
FIG. 26 shows a second perspective view of a recreational vehicle with multiple solar platforms.

Referring now to FIG. 25, a perspective view of a recreational vehicle 2502 with a solar platform 8, 308 is shown. By way of example and not limitation, the recreational vehicle 2502 may be a motorhome, which such motorhome may be manufactured by companies such as WINNEBAGO. By way of example and not limitation, the solar platform 8, 308 may be integrated or attached to the roof 2504 of the recreational vehicle 2502. The solar platform 8, 308 may be any of the embodiments and examples described elsewhere herein. With reference to FIG. 26, multiple solar platforms 8, 308, 1908 may be attached or integrated with the roof 2504 of the recreational vehicle 2502. Consequently, more electrical energy may be generated for the recreational vehicle.

Figure 27:
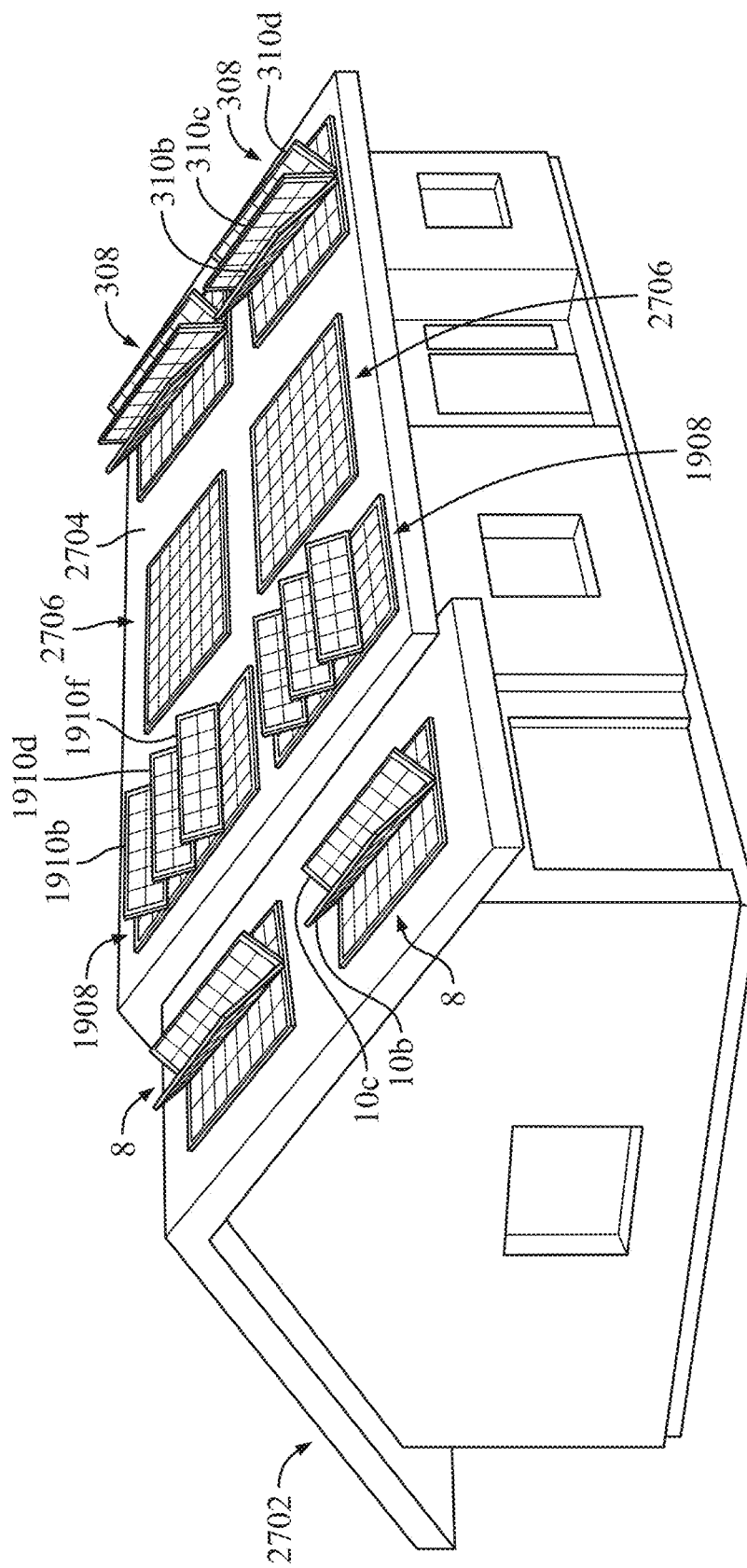
FIG. 27 shows a perspective view of a house with multiple solar platforms.
Figure 28:
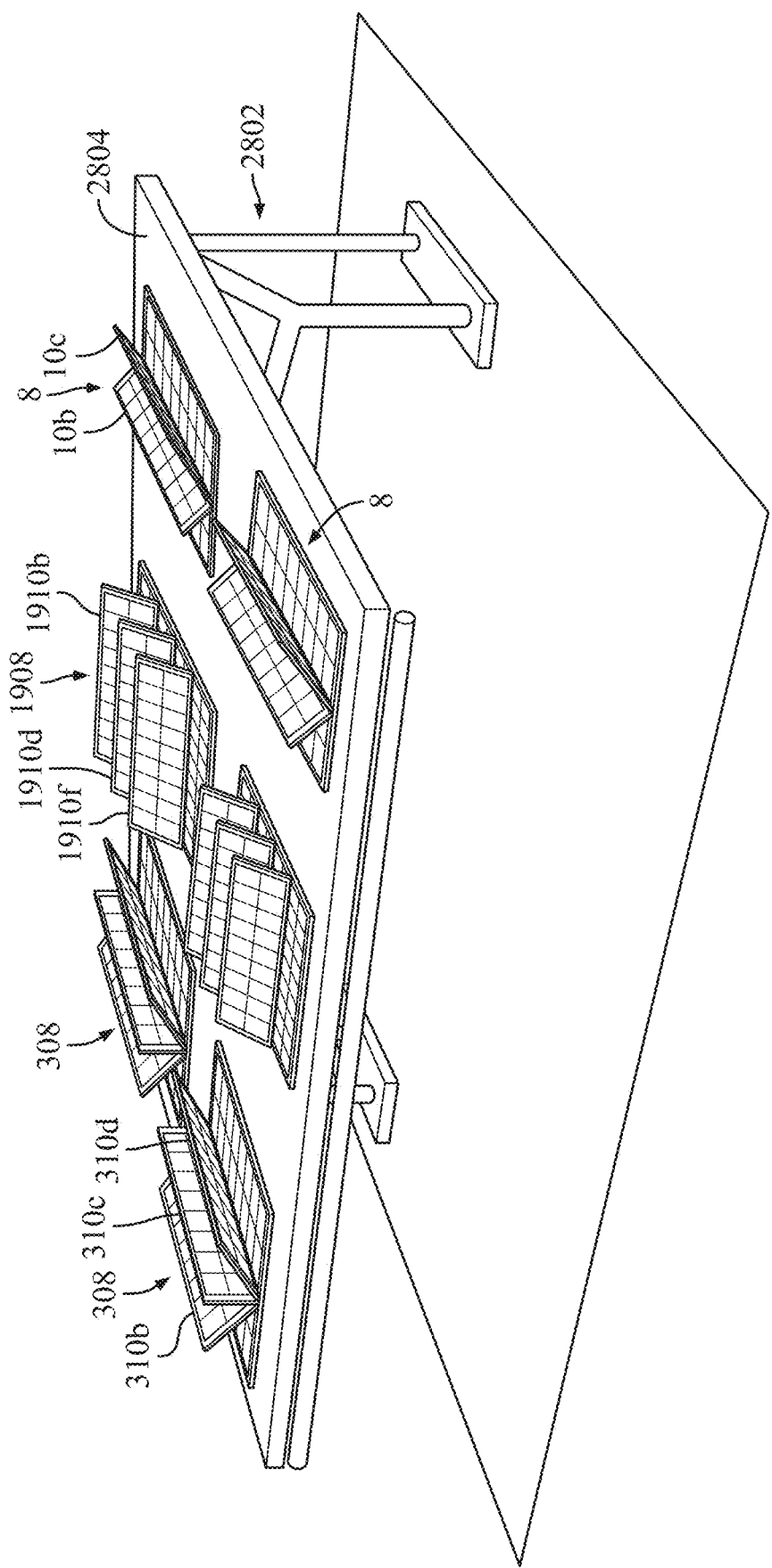
FIG. 28 shows a perspective view of a parking structure with multiple solar platforms.

With reference to FIGS. 26 and 27, one or more embodiments and examples of solar platforms 8, 308, 1908 described elsewhere herein may be attached or integrated with a roof 2704 of a house 2702 or a roof 2 904 of a parking structure 2802. The different embodiments of the solar platforms 8, 308, 1908 may be orientated differently on the roofs 2704, 2 904 such that the pivotable solar panels may be actuated in different angular orientations to face the sun at optimum angles throughout the day. By way of example and not limitation, the actuation of the pivotable solar panels to different angles may be motorized and be done with a remote control. By way of example and not limitation, a computing system may change the angular orientation of the solar panels, particularly the pivotable solar panels, based on the time of year (i.e., the current month or season), the time of the day, the real-time weather pattern, and the location of the solar platform 8, 308, 1908 so that the solar panels may be positioned at optimum light receiving orientations. By way of example and not limitation, the computing system may pivot the solar panels at different angles throughout the day such that the solar panels are at optimum angles relative to the radiation of the sun. By way of example and not limitation, the computing system may also be designed to calibrate for the optimum angles of the pivotable solar panels throughout the day. The computing system may test different angle orientations of the pivotable solar panels at a certain time of day to determine which angle would provide optimum angle for the incident solar radiation and maximizing electricity generation at such time of day. When the computing system determines the optimum angle through the calibration, the solar panels may be orientated to such angle in the next day and the short-term future. As shown in FIG. 27, conventional flat solar panels 2706 may be used in conjunction with the solar platforms 8, 308, 1908.

The remote control discussed herein may be a separate and detachable hand held remote control. The remote control may have a transmitter for transmitting a signal to a receiver which controls a motor for pivoting the panels. The remote control may also have a receiver for receiving data from sensors attached to the solar platform to display data sensed by the sensors on the solar platform. Alternatively, the remote control may be a push button or touch button on a touch screen. The touch screen may be within a cab of the vehicle on which the solar platform is mounted. As a further alternative, the remote control may be provided in a form of a software downloadable mobile application. In this manner, the user can control the solar platform with their mobile phone.

The solar platform may have sensors mounted thereon. The sensors may feed sensed data into a processor for pivoting the solar panels. By way of example and not limitation, the sensor may be a light sensor attached to an active side of the solar panel. The active side of the solar panel may be a side of the solar panel on which solar cells are located for receiving the sunlight. The light sensor collects data as to the amount of light being shined upon the active side of the solar panel. Each of the light sensors sends light intensity data to a processor. The processor calculates the amount of estimated collected light on each of active sides of the solar panels. The processor can send a signal to a motor which pivots the solar panels pivotably attached to the base solar panel. The pivotable solar panels may be incrementally pivoted (e.g., 0.25 degree to 5 degree increments within its pivot range) to determine which pivot angle of the pivotable solar panels generates the most electricity or greatest electricity. The base solar panel may have a light sensor for detecting the amount of sunlight it receives. The light sensor feeds the its sensed data into the processor along with the pivot angle. Based on this data, the processor determines the optimal angle of the of the panels for generating electricity and the solar panels are pivoted to that pivot angle. The pivoting can be performed manually by hand with a hand crank or the solar panels may be motorized and the processor may send a signal to the motors to pivot the solar panels to the optimal pivot angle.

The vehicle on which the solar platform is mounted may have a forward facing sensor to detect overhead obstacles while the vehicle is moving forward. When the forward facing sensor detects an overhead obstacles that might hit and break the solar panel(s), the forward sensing sensor may send a signal to the processor. The processor may send a signal to the motor to pivot the solar panels downward to lower an overall height of the solar panels to avoid hitting the overhead obstacle.

The solar platform may have an anti theft sensor. For example, if electricity is not being generated, the processor of the solar platform may send a signal to the software application on the user's smartphone to indicate that there might be a theft occurring.

The processor of the solar platform and the application on the user's smartphone can be synced to each other. In this way, the application on the user's smartphone can manage all electrical controls of the solar platform including but not limited to current flow, current generated from each of the solar platforms, current generated compared to light intensity sensed by the light sensor, battery charge levels (e.g., percent charged, percent remaining).

Figure 35:
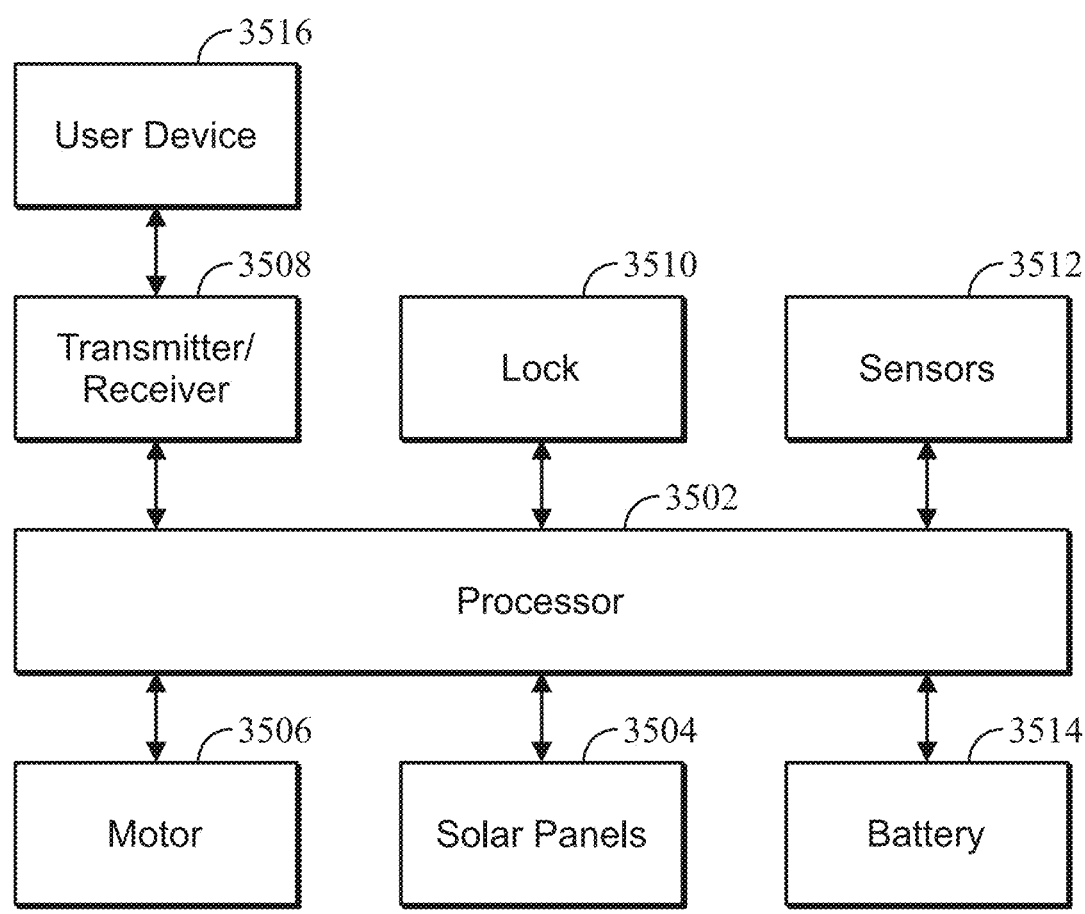
FIG. 35 a block diagram of some of the electrical and mechanical components of the solar platform and their relation is shown.

With respect to the aforementioned features of the solar platform, and referring now to FIG. 35, a block diagram of some of the the electrical and mechanical components of the solar platform and their relation is shown. FIG. 35 is mainly concerned with the electrical relations of the components of the solar platform and may not necessarily represent how the components are mechanically related. As shown in FIG. 35, a user device 3516, which may be separate and external from the solar platform, may be in communication with a transmitter and receiver 3508 of the solar platform. By way of example and not limitation, the user device 3516 may be a mobile device, such as a smartphone. By way of example and not limitation, the user device 3516 may be the remote described elsewhere herein. By way of example and not limitation, the user device 3516 may be a user interface on a dashboard of a vehicle. By way of example and not limitation, the user device 3516 may be connected to the transmitter and receiver 3508 of the solar platform via Bluetooth technology, WI-FI, or be hardwired to the transmitter and receiver 3508 of the solar platform. By way of example and not limitation, an application may be downloaded onto the user device 3516, which may be a smartphone, and the application may be in communication with the solar platform to control the electrical and mechanical components of the platform. For example, the solar platform may have a plurality of sensors 3512 that measure different variables pertaining to the operation of the platform. The processor 3502 of the solar platform may relay such measurements done by the sensors 3512 to the user device 3516 via the usage of the downloaded application on user device. The user may then use the application to send different commands in a form of signals to the solar platform to operate and actuate different components of said platform.

By way of example and not limitation, the user device 3516 may have a transmitter and receiver component to communicate with the transmitter and receiver 3508 of the solar platform and send command signals to the platform. The command signal sent by the user device 3516 to the receiver 3508 may be relayed to the processor 3502 to execute the actuation of the motor 3506 that is mechanically coupled to the solar panels 3504, specifically the pivotable and center solar panels, to rotate such panels at desired angular orientations, such as a deployed or folded orientation. By way of example and not limitation, the command signal sent to the motor 3506 may cause the motor to pivot each of the pivotable solar panels between 10 to 90 degrees relative to the base solar panels, preferably 15, 30, 45, or 60 degrees. Alternatively, the motor 3506 of the solar platform may be actuated automatically based on time and weather patterns, as described elsewhere herein, instead of receiving a command signal from a user device.

The solar platform may have different sensors 3512 incorporated therewith. By way of example and not limitation, there may exist sensors 3512 attached to the solar platform for measuring current flow, mapping current flow from each of the solar panels, and current generated versus measured light intensity from a light sensor. Each solar panel 3504 of the solar platform may have a current sensor that measures the current generated by that specific solar panel, and such information from each solar panel may be provided and displayed to the user via the downloaded application on the user device 3516. As described elsewhere herein, the user device 3516 may be in communication with the processor 3502 and sensors 3512 via the transmitter and receiver 3508 of the solar platform.

By way of example and not limitation, the solar platform may have one or more light sensors that relay to the processor 3502 the intensity of light at a certain time of day that radiates on the solar panels 3504 of the solar platform. By way of example and not limitation, the processor 3502 may then use the light intensity data and the generated electric current data taken at particular times of day and map out the relation and efficiency of the generated electric current versus light intensity. Such information from electric current and light sensors may also be relayed to the user via the downloaded application on the user device 3516. By way of example and not limitation, the light sensors may track the real-time light intensity projected on the solar panels 3504 of the solar platform and such real-time data may be relayed to the user device 3516. If the solar platform is incorporated with a vehicle, as described elsewhere herein, the user may use the real-time light intensity data to move the vehicle to a different location that has better solar lighting, in addition to changing the orientation of the pivotable and central solar panels. If one or more rechargeable batteries 3514 are connected to the solar platform for recharging, such as the rechargeable batteries of an electric or hybrid vehicle, then one or more sensors may be incorporated with such batteries 3514 for the processor 3502 to determine percent battery charged and percent battery remaining. Such sensors incorporated with the batteries 3514 may be current sensors. The information about the rechargeable batteries 3514 may also be relayed from the solar platform, or directly from the rechargeable batteries, and displayed to the user via the downloaded application on the display of the user device 3516.

By way of example and not limitation, the sensors 3512 may include position sensors incorporated with the solar panels 3504 of the solar platform, specifically the pivotable and center solar panels. The position sensors may determine the angular position of each of the pivotable and center panels, and the position sensors may provide such position data to the processor 3502 of the solar platform. By way of example and not limitation, the angular position of the solar panels 3504 measured by the position sensors may also be relayed and displayed to the user via the downloaded application on the user device 3516.

By way of example and not limitation, the processor 3502 may use the data from one or more of the sensors 3512 to send a signal to the motor 3506 coupled to the solar panels 3504 and change the angular positions of the solar panels, specifically the pivotable and center solar panels. By way of example and not limitation, the processor 3502 may receive the light intensity data from the light sensors, the position data from the position sensors, and the current generated from each panel 3504 from the current sensors and send a signal to the motor 3506 to change positions, specifically angular positions, of the solar panels 3504 incrementally and determine an optimal position of the solar panels of the solar platform. By way of example and not limitation, the user may use the user device 3516 to transmit to the processor 3502 of the solar platform to actuate the motor 3506 and place the solar panels 3504 in optimal positions relative to the irradiation of the sun.

The sensors 3512 may also include sensors designed for safety and security of operating the solar platform. By way of example and not limitation, a forward sensor operative to sense a physical object at a height of the solar platform, or near the vicinity of the solar platform, may be incorporated. The forward sensor may be in communication with the processor 3502 that may be configured to send a signal to the motor 3506 to traverse the solar panels 3504 (i.e., pivotable and center solar panels) downwards, and in a folded position, when the forward sensor senses an object at a height or near the vicinity of solar panels 3504 that were originally deployed. If the solar platform is integrated with a structure of a vehicle, as described elsewhere herein, the forward sensor may be used to fold the solar panels 3504 and prevent the solar platform from colliding with an object, such as the ceiling of a tunnel or a bridge, when the vehicle is in motion and the solar platform is originally deployed.

By way of example and not limitation, the solar platform may have one or more locks 3510 that may unlock to allow the solar panels 3504 to traverse to a deployed position. The locks 3510 may lock when the solar platform is in a folded position. The solar platform may have an alarm system incorporated with the solar platform so that an alarm goes off if someone tries to tamper with the solar platform, especially in the folded and locked orientation. By way of example and not limitation, the alarm system and the lock system may be activated and deactivated via the downloaded application on the user device 3516. By way of example and not limitation, the locks 3510 may be in communication with the transmitter 3508 through the processor 3502 and may send information to the user device 3516 of whether the solar platform is operational or not via the downloaded application. By way of example and not limitation, the lock 3510 may have different system status indications that may relay to the user device 3516. The lock 3510 may have an all systems okay position indicative that the solar platform is operational and a system error position indicative that the solar platform is not operational. By way of example and not limitation, the all systems okay position may correspond to the deployed position of the solar panels 3504, and the system error position may correspond to the solar panels 3504 being in a folded position or an unintended position that is neither the folded or the desired deployed position. The lock 3510 may be configured to send a signal of such statuses to an application loaded on a smartphone (i.e., user device 3516) using the transmitter and receiver 3508 for displaying the system status on the smartphone of the user. By way of example and not limitation, the lock 3510 may also be used to lock the solar panels 3504 in the deployed position, at a certain angular orientation, to prevent the external forces such as the wind to change the position of the panels.

Figure 29:
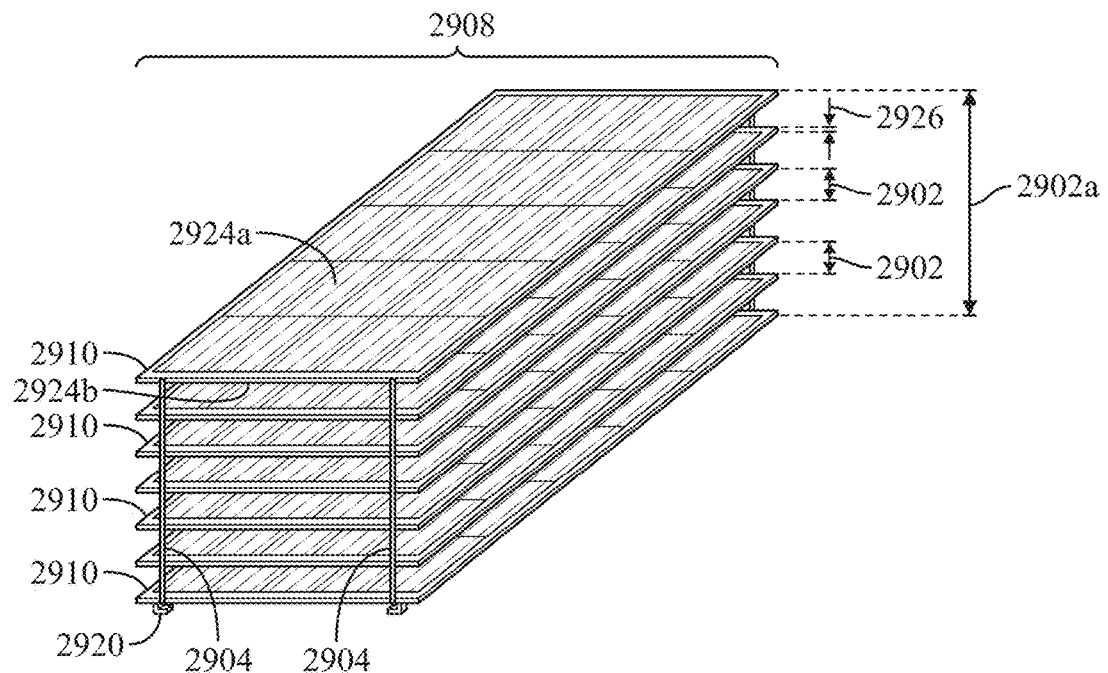
FIG. 29 shows a perspective view of a fourth embodiment of a solar platform in a deployed position.
Figure 30:
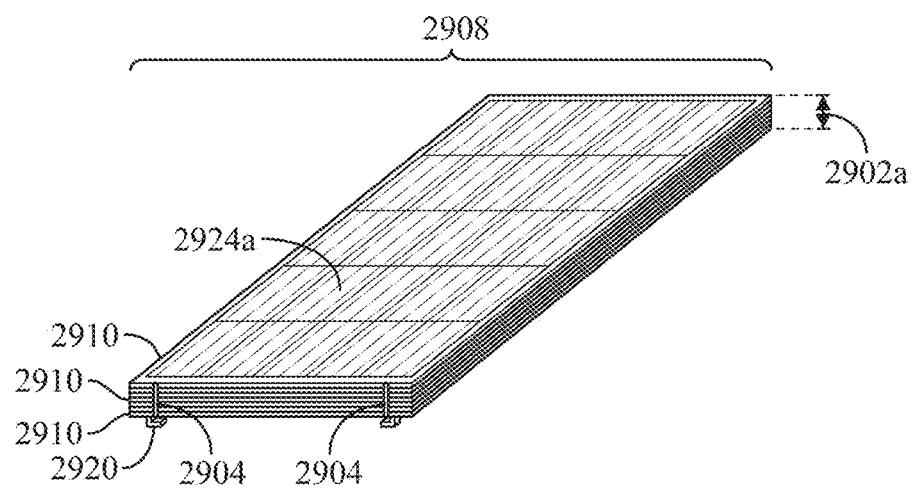
FIG. 30 shows a perspective view of the fourth embodiment of the solar platform in a folded position.

Referring to FIGS. 29-30, perspective views of a fourth embodiment of the solar platform in deployed and folded positions are shown. The fourth embodiment of the solar platform 2908 may have a plurality of stackable solar panels 2910 stacked on top of each other. By way of example and not limitation, there may be between 2 to 16 stackable solar panels 2910 stacked on top of each other, preferably 6 stackable solar panels 2910. By way of example and not limitation the very bottom stackable solar panel 2910 may mounted to a frame having a plurality of legs 2920 to be place on different surfaces, such as the roof of a house, office building, parking structure, or on the ground. In an alternative example, the solar platform 2908 may be incorporated (i.e., integrated or attached) with a vehicle structure or building structure, as described elsewhere herein with other embodiments of solar platforms.

Each stackable solar panel 2910 may have the same dimensions as the other plurality of stackable solar panels 2910. By way of example and not limitation, the thickness 2926 of each stackable solar panel 2910 may be between 0.25 to 0.75 inches thickness, preferably 0.5 inches. By way of example and not limitation, the width and/or the length of each stackable solar panel 2910 may decrease with an additional solar panel stacked on top of each other to give the solar platform a pyramid shape.

In the deployed position as shown in FIG. 29, the plurality of stackable solar panels 2910 may be spaced apart from each other vertically and still be orientated on top of each other. By way of example and not limitation, the vertical spacing 2902 dimension may range between 0.5 to 2.5 inches, preferably 1 inch, between each pair of stackable solar panel 2910. By way of example and not limitation, if there are six stackable solar panels 2910 stacked on top of each other and are vertically spaced 2902 apart from each other by 1 inch, with each of the solar panels having a thickness 2926 of 0.5 inches, then the solar platform 2908 may occupy a vertical space 2902a ranging between nine to ten inches. This may create a greater energy harvesting density and capability in a space where one ordinary solar panel would usually occupy. In the same example, the solar platform 2908 would occupy a second vertical space 2902b between three to five inches in the folded position (see FIG. 30), which would make for convenient storage of the solar platform 2908. In the folded position, each of the plurality of stackable solar panels 2910 may rest on top of each other.

By way of example and not limitation, the solar platform 2908 may transition between the deployed position (see FIG. 29) to the folded position (see FIG. 30), and vice versa, using a telescoping mechanism. One or more telescoping shafts 2904 may be coupled at the ends of the stackable solar panels 2910. For example, there may be one to two telescoping shafts 2904 on each transverse sides of the plurality of stackable solar panels 2910. The one or more telescoping shafts 2904 may be coupled to the plurality of stackable solar panels 2910 to raise and lower the panels between the deployed and folded position or to adjust the vertical spacing 2902 between each pairs of solar panels. By way of example and not limitation, the vertical spacing 2902 between each pair of the plurality of stackable solar panels 2910 may change ranging from being spaced apart from 0.5 inches to 2.5 inches using the telescoping mechanism. It is also contemplated herein that some of the stackable solar panels 2910, such as the bottom two to four solar panels, may be vertically spaced apart at a different spacing than the other stackable solar panels 2910, such as the top two to four solar panels. Alternatively, the solar platform 2908 may transition between the deployed to folded position using foldable legs between each solar panel stacked on top of each other.

By way of example and not limitation, some or all of the stackable solar panels 2910 stacked on top of each other may be bifacial having an active side both the top 2924a and bottom 2924b surfaces of the solar panels. By way of example and not limitation, the very bottom stackable solar panel 2910 may be monofacial while the rest of the stackable solar panels 2910 stacked on top of each other may be bifacial. Consequently, the solar platform 2908 may collect more solar energy, specifically solar irradiation reflected from the nearby ground and objects, since there exists more solar surfaces. In the example described herein with reference to FIGS. 29-30, where six solar panels are stacked on top of each other, there may exist up to 11-12 solar surfaces with the usage of bifacial solar panels that may collect solar energy from solar irradiation coming from all different directions. With the stackable solar panels 2910 being bifacial, it may be preferred that the vertical spacing 2902 between each solar panel to be greater rather than less with respect to the vertical spacing range described elsewhere herein. This may be because with more vertical spacing 2902 the lower surfaces 2924b of the stackable solar panels 2910 may collect more reflected solar irradiation from the ground and nearby objects. Additionally, using bifacial solar panels may further increase the energy harvesting density and capability of the solar platform 2908 in a space where one ordinary solar panel would usually occupy.

By way of example and not limitation, some or all of the stackable solar panels 2910 stacked on top of each other may be transparent, either fully or semi-transparent, that allow for the irradiation of the solar energy hitting the very top stackable solar panel 2910 solar surface 2924a to also reach the solar panels that are below the very top solar panel. By way of example and not limitation, the very bottom stackable solar panel 2910 may be monofacial while the rest of the stackable solar panels 2910 stacked on top of each other may be transparent solar panels. By way of example and not limitation, a combination of fully transparent and semi-transparent stackable solar panels 2910 may be used in the solar platform 2908. By way of example and not limitation, the first two to four stackable solar panels 2910 at the very top of the of the solar platform 2908 may be fully transparent while the rest of the two to four stackable solar panels 2910 occupying the bottom portion of the solar platform 2908 may be semi-transparent. By way of example and not limitation, the fully transparent and semi-transparent solar panels may alternate, with the very top stackable solar panel 2910 being fully transparent and the stackable solar panel 2910 right below the very top solar panel being semi-transparent, which such pattern may repeat for the rest of the solar panels all the way down to the very bottom solar panel, which may be a monofacial solar panel.

It is also contemplated herein that a combination of bifacial, transparent, and monofacial solar panels may be used with the solar platform 2908. By way of example and not limitation, the very top stackable solar panels 2910, such as the very top two to four solar panels, may be transparent while the rest of the stackable solar panels 2910 at the bottom portion of the solar platform 2908 may be bifacial, with the very bottom solar panel being monofacial.

Figure 31:
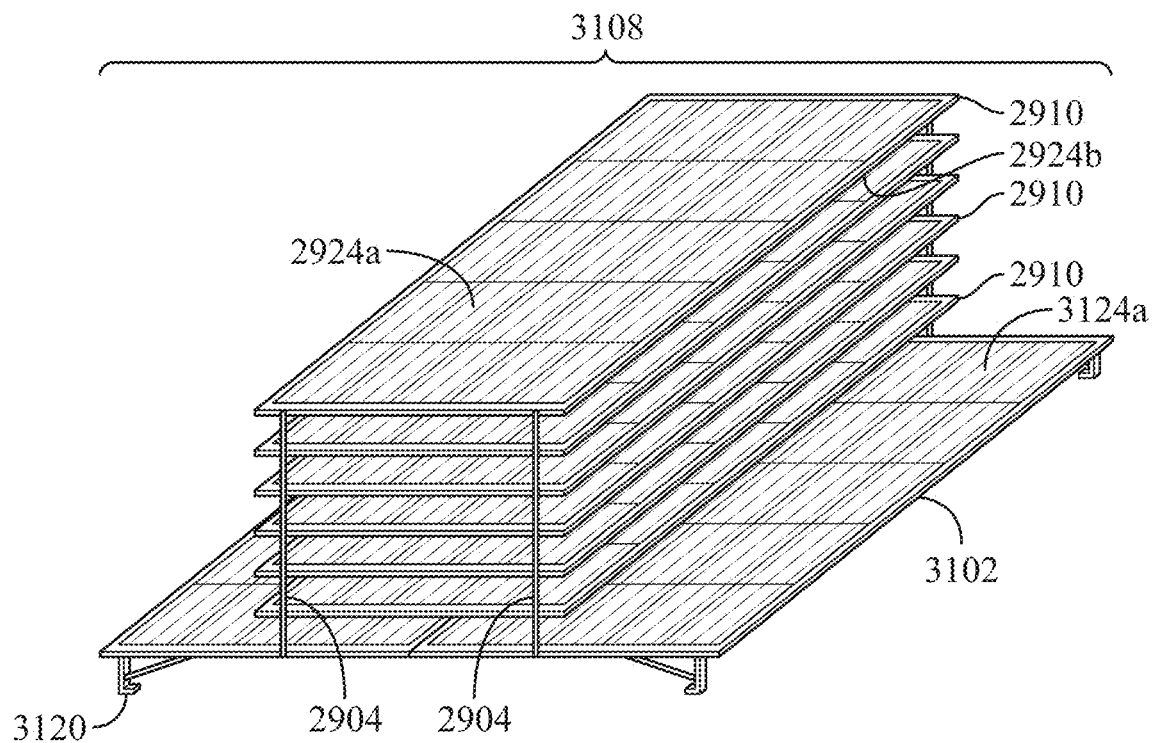
FIG. 31 shows a perspective view of the fourth embodiment of the solar platform incorporated on top of a flat solar panel and in a deployed position.
Figure 32:
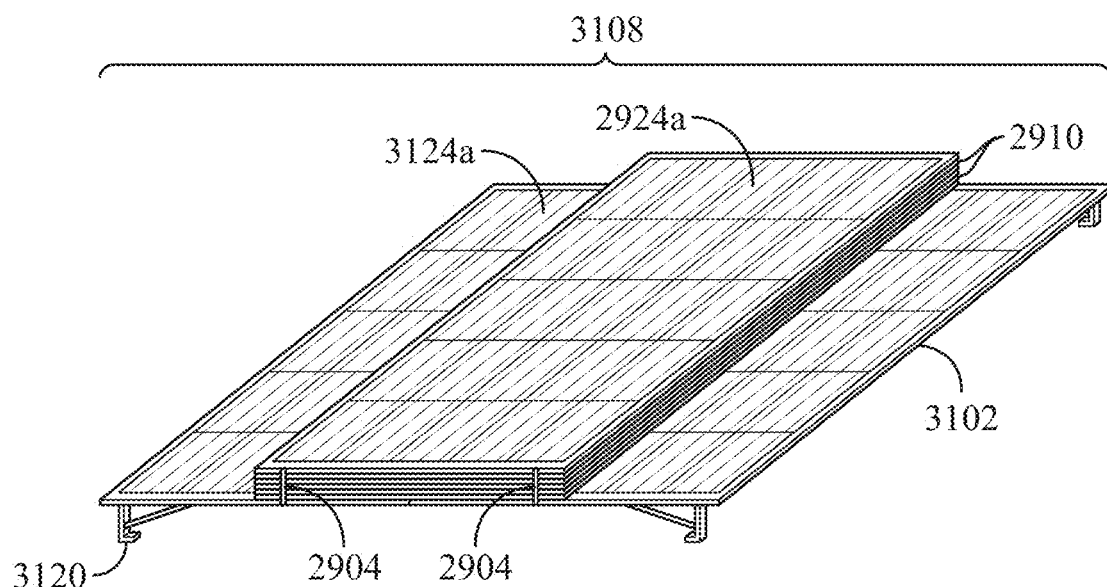
FIG. 32 shows a perspective view of the fourth embodiment of the solar platform incorporated on top of the flat solar panel and in a folded position.

Referring now to FIGS. 31-32, perspective views of the fourth embodiment of the solar platform incorporated on top of a flat solar panel and in deployed and folded positions are shown. The solar platform 3108 shown in FIGS. 31-32 may be similar to the solar platform 2908 of FIGS. 29-30 and what has been described elsewhere herein. The main difference of the solar platform 3108 may be that the stackable solar panels 2910 are placed on top of a larger base solar panel 3102. The base solar panel 3102 may lay horizontal and be wider than the stackable solar panels 2910 and have exposed solar surface 3124a areas to directly receive solar irradiation. The stackable solar panels 2910 may be any type and combination of solar panels described elsewhere. By way of example and not limitation, the base solar panel 3102 may be monofacial, transparent (fully or semi-transparent), or bifacial. By way of example and not limitation, the base solar panel 3102 having the stackable solar panels 2910 attached on top of it may be mounted to a frame 3102 with a plurality of legs to be placed on different surfaces, such as the roof of a house, office building, parking structure, or on the ground. By way of example and not limitation, the solar platform 3108 may be incorporated (i.e., integrated or attached) with a vehicle structure or a building structure, as described elsewhere herein with other embodiments of solar platforms.

Figure 33:
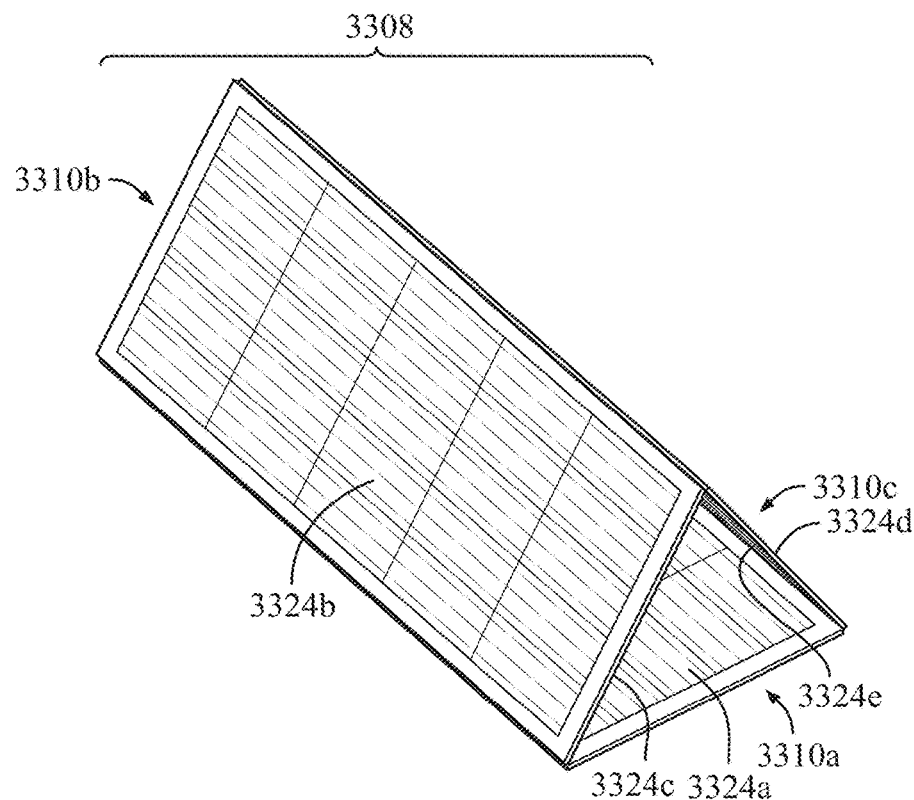
FIG. 33 shows a perspective view of a fifth embodiment of a solar platform in a deployed position.
Figure 34:
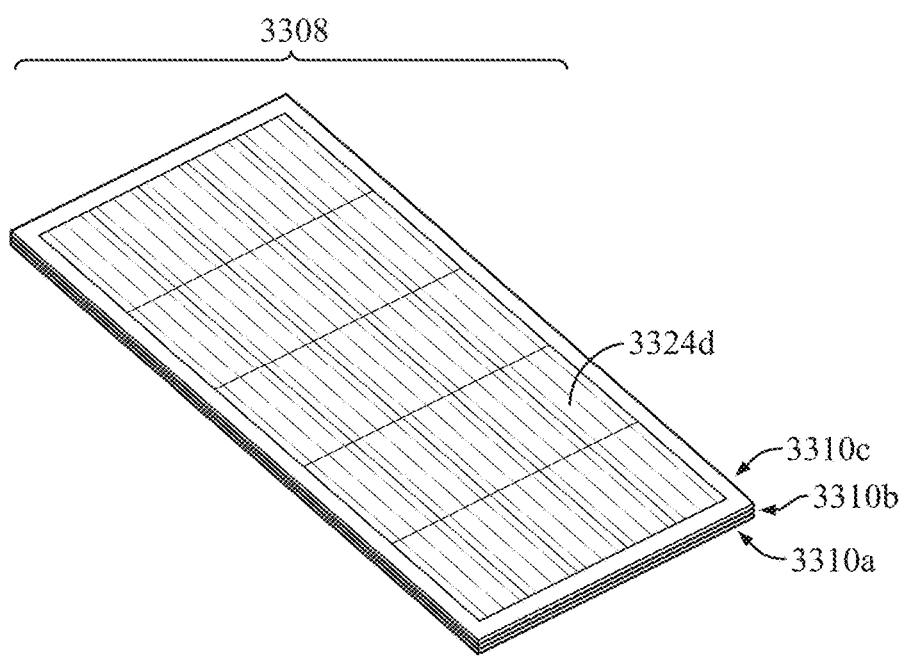
FIG. 34 shows a perspective view of the fifth embodiment of the solar platform in a folded position.

With reference to FIGS. 33-34, perspective views of a fifth embodiment of a solar platform in deployed and folded positions are shown. The fifth embodiment of the solar platform 3308 may have three solar panels 3310*a-c* that are connected with each other to make a triangular prism. Each of the three solar panels 3310*a-c* may make up a lateral face of the triangular prism.

By way of example and not limitation, a first solar panel 3310*a* may be placed flat on a horizontal surface. A second solar panel 3310*b* may have a first longitudinal side attached to a first longitudinal side of the first solar panel 3310*a* and be raised at an incline over the first solar panel 3310*a*, which such attachment may make up a first edge of the triangular prism. A third solar panel 3310*c* may have a first longitudinal side attached to a second longitudinal side of the first solar panel 3310*a* and also be raised at an incline over the first solar panel 3310*a*, which such attachment may make up a second edge of the triangular prism. The second longitudinal side of the second solar panel 3310*b* and the second longitudinal side of the third solar panel 3310*c* may be attached to each other above the first solar panel 3310*a* to make up a third edge of the triangular prism. With such attachment, the triangular prism solar platform 3308 may have a hollow triangular base and interior section. By way of example and not limitation, the solar panels 3310*a-c* may have the same dimensions such that the base of the triangular prism is an equilateral triangle.

The solar platform 3308 in the form of a triangular prism may have outer solar surfaces. The second and third solar panels 3310*b, c* may each have an outer solar surface 3324*b, d* facing the outside environment. By way of example and not limitation, the first solar panel 3310*a* may not have an outer solar surface since its outer surface is contacting a horizontal surface. Alternatively, the first solar panel 3310*a* may have an outer solar surface if mounted on top of a frame like the other embodiments described elsewhere herein. By way of example and not limitation, the first solar panel 3310*a* may have an inner solar surface 3324*a* facing inside of the triangular prism. By way of example and not limitation, the second and third solar panels 3310*b, c* may be bifacial and each may have inner solar surfaces 3324*c, e* facing the inside of the triangular prism. The inner solar surfaces 3324*a, c, e* may harvest solar irradiation that are reflected from nearby surfaces towards the inside of the triangular prism. By way of example and not limitation, one or more of the solar panels 3310*a-c* may be transparent, either fully or semi-transparent. By way of example and not limitation, the second and third solar panels 3310*b, c* may be transparent to allow light that contacts the outer surfaces of such solar panels to reach the inside of the triangular prism and hit the inner solar surface of the first solar panel 3310*a*. By way of example and not limitation, the first solar panel 3310*a* may be monofacial or may be transparent.

As shown in FIG. 34, the solar platform 3308 may be folded such that the solar panels 3310*a-c* are rested flat on top of each other. The folding may be done by detaching one or more of the longitudinal edges of the solar panels that were connected with each other in the deployed position. By way of example and not limitation, the second longitudinal edges of the second and third solar panels 3310*b, c* that are over the first solar panel 3310*a* may be detached from each other so that these solar panels can rest on the first solar panel 3310*a*. In another example, the first longitudinal edge of the third solar panel 3310*c*, opposite to its second longitudinal edge, may be detached from the second edge of the first solar panel 3310*a* and the third solar panel 3310*c* may be folded on the second solar panel 3310*b* such that the inner solar surfaces 3324*c, e* contact each other, and the second and third solar panels 3310*b, c* may be folded on top of the first solar panel 3310*a* such that the outer solar surface 3324*d* of the third solar panel 3310*c* contacts the inner solar surface 3324*a* of the first solar panel 3310*a*. Other types of detachment and folding steps are also contemplated herein.

As described herein, the solar panels or portions thereof (e.g., frame or border) may be transparent or semi transparent to allow the sunlight to pass through the transparent portion and be absorbed by solar panels behind such solar panels or portions thereof. Moreover, the solar panels and/or portions thereof may have a mirror finish to allow the sunlight to be reflected and ultimately absorbed by solar cells on a different solar panel. By way of example, for solar panels with solar cells on one side of the solar panel, the non activated side (i.e., side without solar cells) may have a mirror (e.g., mirror or mirror finish) to allow sunlight or rays of the sun to be reflected off of the mirror and onto the solar cells of a different panel.

Referring now to FIG. 36, a perspective view of a sixth embodiment of a solar platform 608 is shown. The base solar panel 610 that lies flat may have a plurality of riser solar panels 602 that project upwards from the base solar panel 610. By way of example and not limitation, the base solar panel 610 may be one large solar panel or be made from multiple smaller solar panels. As used herein, the base solar panel 610 may be referred as a singular term although a plurality of base solar panels 610 may be attached to create the surfaces for the riser solar panels 602 to project upward therefrom. The riser solar panels 602 take advantage of a dimension that conventional solar panels do not take into account, mainly the vertical dimension above the base solar panel 610. As such, the solar platform 608 obtains three-dimensional active sides to harvest more solar energy since the riser solar panels 602 are erected from the planar solar surface of the base solar panel 610. As such, the solar platform 608 is more than one flat active surface area by being three-dimensional and taking advantage of the available volume above the solar platform 608. Consequently, the energy density of the solar platform 608 increases since more energy can be harvested per cubic meter with the inclusion of the riser solar panels 602 that, among other things, harvest sun rays that are reflected by the active surface of the base solar panel 610. Although the active surface of the base solar panel 610 may be designed to absorb photons of the sun rays, some of the photons hitting such surface may nevertheless be reflected. The riser solar panels 602 act as a mechanism capturing the reflected photons from the base solar panel 610.

The sixth embodiment of the solar platform 608 disclosed herein may be incorporated with different types of electric, hybrid, or regular internal combustion engine vehicles. Such vehicles may include trucks, vans, minivans, SUVs, semitrucks, buses, recreational vehicles, motorhomes, trailers, station wagons, hatchbacks, crossovers, sedans, coupes, compact automobiles, and other types of vehicles and automobiles. The solar platform 608 may be attached or integrated with a top surface of such vehicles (e.g., roof of the vehicle), or any other vehicles, such as aerial vehicles. The solar platform 608 described herein may also be incorporated with buildings, such as parking structures, homes, office buildings, stadiums, and other types of building structures. The solar platform 608 described herein may also simply be on a frame and placed on the ground. Specifically with the incorporation of the solar platform 608 with the vehicle, the solar platform 608 may be attached or integrated with the roof of a vehicle or the top of a cap (e.g., a camper shell) or the tonneau cover of a truck, to name a few examples. The solar platform 608 may be connected to the electrical components and a battery of the vehicle. For example, the solar platform may be used to charge the battery of an electric vehicle, a deep cycle battery, or charge and power other electronic devices. The solar platform 608 may also be connected to a computing system of the vehicle to receive commands to deploy, fold, and operate some or all of the solar panels using an automated motorized mechanism. Alternatively, solar platform 608 may have its own computing system that operates the solar panels.

By way of example and not limitation, the solar panels described herein may be solar photovoltaic panels, where each solar panel may have a plurality of solar cells ranging between one to 120 solar cells. By way of example and not limitation, the solar panels described herein may be monocrystalline, polycrystalline, or thin-film solar panels. By way of example and not limitation, the base solar panels 610 may be monocrystalline or polycrystalline and the riser solar panels 602 may be thin-film solar panels. However, any other combination of the type of solar panels may be used with the solar platform 608, or all of the solar panels may be the same type. The solar panels of the solar platform 608 may be monofacial, having one active side, or bifacial, having two active sides. By way of example and not limitation, the solar panels of the solar platform 608 may be transparent solar panels, either fully transparent or semi-transparent. By way of example and not limitation, each solar panel may generate between 0.1 to 0.5 kWh energy depending on the location, the weather, the time of day and year, and the type of solar panel. Alternatively, each solar platform may supply from 1 kilowatt to 12 kilowatts depending on the location, the weather, the time of day and year, and the type and number of solar panels.

By way of example and not limitation, the base solar panel 610 may be rectangular and be one singular solar panel or multiple small solar panels combined with each other to make one large rectangular base solar panel 610. By way of example and not limitation, the base solar panel 610 may have an active side that is flat and parallel to the ground and facing towards the sky. Alternatively, the base solar panel 610 may be at an incline relative to the ground. By way of example and not limitation, the base solar panel 610 may be mounted to a frame 620. By way of example and not limitation, the total length 616 of the base solar panel 610 may be between six to 80 inches. By way of example and not limitation, the total length 616 of the base solar panel 610 may be between four to 45 times larger than the heights of each of the riser solar panels 602. The total length 616 of the base solar panel 610 may be important because of how many riser solar panels 602 may be installed on top of it and how packed the riser solar panels 602 may be placed next to each other. By way of example and not limitation, the total width 613 of the base solar panel 610 may be between six to 60 inches.

By way of example and not limitation, the frame 620 may have two longitudinal portions and two lateral portions defining the frame body and an opening therebetween. The frame 620 may have the same features as explained elsewhere herein. By way of example and not limitation, the frame 620 may be rectangular and have similar dimensions as the base solar panel 610 such that the base solar panel 610 is fixedly mounted therebetween. By way of example and not limitation, the frame 620 may have one or more mounting mechanisms 630, such as frame legs on each corner edges of the frame 620. The frame 620 and its mounting mechanisms 630 may be used to place the solar platform 608 on building structures or attached on top of vehicles, as described elsewhere herein.

By way of example and not limitation, a plurality of riser solar panels 602 may project upwards from the base solar panel in a 90-degree direction or at an incline direction. By way of example and not limitation, each plurality of riser solar panels 602 may extend along the total width 613 of the base solar panel 610 from one longitudinal side to the other longitudinal side of the frame 620. Alternatively, each riser solar panel 602 may extend along a portion of the total width 613 of the base solar panel 610, such as by being centered on the base solar panel 610 and spaced apart from the longitudinal edges of the base solar panel 610 and the frame 620. By way of example and not limitation, there may exist between one to 50 riser solar panels projecting upwards from the base solar panel 610. The riser solar panels 602 may be packed closely to each other or farther from each other. By way of example and not limitation, the riser solar panels 602 may be spaced away from each other along the total length 616 of the base solar panel 610 in the range of one to 36 inches from each other. This means that adjacent riser solar panels 602 may be spaced away from each other in the range of one to 36 inches. In one example, if the base solar panel 610 is 40-inches long, then there may be 20 riser solar panels 602 on the base solar panel 610 that are each equidistantly spaced from each other by two inches. In a similar example, if the base solar panel is 40-inches long, then there may be 40 riser solar panels 602 on the base solar panel 610 that are each equidistantly spaced from other by one inch. As explained elsewhere herein, and by way of example and not limitation, the height of each riser solar panel 602 may range between one to eight inches, where the relative packing of the riser solar panels may determine such height.

By way of example and not limitation, each riser solar panel 602 may be monocrystalline, polycrystalline, or thin-film solar panels. By way of example and not limitation, each riser solar panel 602 may be bifacial by having two active solar sides on each rising surface of the solar panel to maximize solar energy harvesting. Alternatively, the riser solar panels 602 may be mono-facial for a design where the solar platform 608 rotates throughout the day to face the sun. By way of example and not limitation, each riser solar panel 602 may be made from 1 to 24 solar cells extending across the total width 613 of the base solar panel 610 from one longitudinal section to another of the frame 620. By way of example and not limitation, the riser solar panels 602 may be transparent, semi-transparent, or a combination thereof. In one example, the riser solar panels 602 at the very outer edges of the solar platform 608 may be semi-transparent and the riser solar panels therebetween being transparent, or vice versa. In another example, the riser solar panels 602 adjacent to each other may alternate between transparent and semi-transparent. Such combinations and the usage of transparent riser solar panels, in general, may allow for a better capturing of solar energy throughout the day, especially if the solar platform 608 is fixed in a stationary position. The usage of transparent and semi-transparent riser solar panels 602 may reduce the possible shadow that such solar panels may project on the base solar panel 610 and on each other.

Referring now to FIGS. 37A-F, side views of the sixth embodiment of the solar platform 608 with the riser solar panels 602*a-c* having different heights 615*a-c* is shown. As shown in FIG. 37A, and by way of example and not limitation, the solar platform 608 may have 23 riser solar panels 602*a* having small heights. By way of example and not limitation, the small-height riser solar panels 602*a* may have a height 615*a* ranging between 0.75 to 1.95 inches. As explained elsewhere herein, the number of small riser solar panels 602*a* on the solar platform 608 may range from one to 50. As shown in FIG. 37B, and by way of example and not limitation, the solar platform 608 may have 23 riser solar panels 602*b* with medium height. By way of example and not limitation, the medium-height riser solar panels 602*b* may have a height 615*b* ranging between 1.95 to 2.95 inches. As explained elsewhere herein, the number of medium riser solar panels 602*b* on the solar platform 608 may range from one to 50. As shown in FIG. 37C, and by way of example and not limitation, the solar platform 608 may have 23 riser solar panels 602*c* with a long height. By way of example and not limitation, the long-height riser solar panels 602*c* may have a height ranging between 3.0 to 6.95 inches. As explained elsewhere herein, the number of long riser solar panels 602*c* on the solar platform 608 may range from one to 50.

Although FIGS. 37A-C show the riser solar panels 602*a-c* of different heights being spaced apart at the same distance, FIGS. 37D-E show the spacing apart of the riser solar panels 602*b-c* by taking the height of such panels into consideration. Longer riser solar panels 602*a-c* may need to be spaced apart from each other further to possibly prevent the interference (e.g., casting of shadow) with adjacent riser solar panels and their harvesting of solar energy. For maximum solar harvesting, the riser solar panels may be closely packed with each other to a limit where the adjacent riser solar panels do not interfere (e.g., cast shadow) with the solar harvesting of each other. This reason may be why the range of heights of the riser solar panels and the range of space between them, as described elsewhere herein, may be an important design factor.

By way of example and not limitation, the medium riser solar panels 602*b* (see FIG. 37D) may be at least 1.5 times spaced apart from each other when compared to the spacing of short riser solar panels 602*a* (see FIG. 37A). By way of example and not limitation, the medium riser solar panels 602*b* may be at least 2 times spaced apart from each other when compared to the spacing of short riser solar panels 602*a*. By way of example and not limitation, the short riser solar panels 602*a* (see FIG. 37A) may each be spaced apart from each other between one to 18 inches. By way of example and not limitation, the long riser solar panels 602*c* (see FIG. 37E) may be at least 2.5 times spaced apart from each other when compared to the spacing of short riser solar panels 602*a* (see FIG. 37A), or at least 1.5 times spaced apart when compared to the medium riser solar panels. By way of example and not limitation, the long riser solar panels 602*c* may be at least 3 times spaced apart from each other when compared to the spacing of short riser solar panels 602*a* (see FIG. 37A), or at least 2 times spaced apart when compared to the medium riser solar panels. By way of example and not limitation, the short riser solar panels 602*a* (see FIG. 37A) may each be spaced apart from each other between one to 18 inches.

As shown in FIG. 37F, the solar platform 608 may have a combination of riser solar panels 602*a-b* with different heights and the riser solar panels 602*a-b* being spaced apart differently. By way of example and not limitation, the riser solar panels 602*b* at the outer edges of the solar platform 608 and the center riser solar panel 602*b* may be longer panels while the other riser solar panels may be small panels 602*a*. By way of example and not limitation, the longer riser solar panels may be medium or large while the smaller riser solar panels may be small or medium. Alternatively, a combination of all three sizes, small, medium, and large may be used. By way of example and not limitation, the riser solar panels adjacent to each other may alternate in height between longer and shorter panels. The longer panels may be medium or large while the smaller solar panels may be small or medium. Alternatively, a combination of all three sizes, small, medium, and large may be used. As shown in FIG. 37F, and by way of example and not limitation, smaller riser solar panels 602*a* may be closely spaced from each other while the longer riser solar panels 602*b* may be spaced farther apart from each other. The longer riser solar panels may be medium or long while the shorter riser solar panels may be short or medium. The different spacing apart of the riser solar panels may be as described elsewhere herein.

Referring now to FIGS. 38A-C, side views of the sixth embodiment of the solar platform 608 where the riser solar panels 602 are pivotable are shown. By way of example and not limitation, each riser solar panel 602 may have a pivoting mechanism 614. By way of example and not limitation, the pivoting mechanism 614 for each riser solar panel 602 may be one or more hinges. By way of example and not limitation, the pivoting mechanisms 614 may be embedded in recesses formed on the base solar panel 610. By way of example and not limitation, the pivoting mechanisms 614 may be embedded in recesses formed on the longitudinal sides of the frame 620. Consequently, each riser solar panel may rotate clockwise or counterclockwise and change orientation from the orthogonal direction relative to the base solar panel 610. Alternatively, the riser solar panels 602 may be attached and affixed to the base solar panel 610 in an orthogonal direction without being able to pivot. The fixedly attached design may be sturdier than the pivotable design and, as a result, the solar platform 608 may be more durable.

The pivoting mechanism 614 of each riser solar panel 602 may rotate such solar panel about an axis that extends across the width 613 (see FIG. 36) of the base solar panel 610. In other examples, the rotation axis may extend across the length 616 of the base solar panel 610 if the riser solar panels 602 extend across such length. By way of example and not limitation, each riser solar panel 602 may be free to pivot by a range of 10 to 160-degrees from its orthogonal orientation, or relative to the base solar panel 610, when the riser solar panel 602 are closely packed next to each other. By way of example and not limitation, each riser solar panel 602 may be pivotable by up to 180-degrees when they are not closely packed next to each other such that each riser solar panel 602 may pivot and lay flat on the base solar panel 610. Other pivoting ranges described elsewhere herein are also contemplated with respect to the sixth embodiment of the solar platform 608.

By way of example and not limitation, the pivoting mechanisms 614 of the riser solar panels 602 may be synchronized with each other where the riser solar panels 602 are all pivoted by the same angular displacement as each other. The synchronized pivoting may allow for a more convenient way to pivot the riser solar panels 602. Alternatively, the pivoting mechanism 614 of each riser solar panel 602 may pivot independent from each other. The independent pivoting may allow for more orientation options of the riser solar panels 602. The pivoting of the riser solar panels 602 may be necessary for the riser solar panels 602 to face the sun and its solar radiation at an optimum orientation, as described elsewhere herein. Also, the pivoting of the riser solar panels 602 may make the solar platform 608 more aerodynamic if the solar platform 608 is installed on a vehicle and it is in motion. By way of example and not limitation, the pivoting mechanisms 614 may be motorized and automated, as described elsewhere herein. By way of example and not limitation, the pivoting mechanisms 614 may be controlled by a remote controller, as described elsewhere herein. Alternatively, the pivoting mechanisms 614 may be actuated manually, as described elsewhere herein. In general, and by way of example and not limitation, the sixth embodiment of the solar platform 608 may have the same features as described elsewhere herein, including with respect to FIG. 35. The sixth embodiment of the solar platform 608 may also be controlled and monitored by a software application on a mobile device, as described elsewhere herein.

As shown in FIG. 38C, and by way of example and not limitation, the pivoting mechanisms 614 may be used to fold the riser solar panels 602 on each other. Although FIG. 38C shows the riser solar panels 602 folded on each other, in other examples the riser solar panels 602 may fold flat on the base solar panel 610 when there are either less riser solar panels 602 or more spacing between them. By way of example and not limitation, the riser solar panels 602 may pivot to the folded position by a motorized and automated mechanism, as described elsewhere herein. Alternatively, the riser solar panels 602 may pivot to the folded position by manual actuation, as described elsewhere. For example, the riser solar panels 602 may be spring biased to the deployed position. The riser solar panels 602 may be pushed down by hand and locked in place with a fastening mechanism that is traversed automatically as soon as the panels are pushed down to the stored position as shown in FIG. 38C.

Referring now to FIGS. 39A-B, side views of the sixth embodiment of the solar platform 608 where the base solar panel 610 has a shorter length is shown. By way of example and not limitation, the sixth embodiment of the solar platform 608 may also have a miniature version, as shown in FIGS. 39A-B, where the length 616a of the base solar panel 610 may range between five to eight inches. By way of example and not limitation, the riser solar panels may have the same height and be pivotable on the miniature version of the solar platform 608, as described elsewhere herein. As shown in FIG. 39B, and by way of example and not limitation, the miniature version of the solar platform 608 may have riser solar panels 602 having a height 615d of five to six inches. By way of example and not limitation, the width of the miniature version of the solar platform 608 may be between four to seven inches. The miniature version of the solar platform 608 may be mounted on smaller objects that do not have enough surface area for the regular version of the solar platform 608. Multiple miniature versions may be connected together and be used in conjunction together, such as six to 12 solar platform 608, to collect solar energy.

Figure 40:
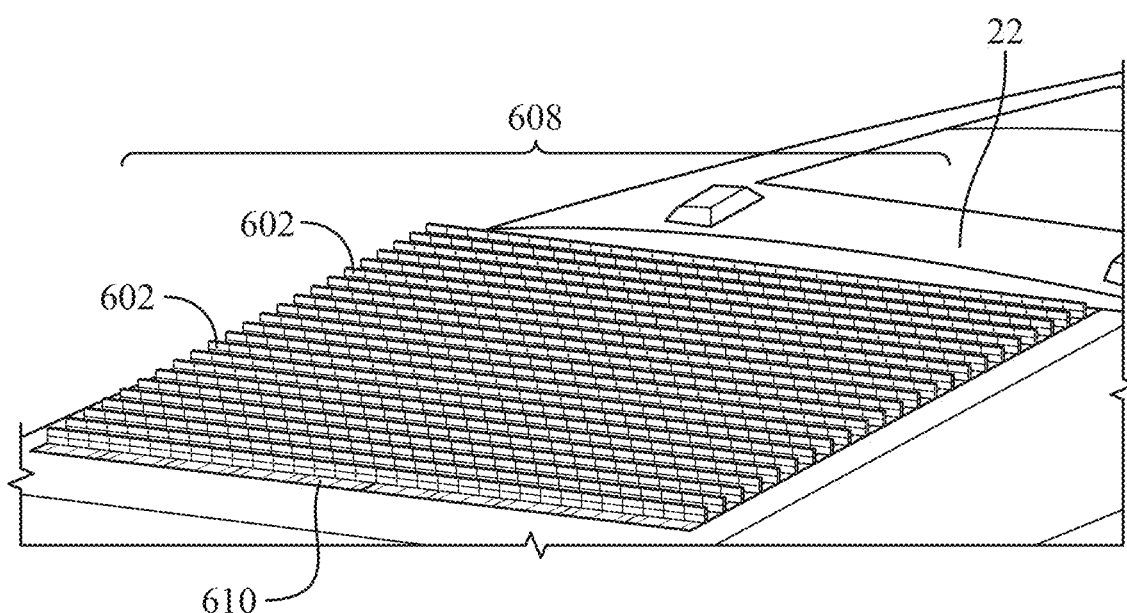
FIG. 40 shows a perspective view of the sixth embodiment of the solar platform on an automobile surface.

Referring now to FIG. 40, a perspective view of the sixth embodiment of the solar platform 608 on the top surface 22 of an automobile is shown. The solar platform 608 may be attached to the vehicle, with or without the frame, or be integrated with the vehicle. By way of example and not limitation, the solar platform 608 may be attached to the roof of the automobile or be integrated with the roof of the automobile by making up a portion of the roof, as described elsewhere herein. By way of example and not limitation, the pivoting mechanisms 614 (see FIGS. 38A-C) of the solar platform 608 may be controlled by interfaces integrated with the automobile, such as a control panel, as described elsewhere herein. By way of example and not limitation, the pivoting mechanisms 614 may be actuated while the vehicle is in motion to have the riser solar panels 602 face the sun and also become more aerodynamic to reduce drag while the vehicle is in motion. The pivoting mechanism 614 may also simply be deployed when the vehicle is at a stop.

Figure 41:
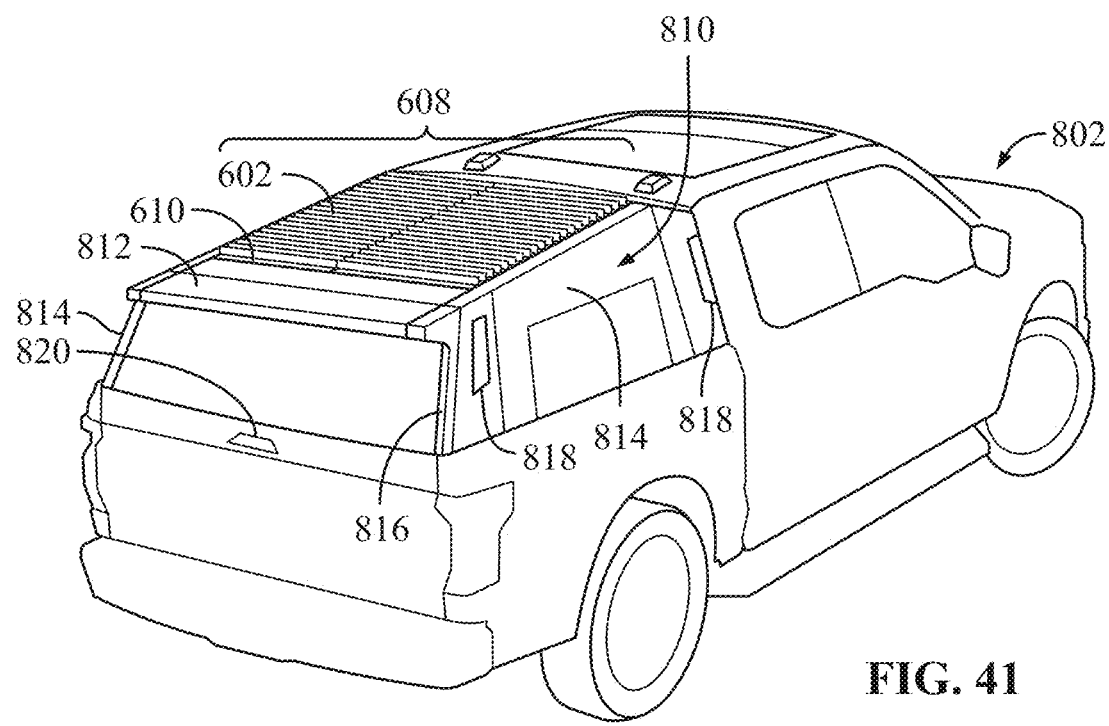
FIG. 41 shows a rear perspective view of a truck having a cap with the sixth embodiment of the solar platform.

Referring now to FIG. 41, a rear perspective view of a truck 802 having a cap 810 with the sixth embodiment of the solar platform 608 is shown. The cap 810 may have the same features as described elsewhere herein. By way of example and not limitation, the sixth embodiment of the solar platform 608 may be attached to the cap 810, with or without a frame, or be integrated with the cap 810 to form part of the top surface of the cap 810 (e.g., cap roof 812), as described elsewhere herein. By way of example and not limitation, the riser solar panels 602 may extend across the left and right side of the truck bed as attached or integrated with the cap 810. Alternatively, the riser solar panels 602 may be attached or integrated with the cap 810 such that they extend upward and downwards of the cap roof 812 and from the rear and front of the truck bed. Alternatively, a smaller version of the solar platform 608 may be integrated to the left and right the side frames 814 of the cap 810.

Figure 42:
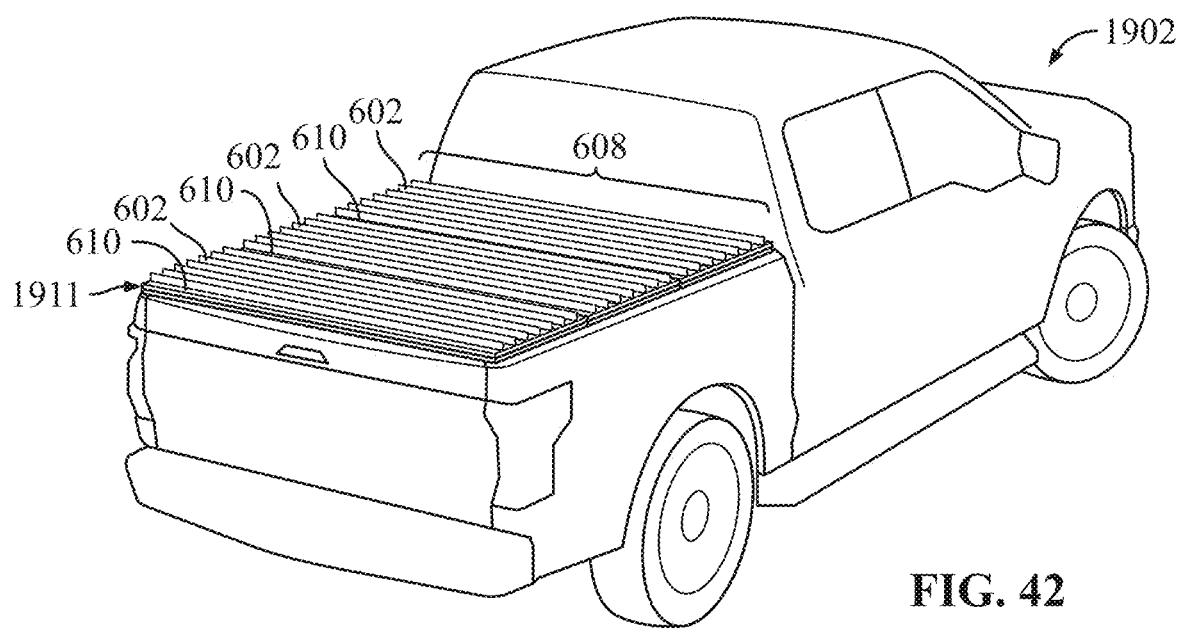
FIG. 42 shows a rear perspective view of a truck having a tonneau cover with the sixth embodiment of the solar platform.

Referring now to FIG. 42, a rear perspective view of a truck 1902 having a tonneau cover 1911 with the sixth embodiment of the solar platform 608 is shown. By way of example and not limitation, the solar platform 608 may be attached to the tonneau cover 1911 or may be integrated to form the structural panels of the tonneau cover 1911. The solar platform 608 and the tonneau cover 1911 may have the same features as described elsewhere herein. By way of example and not limitation, the riser solar panels 602 may extend across the left and right side of the truck bed as attached or integrated with the tonneau cover 1911. Alternatively, the tonneau cover 1911 having the solar platform 608 may be shifted such that the riser solar panels 602 may extend across the rear and the front of the truck bed.

Figure 43:
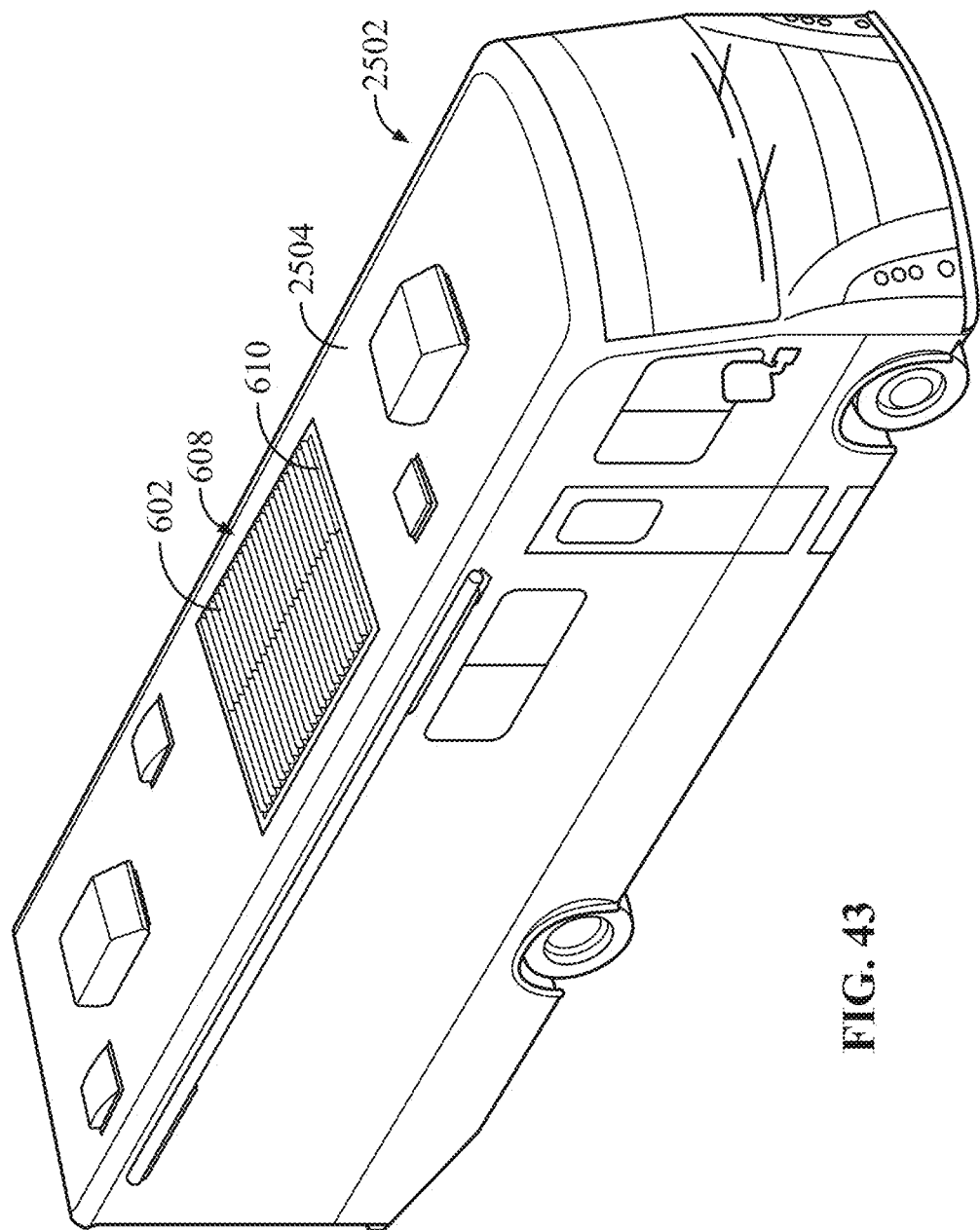
FIG. 43 shows a perspective view of a recreational vehicle with the sixth embodiment of the solar platform.

Referring now to FIG. 43, a perspective view of a recreational vehicle 2502 with the sixth embodiment of the solar platform 608 attached or integrated on the roof 2504 of the recreational vehicle 2502 is shown. The recreational vehicle 2502 may have the same parts and features as described elsewhere herein. The solar platform 608 may have the same parts and features as described elsewhere herein.

Figure 44:
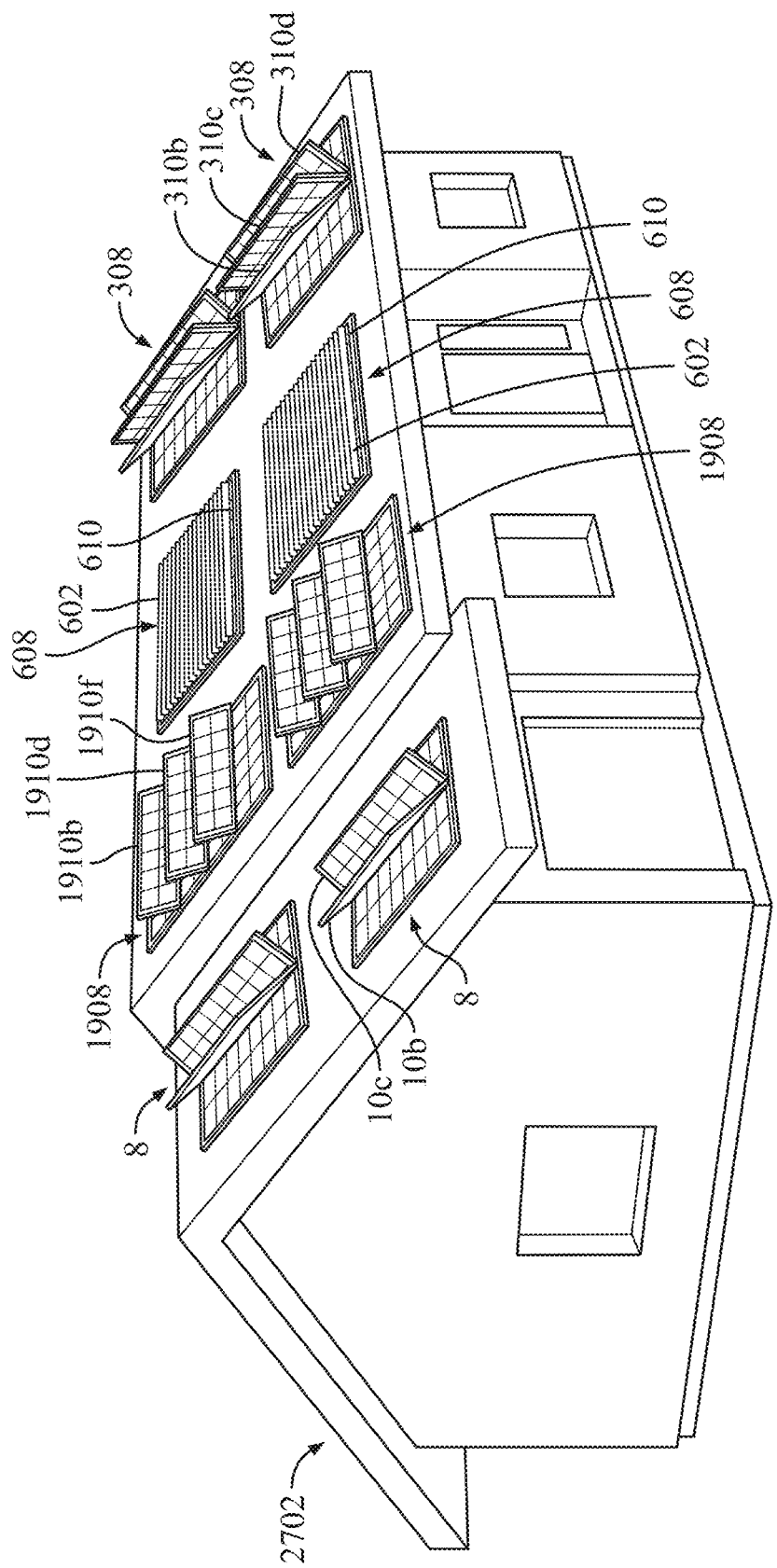
FIG. 44 shows a perspective view of a house with multiple solar platforms including the sixth embodiment of the solar platform.
Figure 45:
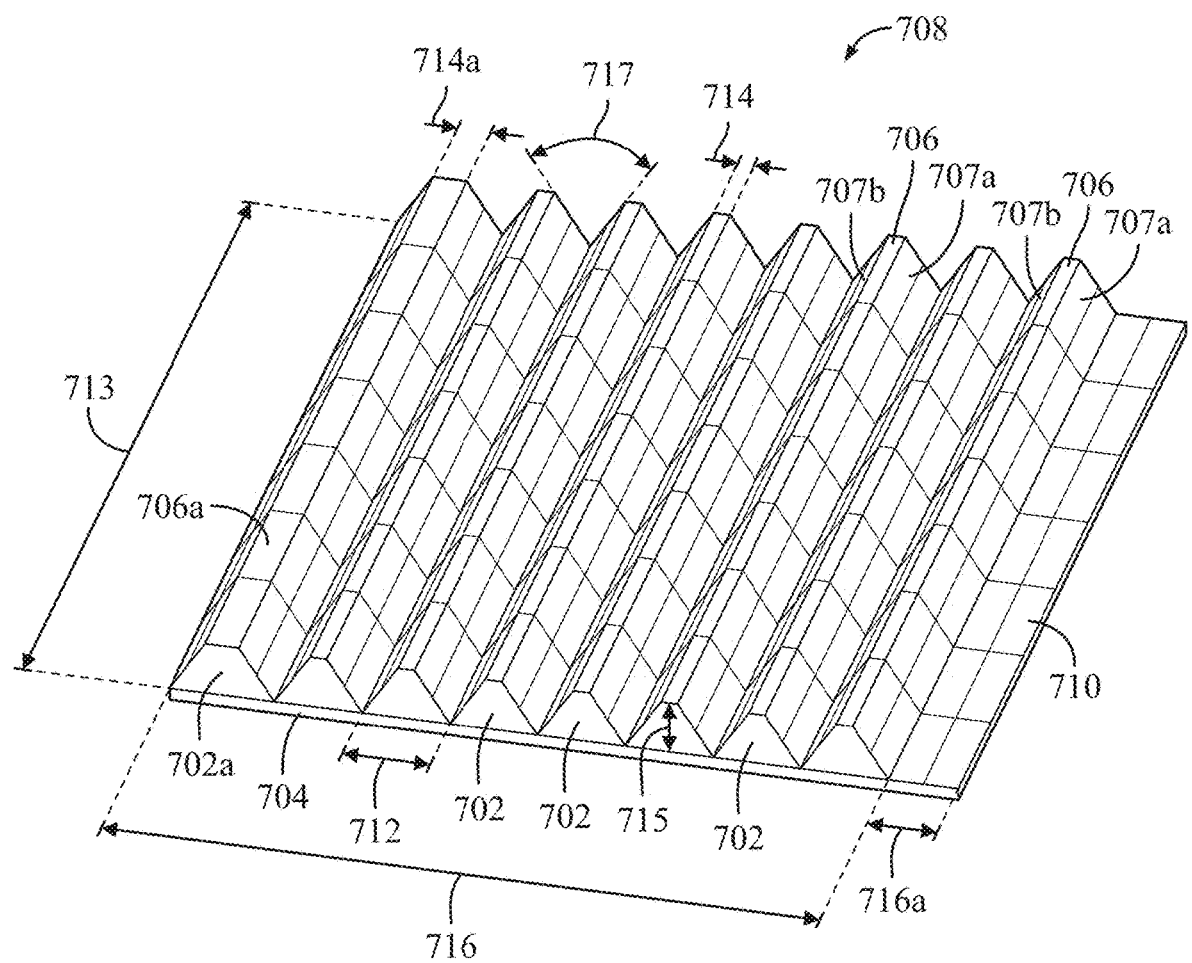
FIG. 45 shows a perspective view of a new embodiment of a solar panel.

Referring now to FIG. 44, a perspective view of a building structure, such as a house 2702, with multiple solar platforms including the sixth embodiment of the solar platform 608. The building structure may be the same as the types as described elsewhere herein. The solar platform 608 attached to the building structure may have the same parts and features as described elsewhere herein.

Referring now to FIG. 45, a perspective view of a new embodiment of a solar panel is shown. By way of example and not limitation, the new embodiment may be an embossed solar panel 708 that may have a plurality of embossed solar photovoltaic cell beams 702 that are each in the shape of a triangular or trapezoidal prism. Alternatively, planar solar cells may be attached on the lateral faces of a frame beam having a shape of a triangular or trapezoidal prism to give each beam of the embossed solar cell beam 702 the aforementioned prism shapes. Although for the sake of brevity the embossed solar cell beams 702 are described elsewhere herein as having triangular prims shapes, such embossed solar cell beams 702 may also have a trapezoidal prism shape or any other type of prism shape. The embossed solar cell beams 702 may be bonded and adjacent to each other to make up the embossed solar panel 708. By way of example and not limitation, the bonding of the embossed solar cell beams 702 may be done on top of an underlying substrate 704 holding the embossed solar panel 708 together. By way of example and not limitation, the embossed solar panel 708 may have embossed solar cell beams 702 in the range of two to 32 beams. As shown in FIG. 45, the embossed solar panel 708 has eight embossed solar cell beams 702.

By way of example and not limitation, the embossed solar panel 708 may be rectangular having a panel length 716 and a panel width 713. By way of example and not limitation, a plurality of embossed solar cell beams 702 may be attached next to each other along the panel length 716 such that the lateral faces of each embossed solar cell beam 702 extend across the panel width 713. By way of example and not limitation, the panel length 716 may be between six to 36 inches and the panel width 713, and consequently the length of the embossed solar cell beams 702, may be six to 32 inches. By way of example and not limitation, the underlying substrate 704 having the embossed solar cell beams 702 on top may have the same length and width as the panel length 716 and panel width 713. By way of example and not limitation, each embossed solar cell beam 702 may be a unitary beam or a beam made of a plurality of triangular prism solar cells, where the triangular base cross-section of the plurality of solar cells contact and are bonded to each other to make the embossed solar cell beam 702. By way of example and not limitation, the embossed solar cell beams 702 may come in a triangular prism shape having active sides 707a-b on the lateral faces that face outwards and towards the sky. By way of example and not limitation, the active solar surface sides 707a-b of adjacent embossed solar cell beams 702 may form a V-shape with each other since they are at an incline and on the lateral faces of the prism-shaped embossed solar cell beams 702. Alternatively, planar solar cells may be bonded on the lateral faces of a beam frame having the triangular prism shape.

The usage of the embossed solar cell beams 702 allows for the presence of more active solar surfaces 707a-b for harvesting solar energy since the embossed solar panel 708 takes a volumetric approach in harvesting solar energy rather than the conventional per square area approach with planar solar panels. The solar cell beams 702 have three-dimensional solar surfaces with the active sides 707a-b being two of the lateral faces of the triangular prism beam, the lateral faces inclining upwards from the underlying substrate 704 of the embossed solar panel 708. This three-dimensional approach allows to harvest solar energy per cubic meter rather than per square meter since the embossed solar panel 708 takes advantage of a third dimension (e.g. vertical dimension above solar panels) not conventionally used. Consequently, the generation of solar power may be increased since power is being generated per volume rather than per area. By way of example and not limitation, the solar photovoltaic cells used may be monocrystalline, polycrystalline, or thin-film.

The triangular prism shape of the embossed solar cell beams 702 may also provide solar surfaces that are in the optimum position relative to the sun at each time of the day. As the sun rises from the east and sets on the west, the sun may move parabolically over the embossed solar cell beams 702, for example from the flat solar panel 710 to the outer solar cell beam 702a. During such parabolic trajectory of the sun, at least some of the active sides 707a-b and the flat lateral portions 706 would be at an optimum orientation relative to the sun because of such surfaces being correspondingly inclined and flat relative to each other. Additionally the V-shape structure that is created between the embossed solar cell beams 702 due to the active sides 707a-b being inclined, and on the lateral faces of the beams, may allow such surfaces to harvest reflected photons from adjacent corresponding active sides 707a-b. Although the active sides 707a-b are designed to capture photons of the sunray irradiated on them, some of the photons may nevertheless be reflected. However, the adjacent active side 707a-b may capture such reflected photon due to the three-dimensional aspect of the embossed solar panel 708 and the V-shaped structure that the embossed solar cell beams 702 and their active sides 707a-b make relative to each other. Alternatively, instead of the active sides 707a-b inclining upwards towards the flat lateral portions 706 of the protruding embossed solar cell beams 702, the active sides 707a-b may incline and sink downwards to create debossed recesses within the solar panel. In other words, the V-shaped structure created by the solar cell beams may be debossed instead of embossed.

By way of example and not limitation, the lateral edges of each of the embossed solar cell beams 702 that may be pointing upwards towards the sky and extending across the panel width 713 may be a flat lateral portion 706 having a third active side for each embossed solar cell beam 702. Consequently, the flat lateral portions 706 may increase solar power generation by the embossed solar panel 708 since such edges provide additional solar surfaces. Due to the embossed solar cell beams 702 of FIG. 45 having the flat lateral portions 706 instead of a pointed lateral edge, the embossed solar cell beams 702 may be considered to be in a trapezoidal prism shape instead of a triangular prism shape. Consequently, the flat lateral portion 706 of each embossed solar cell beam 702 may be considered another lateral face of the trapezoidal prism.

Figure 46A:
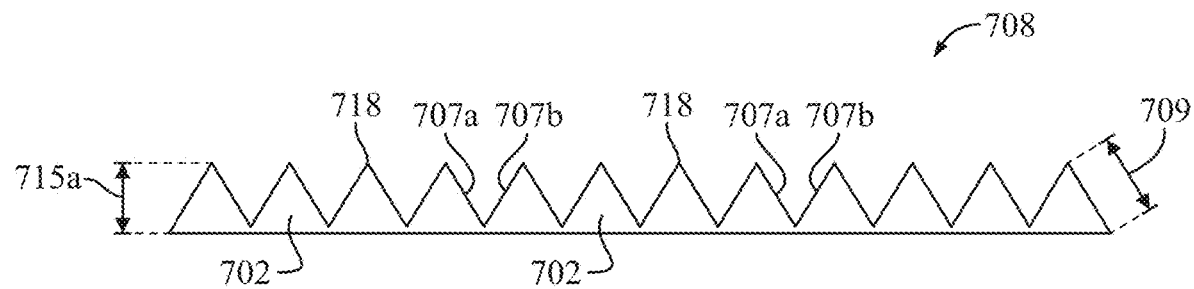
FIGS. 46A-B show side and angled views of another example of the new embodiment of the solar panel.
Figure 46B:
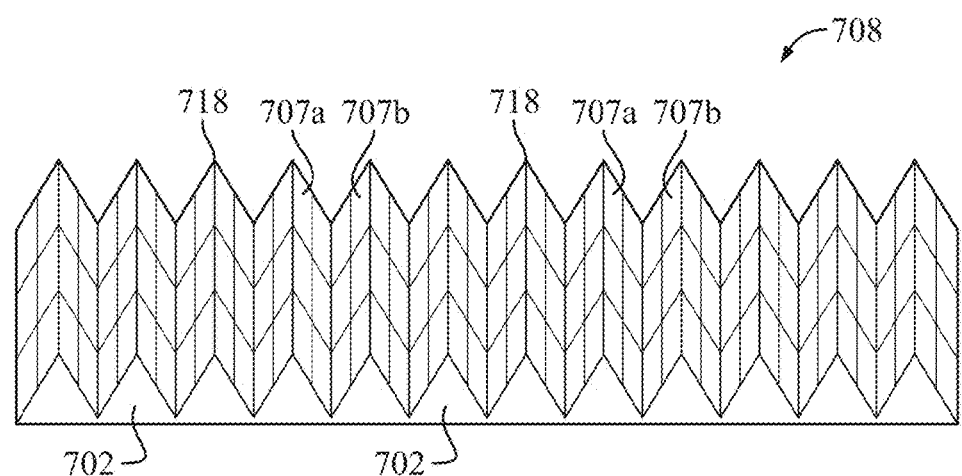

By way of example and not limitation, the triangular prism solar cell beams 702 may have an equilateral or isosceles triangular base cross section, without taking into account the flat lateral portions 706, similar to what is shown in FIGS. 46A-B. By way of example and not limitation, the sides of the triangular cross-section having the lateral faces with the active sides 707a-b may have equal dimensions. As shown in FIG. 46A, and by way of example and not limitation, the lateral faces having the active sides 707a-b may have a face width 709 of 0.5 to three inches with or without taking the flat lateral portion 706 shown in FIG. 45 into consideration. By way of example and not limitation, all of the lateral faces having active sides 707a-b for each embossed solar cell beam 702 may have the same face width 709. By way of example and not limitation, the length of the lateral faces having the active sides 707a-b, which may be the same as panel width 713, and may be six to 32 inches.

Referring back to FIG. 45, and by way of example and not limitation, the bottom side of the triangular cross-section of each embossed solar cell beam 702 having the bottom lateral face, which may be an inactive side, may have a side length 712 ranging between 0.5 to three inches. By way of example and not limitation, all of the bottom lateral faces may have the same side length 712. By way of example and not limitation, the side length 712 may be equal to the face width 709 (see FIG. 46A) if the triangular cross-section of the embossed solar cell beams 702 is an equilateral triangle. By way of example and not limitation, if there are eight embossed solar cell beams 702 and each beam has a side length 712 of one inch, then the solar panel length 716 would be eight inches.

Referring back to FIG. 45, and by way of example and not limitation, the flat lateral portion width 714 may be between 0.1 to 0.75 inches. By way of example and not limitation, all of the flat lateral portions 706 may have the same width or different ones, as described elsewhere herein. By way of example and not limitation, the triangular base height 715 of each triangular cross-section of the embossed solar cell beam 702 may be between 0.3 to 2.6 inches. By way of example and not limitation, the triangular height 715 may be the same for all of the embossed solar cell beams 702.

The dimensions may be important to optimize the volumetric solar power generation capacity of the embossed solar panel 708 by creating optimum active sides 707a-b having optimum active sides angles 717. By way of example and not limitation, the active side angle 717 that is made between adjacent active sides 707a-b of the lateral faces of different embossed solar cell beams 702 may range between 30 to 75-degrees. A larger active side angle 717 may expose the active sides 707a-b more to the sun and its solar energy. A smaller active side angle 717, may allow for a better capturing of reflected photons by adjacent active sides 707a-b. Although the active sides 707a-b of the embossed solar panel 708 may be designed to absorb photons of the sun rays, some of the photons hitting such surfaces may nevertheless be reflected. The inclining of such surfaces and the adjacent active sides 707a-b may act as a mechanism that capture the reflected photons from the active side.

By way of example and not limitation, the outer sides of the embossed solar panel 708 (e.g., one, two, or all solar panel sides) where the embossed solar cell beams 702 are in between may have flat solar cells 710. By way of example and not limitation, the flat solar cells 710 may be conventional planar solar cells. With the addition of the side flat solar cells 710, the panel length may increase by additional panel length 716a. The incorporation side flat solar cells 710 may be needed for the outer lateral active sides of the outer embossed solar cell beams 702 to have a surface to capture the non-absorbed photons reflected by the side flat solar cells 710.

By way of example and not limitation, the outer embossed solar cell beams 702a that the other solar beams are in between may have a wider flat lateral portions 706a than the rest of the other embossed solar cell beams 702. By way of example and not limitation, the wider flat lateral portions 706a may have a width 714a greater than 1.25 times, and possibly greater than 1.5 times, than the width 714 of the regular flat lateral portions 706. The wider flat lateral portions 706a may add more incremental solar surface area to increase the energy density of the embossed solar panel 708 where such wide dimension may not be implemented in the middle embossed solar cell beams 702.

Referring now to FIGS. 46A-B, side and angled views of another example of the embossed solar panel 708 is shown. The embossed solar panel 708 may be the same or similar as what has been described with respect to FIG. 45, but the flat lateral portions 706 may be replaced by pointed lateral edges 718. By way of example and not limitation, the pointed lateral edges 718 may be the outer tip on the top of the triangular cross-section of the embossed solar cell beam 702 that is pointing upwards towards the sky. The pointed lateral edges 718 may extend along the length of the embossed solar cell beams 702. By way of example and not limitation, the pointed lateral edge 718 may increase the triangular height to 715a.

Figure 47A:
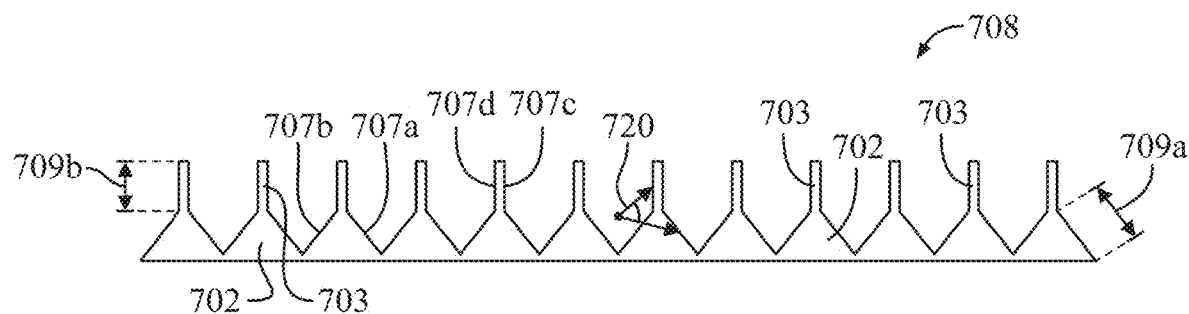
FIGS. 47A-B show side and angled views of another example of the new embodiment of the solar panel.
Figure 47B:
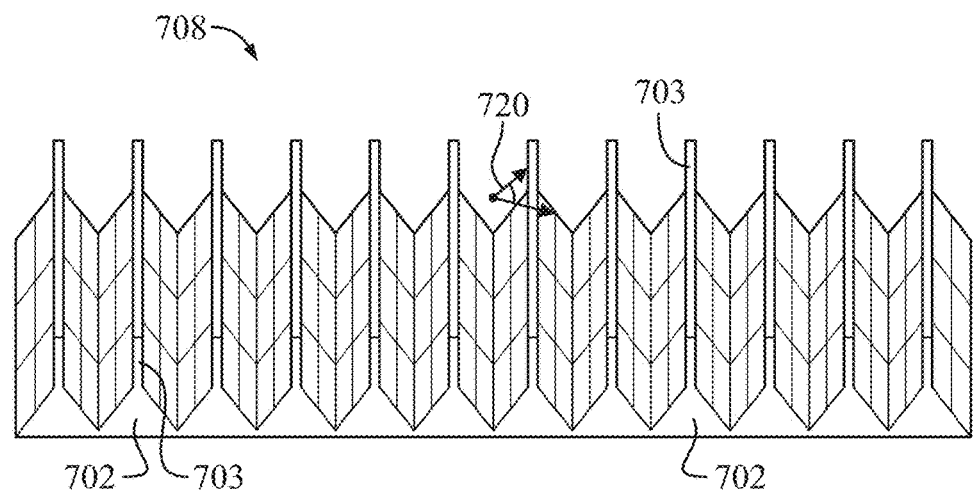

Referring now to FIGS. 47A-B, side and angled views of another example of the embossed solar panel 708 is shown. The embossed solar panel 708 of FIGS. 47A-B may be the same or similar as what has been described with respect to FIG. 45, but the flat lateral portions 706 may be replaced by extended lateral portions 703. By way of example and not limitation, the extended lateral portions 703 may protrude upward from the top lateral edge of the triangular prism of the embossed solar cell beams 702 to create planar vertical solar surfaces sufficient enough to create additional active sides 707c-d on each side of the extended lateral portions 703. By way of example and not limitation, the planar vertical solar surfaces of the extended lateral portions 703 protruding from the embossed solar cell beams 702 may have a height 709b between 0.1 to 3.6 inches. By way of example and not limitation, the extended lateral portion 703 may be unitarily formed with the rest of the embossed solar cell beam 702 or be modular and a separate piece than the embossed solar cell beam 702. FIGS. 47A-B also show a photon 720 reflected from one of the active sides 707a-d and trapped between the embossed solar cell beams 702, and also the extended lateral portions 703, in order to be absorbed by one of the active sides 707a-d and increase power generation per cubic meter of the embossed solar panel 708.

By way of example and not limitation, the embossed solar panel 708 may have the same features as the other embodiments of solar platforms described elsewhere herein. By way of example and not limitation, the embossed solar panel 708 may be incorporated with different types of electric, hybrid, or regular internal combustion engine vehicles. Such vehicles may include trucks, vans, minivans, SUVs, semitrucks, buses, recreational vehicles, motorhomes, trailers, station wagons, hatchbacks, crossovers, sedans, coupes, compact automobiles, and other types of vehicles and automobiles. The embossed solar panel 708 may also be incorporated with buildings, such as parking structures, homes, office buildings, stadiums, and other types of building structures. The embossed solar panel 708 may also simply be on a frame and placed on the ground. Specifically with the incorporation of the embossed solar panel 708 with the vehicle, the embossed solar panel 708 may be attached or integrated with the roof of a vehicle or the top of a cap (e.g., a camper shell) or the tonneau cover of a truck, to name a few examples. The embossed solar panel 708 may be connected to the electrical components and a battery of the vehicle. For example, the embossed solar panel 708 may be used to charge the battery of an electric vehicle, a deep cycle battery, or charge and power other electronic devices. The embossed solar panel 708 may also be connected to a computing system of the vehicle to receive commands to deploy, fold, and operate some or all of the solar panels using an automated motorized mechanism, as described elsewhere herein. Alternatively, embossed solar panel 708 may have its own computing system that operates the solar panels. The embossed solar panel 708 may also be controlled and monitored by a software application on a mobile device, as described elsewhere herein.

Figure 48:
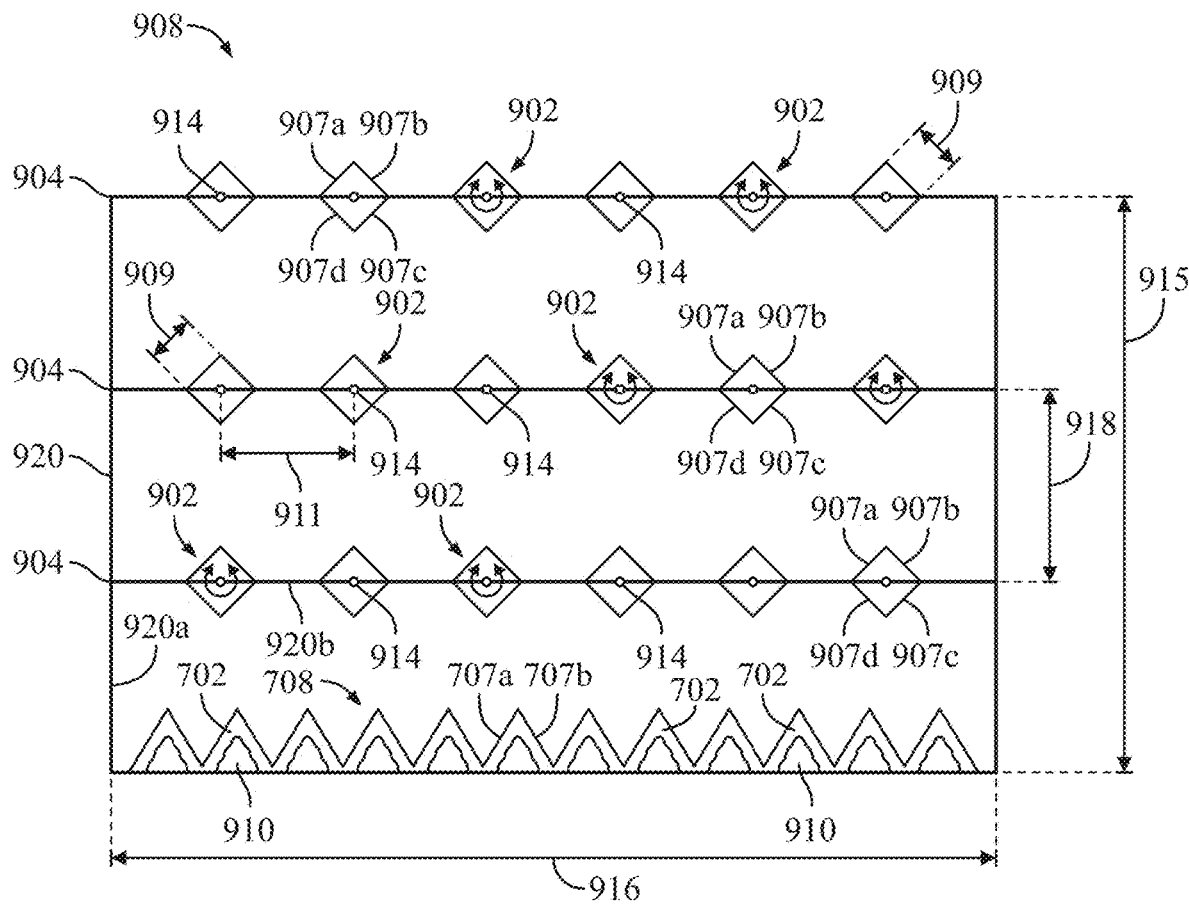
FIG. 48 shows a side view of one example of a stacker solar platform.

Referring now to FIG. 48, another embodiment is shown of a stacker solar platform 908 having vertically stacked rows 904 of horizontal solar cell beams 902 each having three-dimensional solar surfaces 907a-d. The stacked rows 904 may be above a planar or embossed solar panel 708 such that the stacked rows 904 add more solar energy harvesting mechanisms per unit volume. Each solar cell beam 902 of the stacked rows 904 may be spaced apart from each other to allow solar light from the sun to reach the lower stacked rows 904 and the very bottom planar or embossed solar panel 708. The addition of the stacked rows 904 of the solar cell beams 902 above the bottom solar panel 708 may increase the generation of solar power per unit volume, as described elsewhere. The stacker solar platform 908 takes advantage of the volume of free space above the bottom solar panel 708. The solar cell beams 902 above the bottom solar panel 708 may also capture scattered photons reflected by the active sides 707a-b of the bottom solar panel 708 or the scattered photons reflected by the other nearby solar cell beams 902. Each solar cell beam 902 may be rotated to not only face an optimum orientation relative to the sun, but to also be at an optimum orientation to capture scattered photons reflected from adjacent solar surfaces.

By way of example and not limitation, the solar cell beams 902 may be assembled next to each other using a stacker frame 920. The stacker frame 920 may have vertical support structures 920a, such as columns or pillars, and horizontal support structures 920b, such as horizontal boards or bars. The stacker frame 920 alone may be for the most part empty space other than the outer edges making up the structure of the stacker frame 920. The minimally designed structural components of the stacker frame 920 may be necessary to allow maximum sunlight to reach the inside of the frame and to the solar cell beams 902 and the bottom solar panel 708. The vertical and horizontal support structures 920a-b may make up the outer edges of the frame, where the stacker frame 920 may have a cubic, rectangular, or trapezoidal shape.

By way of example and not limitation, some of the horizontal structures 920b may be support structures for the stacked rows 904 to hold the solar cell beams 902. By way of example and not limitation, such horizontal structures 920b may extend across two of the opposite side-edges of the stacker frame 908. Such horizontal structures 920b making up the stacked rows 904 may need to be minimally dimensioned and only extend across the faces of the stacker frame 920 to allow for maximum empty space for sunlight to reach the solar cell beams 902.

By way of example and not limitation, the stacker frame length 916 may be between 2.5 to 13.12 feet (i.e., 4 meters). By way of example and not limitation, the stacker frame height 915 may be between 2.5 to 13.12 feet. By way of example and not limitation, the stacker frame width 913 (see FIGS. 51A-B) may be 2.5 feet to 13.12 feet. In examples describing energy density and power per unit volume of the stacker solar platform 908, the stacker frame 920 may have a length, height, and width each equaling 3.28 feet, which such dimensions are equivalent to covering 1 cubic meter of space. By way of example and not limitation, the wiring of the solar cell beams 902 may be integrated with the stacker frame 920.

Figure 51A:
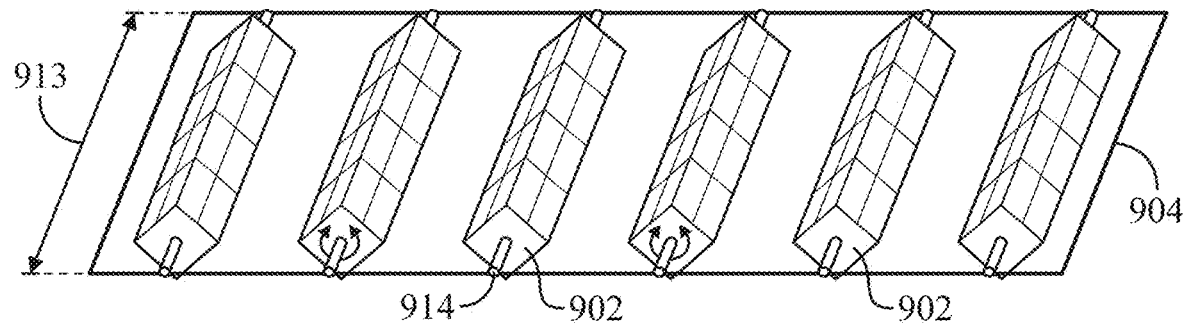
FIGS. 51A-B show perspective and top view of a stacked row of the stacker solar platform of FIG. 48.
Figure 51B:
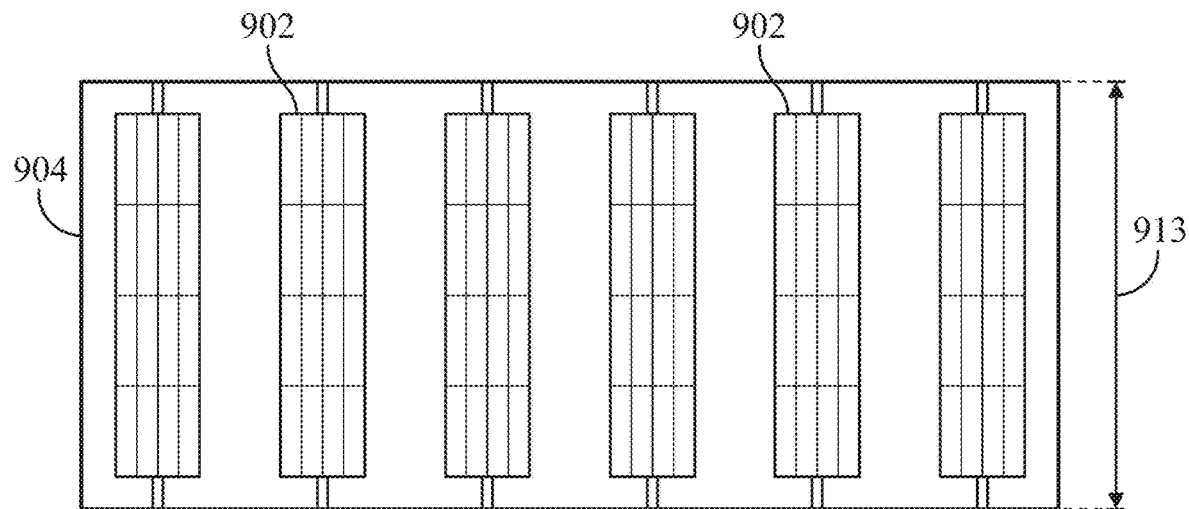

By way of example and not limitation, the stacked rows 904 may each have a plurality solar cell beams 902 ranging from two to 16 solar beams positioned next to each other along the length 916 of the beam frame 920. As shown in FIG. 48, each stacked row 904 may have six solar cell beams 902. By way of example and not limitation, each solar cell beam 902 may have its lateral faces, which are longitudinal and have active sides 907a-d, extend across the width 913 of the stacker frame, as shown in FIGS. 51A-B. By way of example and not limitation, each solar cell beam 902 may be spaced apart from other adjacent solar cell beams 902 in the same stacked row 904 by a separation distance 911 of three to 30 inches along the length 916 of the stacker frame 920, and such distance may be measured from the centers and central axes of the cross-sectional bases of the adjacent solar cell beams 902, as shown in FIG. 48.

By way of example and not limitation, there may exist between one to 10 stacked rows 904 on top of the bottom solar panel 708. FIG. 48 shows three stacked rows 904 on top of the bottom solar panel 708. By way of example and not limitation, the solar cell beams 902 of each stacked rows 904 may have a separation height 918 from their above solar cell beam 902 and stacked row 904 by three to 30 inches measured from the centers and central axes of the cross-sectional bases of the solar cell beams 902 right above each other, as shown in FIG. 48. By way of example and not limitation, the stacked row 904 right above the bottom solar panel 708 may also have a separation height of three to 30 inches from the bottom solar panel 708 measured from the central axes of the bases of the solar cell beams 902 and the top points or surfaces of the active sides 707a-b of the bottom solar panel 708.

By way of example and not limitation, each solar cell beam 902 may have a square prism shape with each of the lateral faces of the prism having the active sides 907a-d extending along the width 913 (see FIG. 51A-B) of the beam frame 920. The solar cell beams 902 may have other shapes for a base, such as triangular or trapezoidal, as described elsewhere herein. Consequently, the solar cell beams 902 may have more or less active sides. As described with respect to FIGS. 49 and 52A, some of the lateral edges of the prism-shaped solar cell beams 902, particularly opposite lateral edges, may have extended lateral portions 903 protruding outwards. The extended lateral portions 903 may give a fin-type structure to the solar cell beams 902, which such fin may create additional solar energy harvesting active sides 907e-h, as described elsewhere herein.

By way of example and not limitation, the solar cell beams 902 may have the same amount and type of solar cells, as described elsewhere herein. By way of example and not limitation, the solar cell beams 902 may originally be designed and manufactured in such a prism shape, as described elsewhere. By way of example and not limitation, the solar cell beams 902 may have the prism shape by having planar solar cells attached to a prism frame, as described elsewhere herein. By way of example and not limitation, each of the solar cell beams 902 may have a unitarily formed body or be made of separate modular pieces, as described elsewhere herein.

As shown in FIG. 48, and by way of example and not limitation, the square-prism solar cell beams 902 may each have four active sides 907a-d for harvesting solar energy, each active side 907a-d being on a lateral face of the square prism. By way of example and not limitation, lateral faces having the active sides 907a-d may have a face width 909 between 0.5 to three inches. With the solar cell beams 902 having four active sides 907a-d all in a space where one active side of a planar solar panel would normally occupy, the solar power harvesting of the stacker solar platform 908 may improve. By way of example and not limitation, if each square-prism solar cell beam 902 has a face width 909 of one-inch, then the solar harvesting capacity in the space that such solar cell beam 902 occupies may quadruple when compared to a planar solar panel of the same dimension occupying such space. This may be because the solar cell beam 902 has four one-inch wide active sides when compared to the single one-inch wide conventional planar solar panel occupying the same space.

By way of example and not limitation, each solar cell beam 902 of each stacked row 904 may rotate clockwise and counterclockwise between 0 to 360-degrees about a central axis in the center of the cross-sectional base of the solar cell beam 902, the central axis extending along the width 913 of the stacker frame 920, as shown in FIG. 51A. By way of example and not limitation, such rotation may be done by a pivoting mechanism 914 about the central axis of the solar cell beam 902. By way of example and not limitation, the pivoting mechanism 914 may be connection or rotation pins pivotably coupled to the center of the cross-sectional base of the solar cell beam 902 and attached to the horizontal support structures 920*b* of the stacker frame 920. By way of example and not limitation, the pivoting mechanism 914 may be as described elsewhere herein.

By way of example and not limitation, the rotation of the solar cell beams 902 in each stacked row 904 may be automated, as described elsewhere herein. By way of example and not limitation, the automated rotation may be based on the weather and the position of the sun that are dependent on the time of the day and year (e.g. months or seasons) and location of the stacker solar platform 908. By way of example and not limitation, such automation may also take into consideration a rotational position of the solar cell beams 902 that takes into account one or more of the active sides 907*a-d* receiving scattered photons reflected from adjacent solar surfaces, such as the bottom solar panel 708. By way of example and not limitation, the rotation of the solar cell beams 902 may be controlled by a software on a mobile device, as described elsewhere herein. By way of example and not limitation, the rotation of all of the solar cell beams 902 of all of the stacked rows 904 may be synchronized with each other, or each stacked row 904 and its solar cell beams 902 may rotate independent to the other stacked rows 904.

As shown in FIG. 48, and by way of example and not limitation, the embossed solar cell beams 702 of the embossed solar panel 708 may have a heating and cooling system 910 implemented within the base of the solar cell beams 702. By way of example and not limitation, the heating and cooling system 910 may extend along the length of the of the embossed solar cell beams 702 and heat and cool the active sides 707*a-b* through conduction, convection, radiation, or all three methods. By way of example and not limitation, the heating and cooling system 910 may be one or more conduits allowing hot or cold fluid to travel through the length of the embossed solar beam 702 to heat or cool the active sides 707*a-b* from within the embossed solar cell beams 702. By way of example and not limitation, the heating and cooling system 910 may also be implemented with the solar cell beams 902 of the stacker solar platform 908 similarly as to how the system is implemented with the embossed solar panel 708.

The heating and cooling may be needed if the embossed solar panel 708 and the stacker solar platform 908 are installed in an environment with weather conditions that would cause ice to form on the solar panels or a place that is so warm as to overheat the solar panels. Alternatively, the heating and cooling system 910 may either be a heating system or a cooling system. By way of example and not limitation, a fanning system may be implemented near and facing the embossed solar panel 708 and solar cell beams 902, such as being attached to the stacker frame 920, to cool the stacker solar platform 908 instead, or in conjunction, of the heating and cooling system 910.

Figure 49:
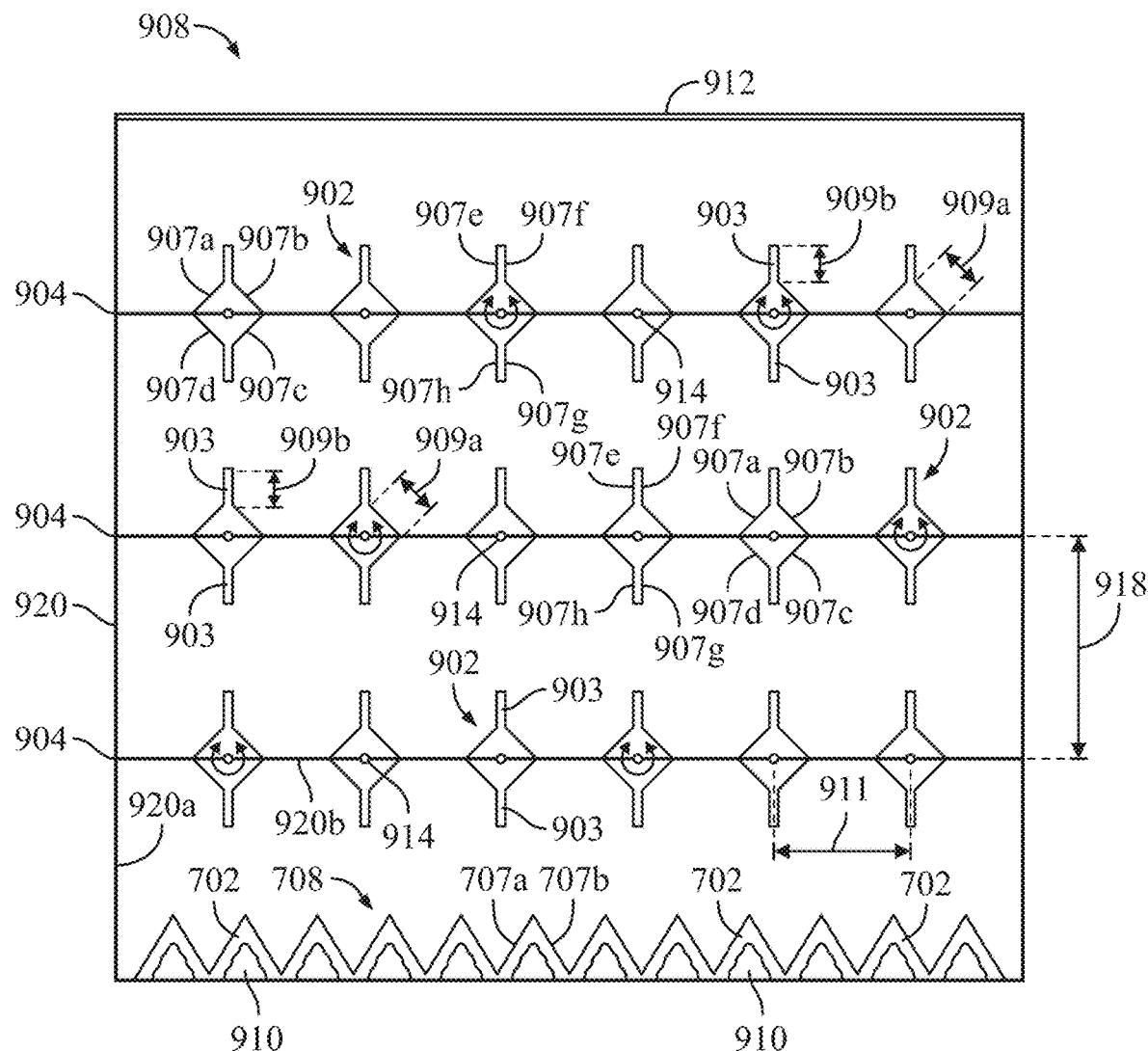
FIG. 49 shows a side view of another example of a stacker solar platform.

Referring now to FIG. 49, another example of the stacker solar platform 908 is shown. By way of example and not limitation, the stacker solar platform 908 of FIG. 49 may be the same as FIG. 48 but the solar cell beams 902 of the stacked rows 904 may have additional active sides 907*e-h* (e.g., one to eight additional active sides). This may be because some of the lateral edges of the prism-shaped solar cell beams 902, particularly opposite lateral edges, may have extended lateral portions 903 protruding outwards as planar bars, as described elsewhere herein. The extended lateral portions 903 may give a fin-type structure to the solar cell beams 902, which such fins may create additional active sides 907*e-h*. By way of example and not limitation, the extended later portions 903 may have active sides 907*e-h* with lateral face width 909*b* between 0.5 to three inches similar to the face width 909*a* of the other active sides 907*a-d*. As the solar cell beams 902 rotate, the extended lateral portions 903 may rotate and move upwards and downwards to face the sun at optimum orientations. Such rotations of the extended lateral portions 903 may also allow the active sides 907*e-h* on such structures to capture scattered photons reflected from adjacent solar panel surfaces, such as from the solar surfaces of the bottom solar panel 708.

By way of example and not limitation, if each of the active sides 907*a-h* of a solar cell beam 902, including the extended lateral portions 903, have face widths 909*a-b* of one-inches, then the solar harvesting capacity in the space that such solar cell beam 902 occupies may increase by eight times when compared to a planar solar panel of the same dimension occupying such space. This may be because the solar cell beam 902 has eight one-inch wide active sides 907*a-h* when compared to the single one-inch wide planar solar panel occupying the same space. By way of example and not limitation, the stacker solar platform 908 may have a planar transparent solar panel 912 on the very top row of the stacker frame 920, which the stacked rows 904 of solar cell beams 902 are under the transparent solar panel 912. The planar transparent solar panel 912 may provide another layer of solar power harvesting while allowing the solar rays to reach the rest of the solar cell beams 902 and bottom solar panel 708.

Figure 50:
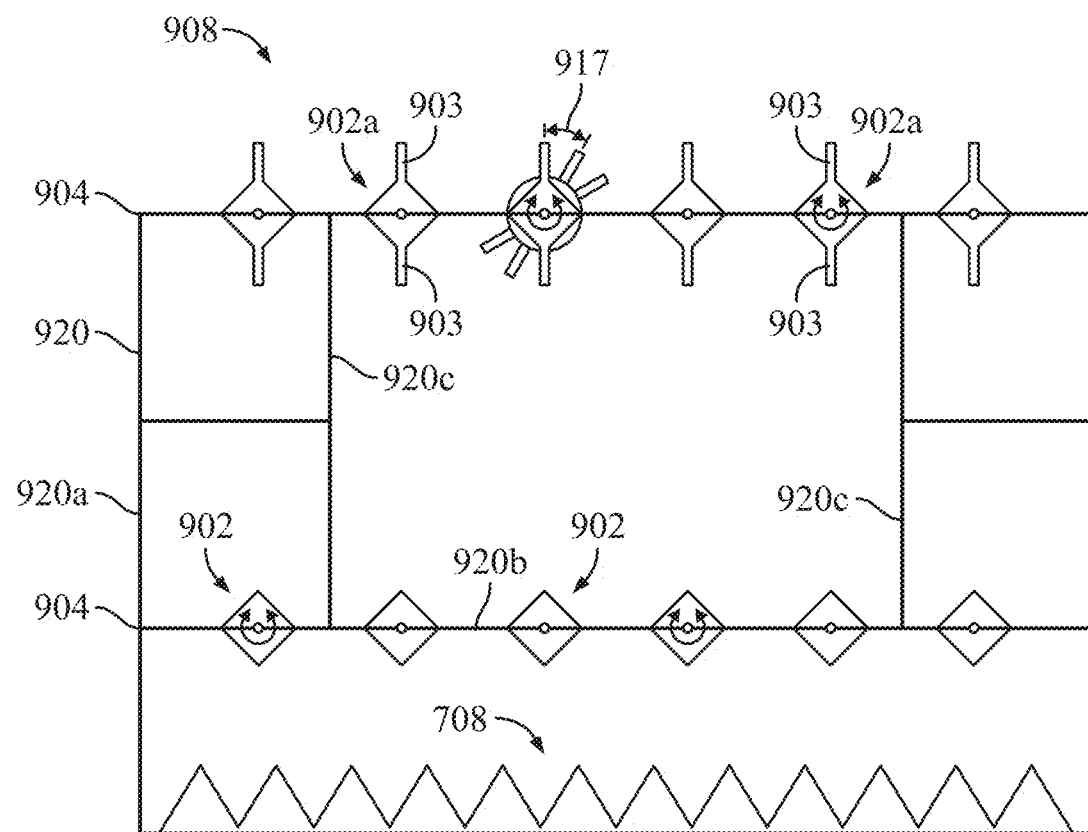
FIG. 50 shows a side view of another example of a stacker solar platform.

Referring now to FIG. 50, the stacker solar platform 908 having stacked rows 904 with different types of solar cell beams 902 is shown. By way of example and not limitation, the top stacked row 904 may have solar cell beams 902*a* with a cross-sectional base having a square or diamond shape, where extended lateral portions 903 protrude outwards from some of the lateral edges of the solar cell beams 902*a*. By way of example and not limitation, the bottom stacked row 904 may have solar cell beams 902 with a cross-sectional base having a regular square shape and no extended lateral portions 903. FIG. 50 also shows a solar cell beam 902*a* having the extended lateral portion 903 rotating at an angle 917 relative to the upright and orthogonal orientation of the extended lateral portion 903. By way of example and not limitation, the rotation angle 917 may be 10 to 180 degrees, clockwise or counterclockwise, relative to the upright orientation of the extended lateral portion 903. By way of example and not limitation, additional support structures 920*c* between the adjacent solar cell beams 902 of a stacked row 904 and the stacked row 904 themselves is shown.

Figure 52A:
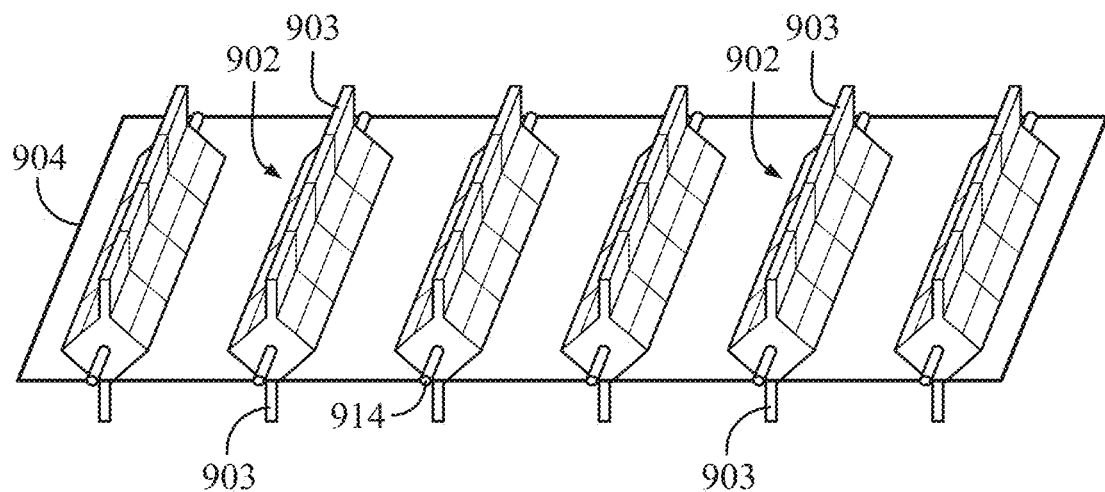
FIGS. 52A-B show perspective and top view of a stacked row of the stacker solar platform of FIG. 49.
Figure 52B:
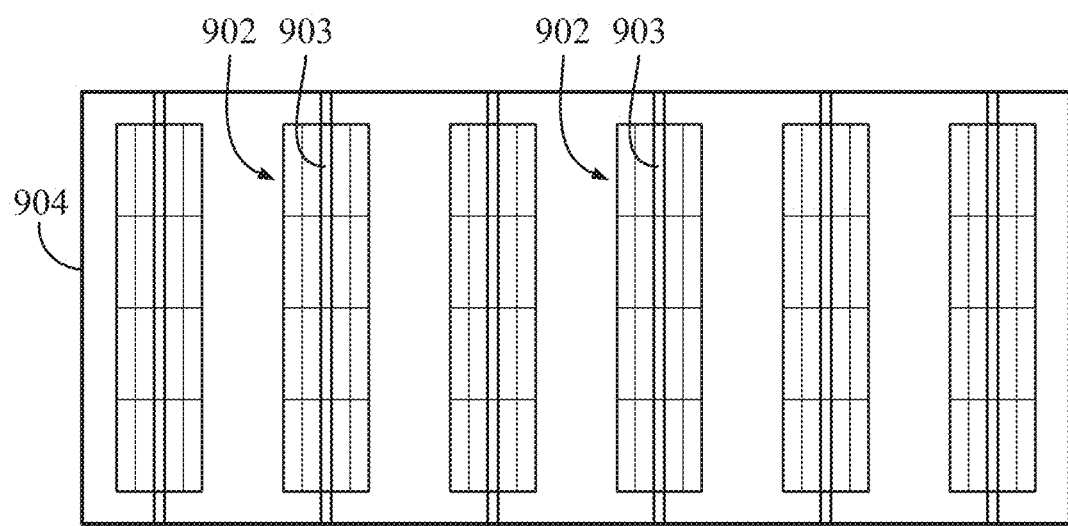

FIGS. 51A-B show perspective and top views of one stacked row 904 shown in FIG. 48. Similarly, FIGS. 52A-B show perspective and top views of one stacked row 904 shown in FIG. 49.

By way of example and not limitation, the stacker solar platform 908 may have the same features as the other embodiments of solar platforms described elsewhere herein. By way of example and not limitation, the stacker solar platform 908 may be incorporated with different types of electric, hybrid, or regular internal combustion engine vehicles. Such vehicles may include trucks, vans, minivans, SUVs, semitrucks, buses, recreational vehicles, motorhomes, trailers, station wagons, hatchbacks, crossovers, sedans, coupes, compact automobiles, and other types of vehicles and automobiles. The stacker solar platform 908 may also be incorporated with buildings, such as parking structures, homes, office buildings, stadiums, and other types of building structures. The stacker solar platform 908 may also simply be on a frame and placed on the ground. Specifically with the incorporation of the stacker solar platform 908 with the vehicle, the stacker solar platform 908 may be attached or integrated with the roof of a vehicle or the top of a cap (e.g., a camper shell) or the tonneau cover of a truck, to name a few examples. The stacker solar platform 908 may be connected to the electrical components and a battery of the vehicle. For example, the stacker solar platform 908 may be used to charge the battery of an electric vehicle, a deep cycle battery, or charge and power other electronic devices. The stacker solar platform 908 may also be connected to a computing system of the vehicle to receive commands to deploy, fold, rotate, and operate some or all of the solar panels using an automated motorized mechanism, as described elsewhere herein. Alternatively, stacker solar platform 908 may have its own computing system that operates the solar panels. The stacker solar platform 908 may also be controlled and monitored by a software application on a mobile device, as described elsewhere herein.

Figure 53A:
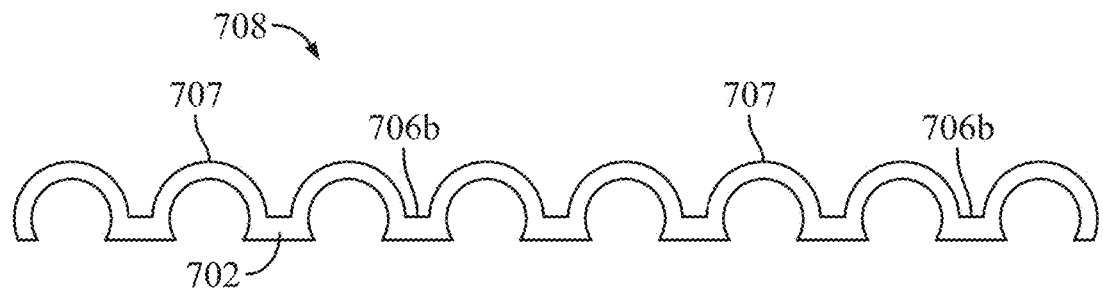
FIGS. 53A-B show side and perspective view of another example of an embossed solar panel.
Figure 53B:
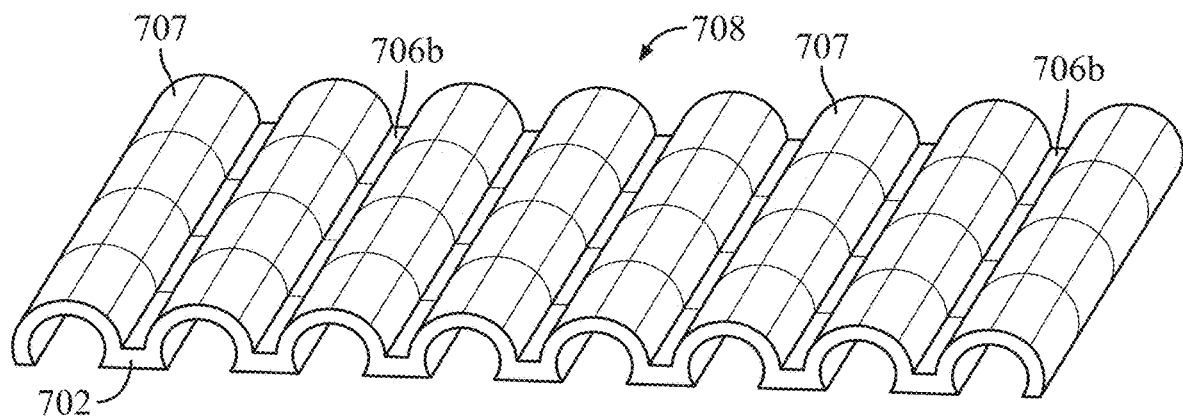

FIGS. 53A-B show another example of an embossed solar panel 708 which may be similar to the other embossed solar panels, described elsewhere herein. In this example, the embossed solar panel 708 may have embossed solar cell beams 702 having semi-cylindrical shapes, where each beam has a round active side 707 that is convex. By way of example and not limitation, the active sides 707 that are convex may each be reversed upside-down U-shape. The round active sides 707 that are convex may allow for more of the surface area of the embossed solar cell beam 702 to be exposed to the solar radiation of the sun at more durations of times during the day since the round active side 707 may be more continuous in its contours. By way of example and not limitation, there may exist flat planar portions 706b having their own solar surfaces between adjacent embossed solar cell beams 702. The flat planar portions 706b may allow for more of the arc-surface of the embossed solar cell beams 702 that are semi-cylindrical to be exposed to solar rays of the sun. By way of example and not limitation, the embossed solar cell beams 702 that are semi-cylindrical may be filled or partially hollow at their center. By way of example and not limitation, if the semi-cylindrical embossed solar cell beams 702 are hollow at their center, at least one or two of such solar cell beams may also be used to cover the outer surface area of a cylindrical pole, such as a telephone or electric pole. Consequently, utility poles may have active solar harvesting sides around the majority, if not the whole, of their surface areas. By way of example and not limitation, the solar cell beams 702 may be manufactured as semi-cylindrical or, alternatively, thin-film solar panels may be attached on top of the surface area of a semi-cylindrical beam frames.

Figure 54A:
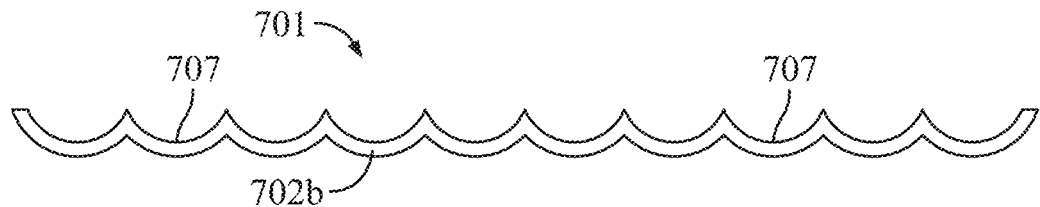
FIGS. 54A-B show side and perspective view an example of a debossed solar panel.
Figure 54B:
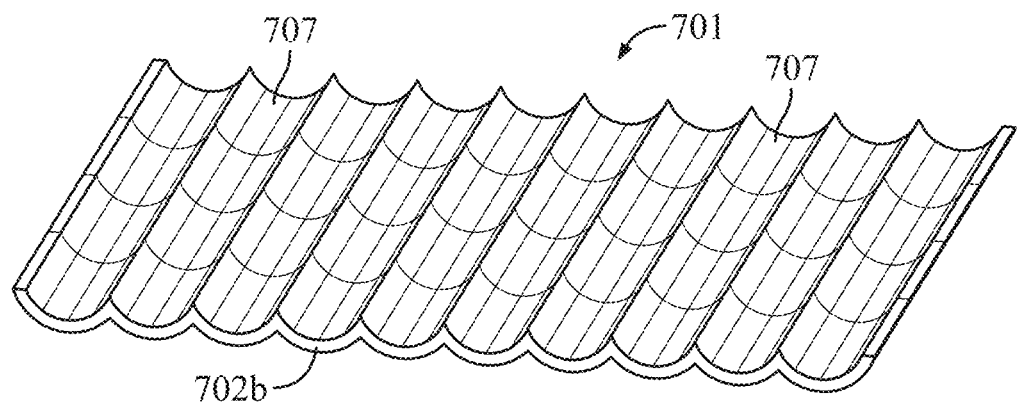

FIGS. 54A-B show an example of a debossed solar panel 701 which may be similar to the embossed solar panels, described elsewhere herein. In this example, the debossed solar panel 701 may have round active sides 707 that are concave and designed for solar energy harvesting, where such round active sides 707 extend downwards to make U-shaped solar surfaces. The round active sides 707 that are concave may allow for more of the surface area of the debossed solar cell beam 702b to be exposed to the solar rays of the sun at more durations of times during the day since the round active side 707 is more continuous in its contours. The round active sides may be able to capture more scattered photons that get reflected from adjacent solar surfaces since such active sides are concave. By way of example and not limitation, the debossed solar cell beams 702b may be manufactured as concave or thin-film solar panels may be attached on top of concave beam frames.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A stacker solar platform, comprising:
a base solar panel having an underlying substrate and a plurality of protruding solar cell beams on top of the underlying substrate, each of the protruding solar cell beams having a body with a prism shape, the body of each protruding solar cell beam having a first active solar side with solar cells on a first lateral face of the body and a second active solar side with solar cells on a second lateral face of the body, the first active solar side and the second active solar side of each protruding solar cell beam inclining upward from the underlying substrate and towards each other;
a stacker frame attached to the base solar panel and having at least one stacked row of a plurality of solar cell beams on top of the base solar panel, each solar cell beam laying along and above the base solar panel and pivotably coupled to the stacker frame, each solar cell beam having a three-dimensional shape with active solar surfaces covering different sides of the three-dimensional shape of the solar cell beam, the plurality of solar cell beams being spaced apart from each other along the at least one stacked row to allow sunlight reach the base solar panel;
wherein the at least one stacked row of the stacker frame is at a height above the base solar panel ranging between 3 and 30 inches for the plurality of solar cell beams to receive reflected scattered photons from the base solar panel.

2. A stacker solar platform, comprising:
a base solar panel having an underlying substrate and a plurality of protruding solar cell beams on top of the underlying substrate, each of the protruding solar cell beams having a body with a prism shape, the body of each protruding solar cell beam having a first active solar side with solar cells on a first lateral face of the body and a second active solar side with solar cells on a second lateral face of the body, the first active solar side and the second active solar side of each protruding solar cell beam inclining upward from the underlying substrate and towards each other;
a stacker frame attached to the base solar panel and having at least one stacked row of a plurality of solar cell beams on top of the base solar panel, each solar cell beam laying along and above the base solar panel and pivotably coupled to the stacker frame, each solar cell beam having a three-dimensional shape with active solar surfaces covering different sides of the three-dimensional shape of the solar cell beam, the plurality of solar cell beams being spaced apart from each other along the at least one stacked row to allow sunlight reach the base solar panel;

wherein each solar cell beam of the at least one stacked row is spaced from each other between 3 to 30 inches to receive reflected scattered photons from adjacent solar cell beams of the plurality of solar cell beams of the at least one stacked row.

3. A solar panel having three-dimensional active solar surfaces, comprising:
an underlying substrate having a length and a width;
a plurality of protruding solar cell beams packed next to each other on top of the underlying substrate, each of the protruding solar cell beams having a body with a prism shape, the body of each protruding solar cell beam having a first active solar side with solar cells on a first lateral face of the body and a second active solar side with solar cells on a second lateral face of the body;
wherein the first active solar side and the second active solar side of each protruding solar cell beam incline upward from the underlying substrate and towards each other such that a V-shape is formed between adjacent protruding solar cell beams packed next to each other and making up the plurality of protruding solar cell beams;
wherein the prism shape of the body of each protruding solar cell beam is a trapezoidal prism shape.

4. A solar panel having three-dimensional active solar surfaces, comprising:
an underlying substrate having a length and a width;
a plurality of protruding solar cell beams packed next to each other on top of the underlying substrate, each of the protruding solar cell beams having a body with a prism shape, the body of each protruding solar cell beam having a first active solar side with solar cells on a first lateral face of the body and a second active solar side with solar cells on a second lateral face of the body;
wherein the first active solar side and the second active solar side of each protruding solar cell beam incline upward from the underlying substrate and towards each other such that a V-shape is formed between adjacent protruding solar cell beams packed next to each other and making up the plurality of protruding solar cell beams;
wherein each V-shape formed between adjacent protruding solar cell beams has an angle ranging between 30 to 75-degrees.

5. The solar panel of claim 4, further comprising planar solar cells proximate to at least one outer edge of the underlying substrate, the planar solar cells being parallel with the underlying substrate.

6. A solar platform, comprising:
a frame structure having two longitudinal sides and two lateral sides;
a base solar panel having a length and a width, the base solar panel laid flat on the frame structure and having an active side with a first plurality of solar cells facing in an upwards direction; and
a plurality of riser solar panels each having a body with a height protruding upwards from the base solar panel, each riser solar panel being equidistantly spaced apart from each other by a distance, and the body of each riser solar panel having a first active side opposite to a second active side on opposite surfaces of the body, the first active side of each riser solar panel having a second plurality of solar cells and the second active side of each riser solar panel having a third plurality of solar cells
wherein the plurality of riser solar panels is attached and affixed to the base solar panel in an orthogonal direction.

7. The stacker solar platform of claim 1, wherein the three-dimensional shape of each solar cell beam is a rectangular prism.

8. The stacker solar platform of claim 7, wherein the active solar surfaces of each of the solar cell beams are on at least two lateral surfaces of the rectangular prism.

9. The stacker solar platform of claim 1, wherein the body of each protruding solar cell beam of the base solar panel has a base with a heating system.

10. The stacker solar platform of claim 1, wherein the three-dimensional shape of each solar cell beam is a rectangular prism having extended lateral portions on two opposite lateral edges of the rectangular prism, the extended lateral portions having second active solar surfaces.

11. The stacker solar platform of claim 1, wherein the three-dimensional shape of each solar cell beam is cylindrical.

12. The solar panel of claim 3, wherein each protruding solar cell beam has a third active solar side with solar cells on a third lateral face of the body, the third lateral face being between the first and second lateral face of the body.

13. The solar panel of claim 3, wherein the prism shape of the body of each protruding solar cell beam is a triangular prism shape.

14. The solar panel of claim 4, wherein a lateral edge between the first and second lateral faces of the body of each protruding solar cell beam may have a lateral extension protruding upwards, the lateral extension having a third and a fourth active solar sides with solar cells.

15. The solar platform of claim 6, wherein each riser solar panel is pivotable relative to the base solar panel.

16. The solar platform of claim 6, wherein adjacent riser solar panels of the plurality of riser solar panels are equidistantly spaced apart from each other by a second distance.

17. The solar platform of claim 16, wherein the second distance between adjacent riser solar panels is greater than or equal to the height of the body of each riser solar panel of the plurality of riser solar panels.

* * * * *